United States Patent [19]

Sprague et al.

[11] Patent Number: 4,881,194

[45] Date of Patent: Nov. 14, 1989

[54] STORED-PROGRAM CONTROLLER FOR EQUALIZING CONDITIONAL BRANCH DELAYS

[75] Inventors: David L. Sprague, Hopewell, N.J.; Kevin Harney, Brooklyn, N.Y.; Allen H. Simon, Belle Mead; Herbert H. Taylor, Jr., Hopewell Township, Mercer County, both of N.J.

[73] Assignee: Intel Corporation, Santa Clara, Calif.

[21] Appl. No.: 121,820

[22] Filed: Nov. 16, 1987

[51] Int. Cl.$^4$ .............................................. G06F 9/00
[52] U.S. Cl. ................................................. 364/900
[58] Field of Search ....................... 364/200, 300, 900

[56] References Cited

U.S. PATENT DOCUMENTS

| | | | |
|---|---|---|---|
| 4,125,861 | 11/1978 | Mounts et al. | 358/133 |
| 4,145,736 | 3/1979 | Yamada et al. | 364/200 |
| 4,342,078 | 7/1982 | Tredennick et al. | 364/200 |
| 4,396,906 | 8/1983 | Weaver | 340/347 |
| 4,467,415 | 8/1984 | Ogawa | 364/200 |
| 4,689,823 | 8/1987 | Wojcik et al. | 382/41 |

OTHER PUBLICATIONS

M. Kocher & R. Leonardi, "Adaptive Region Growing Technique Using Polynomial Functions for Image Approximation", *Signal Processing* (Netherlands), vol. 11 No. 1, Jul., 1986, pp. 47-60.

S. Brofferio & F. Rocca, "Interframe Redundancy Reduction of Video Signals Generated By Translating Objects", *IEEE Transactions on Communications*, Apr. 1977, pp. 448-455.

N. Abramson, Information Theory and Coding, McGraw Hill, 1963, pp. 77-85.

H. W. Gschwind, *Design of Digital Computers an Introduction*, Springer-Verlag, 1967, pp. 379-387.

Memory Products Data Book, NEC Electronics Inc., Jan., 1985, pp. 3-45-3-54.

IBM Technical Disclosure Bulletin, vol. 29, No. 2, Jul. 1986, (New York, N.Y.), entitled "Parallel Microcode Access for Performance", pp. 727-728.

IBM Technical Disclosure Bulletin, vol. 20, No. 1, Jun. 1977, (New York, N.Y.), J. J. Bento, Jr., entitled "Parallel ROS Branching Technique", pp. 222-223.

*Primary Examiner*—Raulfe B. Zache
*Attorney, Agent, or Firm*—Carl L. Silverman; William H. Murray; Frank M. Linguiti

[57] ABSTRACT

A video signal processor includes a stored-program controller which concurrently reads two instruction values from a program memory during each instruction cycle. The next instruction used by the video signal processor is selected from between these two values. If the current instruction indicates a conditional branch operation, the value of one of a plurality of conditions internal to the video signal processor determines which of these two instructions is selected. Otherwise, a value provided by the current instruction itself determines which of the two instructions is selected. This configuration of the stored program controller implements a conditional branch facility in which there is no delay in fetching an instruction for either value of the selected condition.

6 Claims, 36 Drawing Sheets

FIG. 1A

ABSOLUTE CODE

| X POS | Y POS | W | H | A | B | C |
|---|---|---|---|---|---|---|

FIG. 1B

RELATIVE CODE

| X POS | Y POS | W | H | ΔX | ΔY | A | B | C |
|---|---|---|---|---|---|---|---|---|

FIG. 1C

DPCM CODE

| X POS | Y POS | W | H | $DP_0$ | $DP_1$ | $DP_2$ | ... | $DP_N$ |
|---|---|---|---|---|---|---|---|---|

MICROCODE RAM AND SEQUENCER

| NOT USED | ALU OP CODE | ALU SOURCE SEL | SHIFT CONT | LATCH COND CODE | INT μP | LIT SEL | DEC LOOP CTR | B DEST | B SRC | A DEST | A SRC | COND CODE SEL | NEXT ADDRESS |
|---|---|---|---|---|---|---|---|---|---|---|---|---|---|
| NUMBER OF BITS: 1 | 9 | 2 | 2 | 1 | 1 | 1 | 1 | 5 | 4 | 5 | 5 | 3 | 8 |
| BIT NUMBER: 47 | 46–38 | 37,36 | 35,34 | 33 | 32 | 31 | 30 | 29–25 | 24–21 | 20–16 | 15–11 | 10–8 | 7–0 |

LITERAL (bits 15–0)

MICROCODE CONTROL WORD

*FIG. 3C*

DATA RAM

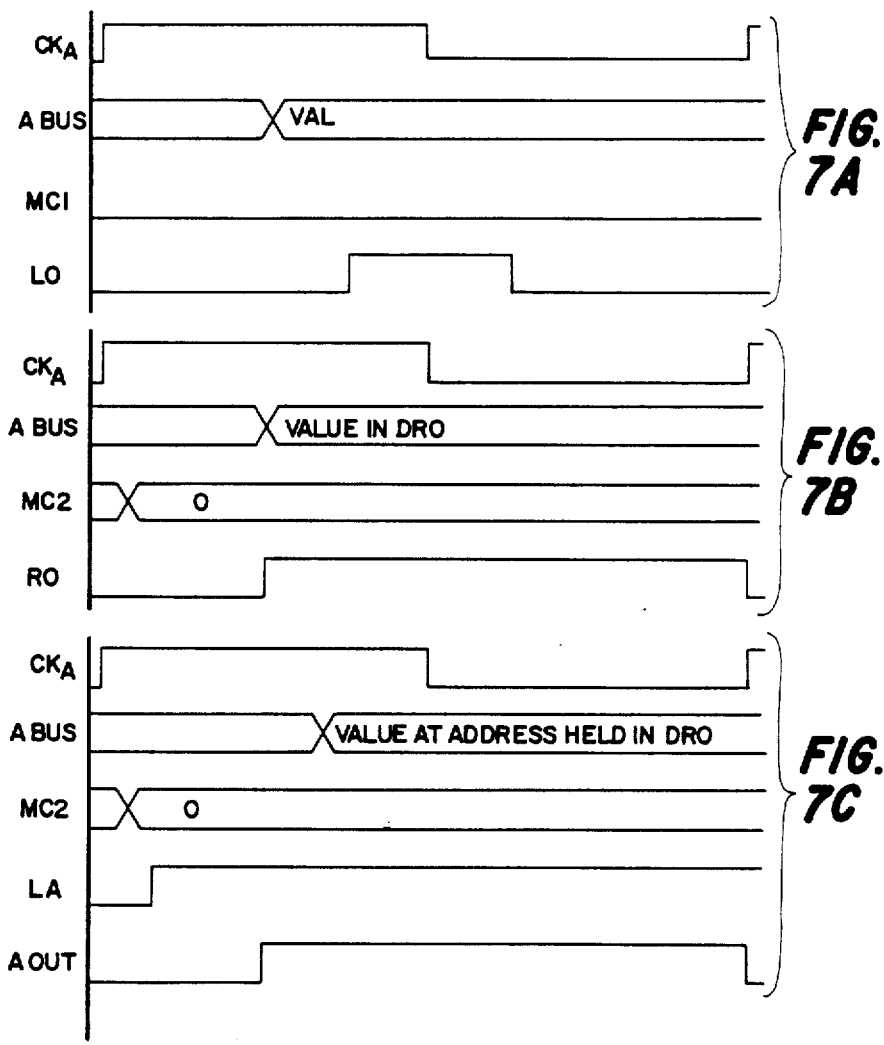

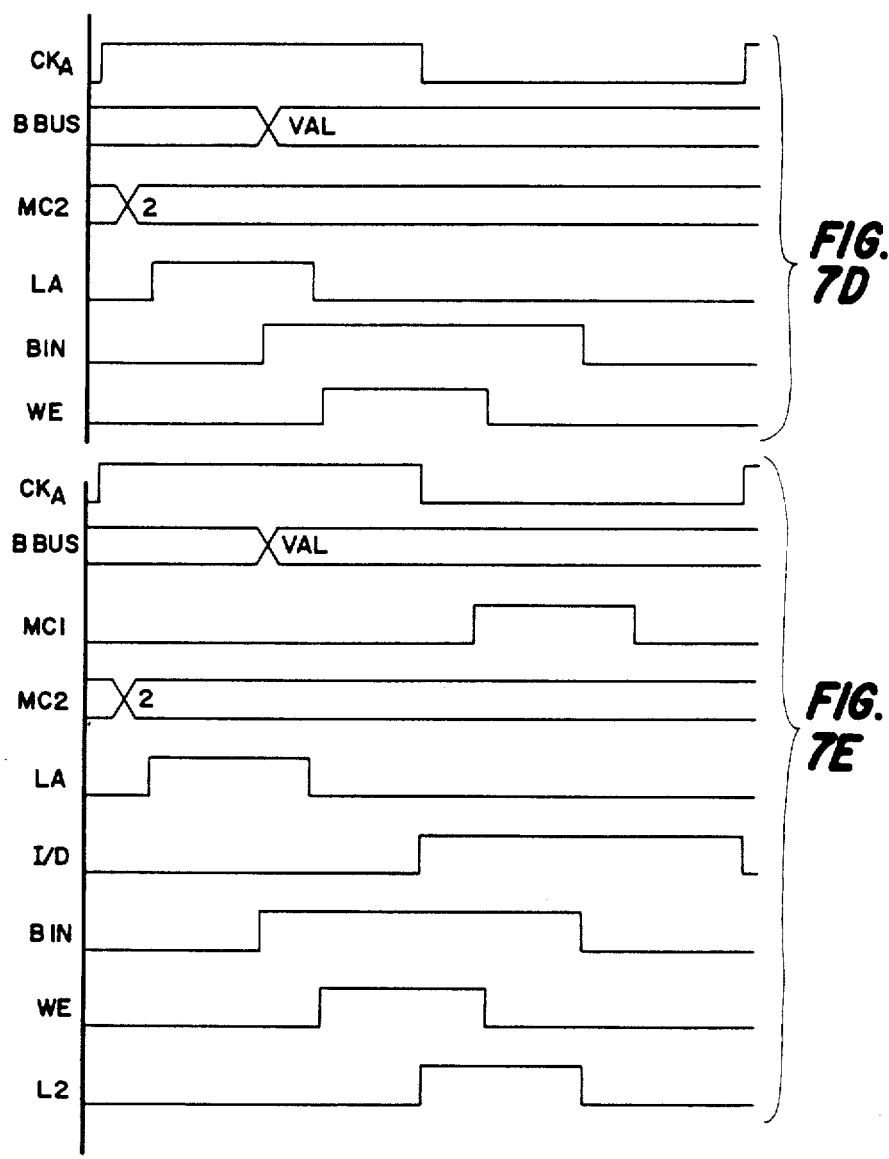

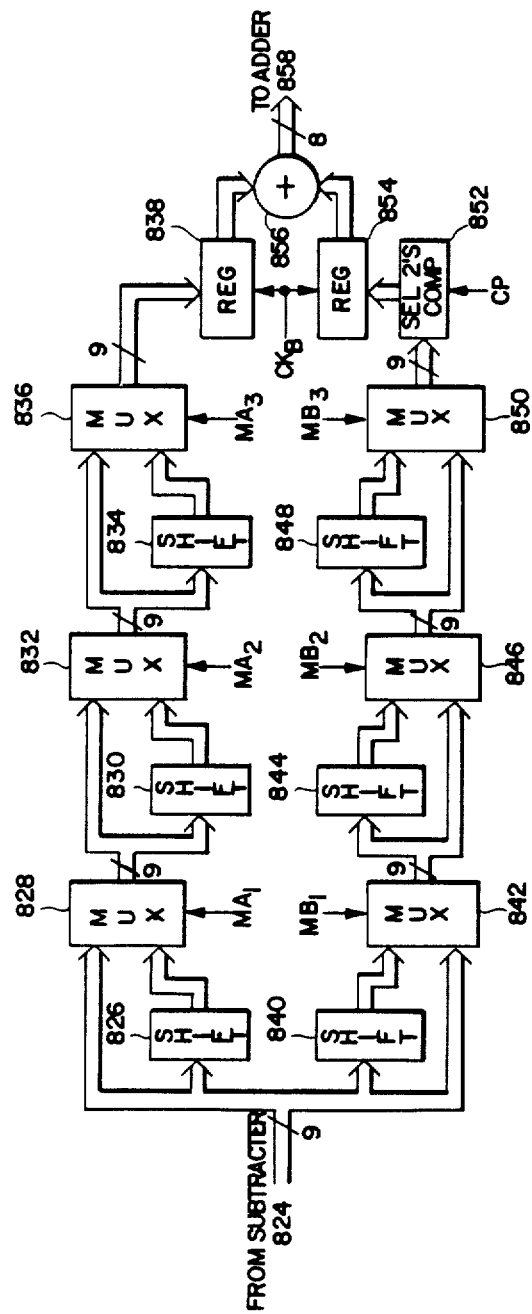
FIG. 8B  MULTIPLIER 825

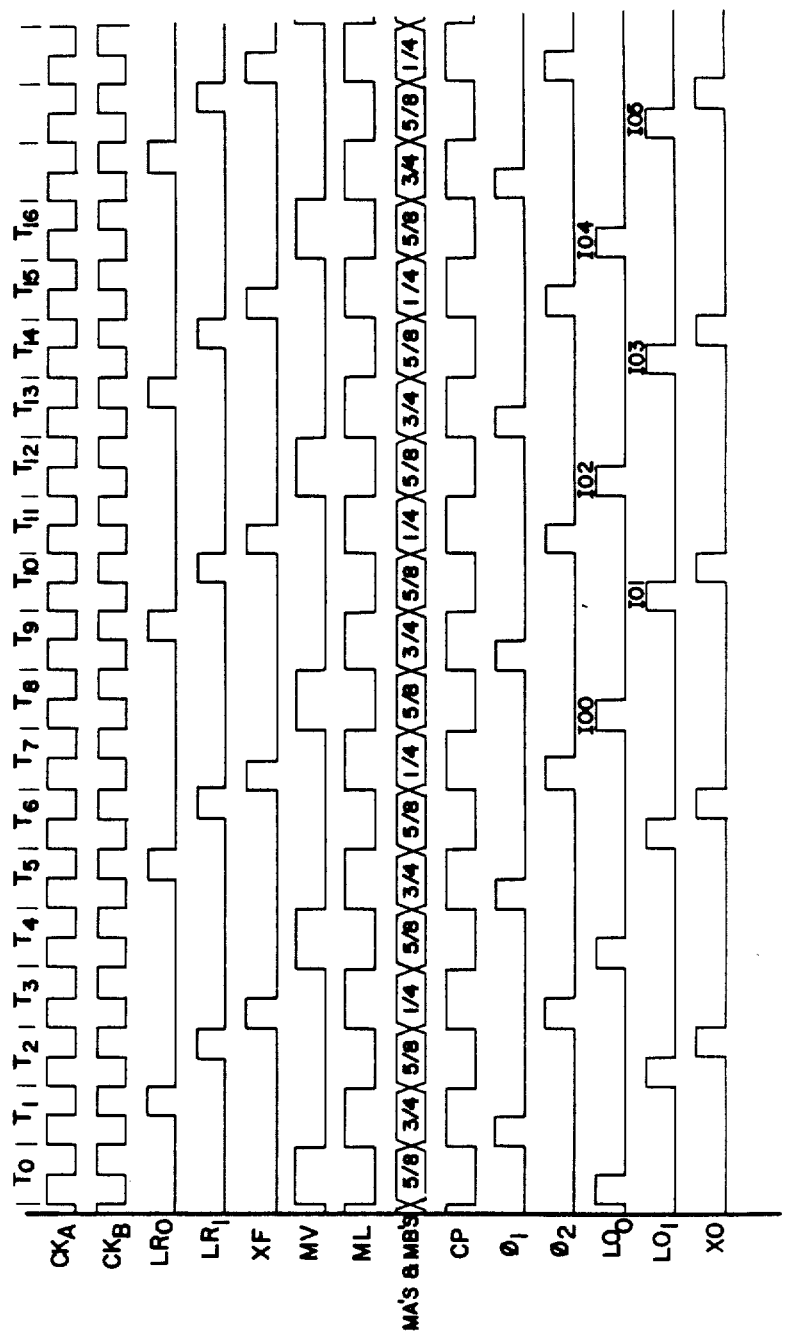

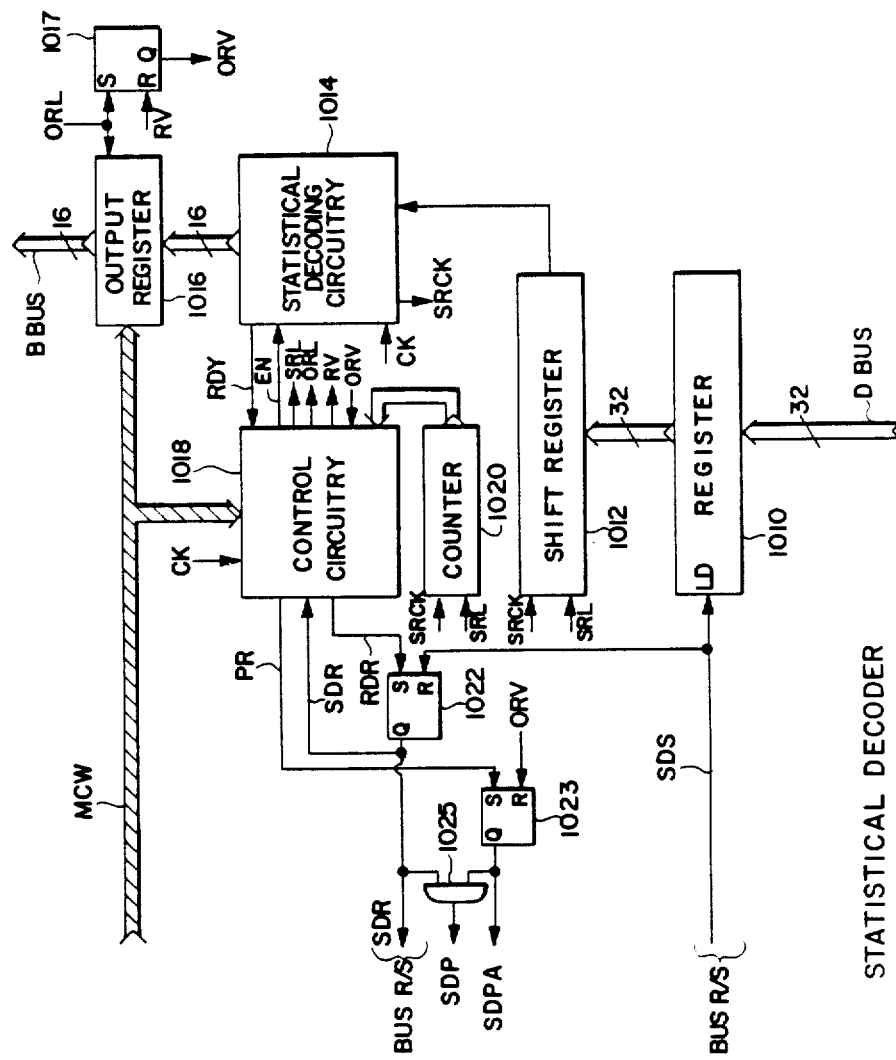
STATISTICAL DECODER FIG. 10A

INPUT FIFO

OUTPUT FIFO

| INSTRUCTION ADDR | ALU OPCODE | ALU SOURCE SELECT | DEC LOOP CTR | B DEST | B SRC | A DEST | A SRC | COND CODE SELECT | NEXT ADDRESS |
|---|---|---|---|---|---|---|---|---|---|
| 1 ⎫ "INNER LOOP" 2 ⎭ | +] — | A,B — | 1 0 | NULL OUTPUT FIFO | *DR2++ ALU | NULL — | ALU — | — LOOP COUNTER ZERO | 2 1 |
| 0 | ... | | | | | | | | |

FIG. 19

| INSTRUCTION ADDR | ALU OPCODE | ALU SOURCE SELECT | DEC LOOP CTR | B DEST | B SRC | A DEST | A SRC | COND CODE SELECT | NEXT ADDRESS |
|---|---|---|---|---|---|---|---|---|---|
| 1 | +] | A | 0 | R0 | INPUT FIFO 0 | NULL | *DR0++ | — | 2 |
| 2 | +] | A,B | 0 | NULL | ALU | NULL | PIXEL INTERP. OUTPUT | — | 3 |
| 3 | — | — | 1 | OUTPUT FIFO | ALU | PIXEL INTERP. INPUT | *DRI++ | — | 4 |
| 4 | — | — | 0 | *DR2++ | R0 | PIXEL INTERP. INPUT | R0 | LOOP COUNTER ZERO | 1 |
| 0 | ⋮ | | | | | | | | |

FIG. 21

| INSTRUCTION ADDR | ALU OPCODE | ALU SOURCE SELECT | DEC LOOP CTR | B DEST | B SRC | A DEST | A SRC | COND CODE SELECT | NEXT ADDRESS |
|---|---|---|---|---|---|---|---|---|---|
| 2 | — | — | 1 | OUTPUT FIFO | ALU | R1 | ALU | — | 1 |
| 1 | — | — | 0 | R0 | STATISTICAL DECODER | — | — | LOOP COUNTER ZERO | 3 |
| 3 | — | — | 0 | — | — | DR2 | R0 | — | 4 |
| 4 | +] | A,B | 0 | NULL | *DR2 | NULL | R1 | — | 2 |
| 0 | ... | | | | | | | | |

*FIG. 23*

STORED-PROGRAM CONTROLLER FOR EQUALIZING CONDITIONAL BRANCH DELAYS

The present invention relates to a stored-program controller having a conditional branch facility designed to operate at high speed and, thus, suitable for use in a real-time video signal processor.

In recent years, there has been considerable progress in the field of video signal compression. Several methods have been developed for reducing the redundancy in digitally encoded video signals to facilitate their transmission or storage. Three methods are of particular interest in this application, hereinafter referred to as absolute encoding, relative encoding and differential pulse code modulation (DPCM) encoding. These video compression techniques are described below.

An absolute encoded image is developed by partitioning an image into a plurality of contiguous segments and then assigning a fill value to each segment. This fill value may be a fixed luminance and/or chrominance value or it may be a value that varies from pixel to pixel as a function of the location of the pixel within the segment. When an absolute encoded image is decoded and displayed, the result is a mosaic composed of the reconstructed segments.

The absolute encoding technique produces a plurality of data records, each one describing a different segment of the original image. Each of these records includes several fields, where each field includes one or more binary words. An exemplary record from an absolute encoded image is shown in FIG. 1A. This record includes two one-byte fields, X POS, and Y POS, which indicate the respective horizontal and vertical position of the pixel in the upper left corner of a segment. The record further includes a one-byte field W and a one-byte field H which indicate the number of pixels in the respective horizontal and vertical directions that define the segment. The last three fields in the absolute code record A, B and C, determine how the segment is filled. These values are the coefficients of a bilinear equation (1) which describes how the value, PV, of a particular pixel is determined.

$$PV = AX + BY + C \quad (1)$$

In the equation (1), C is a one-byte value representing, for example, the luminance level in the upper left corner of the segment. A and B are each two-byte values representing amounts by which the luminance value changes between successive pixels in the horizontal and vertical directions, respectively. X and Y are values which indicate the position of the pixel within the segment relative to the upper left corner of the segment. This example of an absolute code record assumes separate groups of records for each of the luminance and/or color information signal components of the video signal, and assumes that all of the segments are rectangular. A more general example of an absolute encoding system may be found in an article by M. Kocher and R. Leonardi entitled "Adaptive Region Growing Technique Using Polynomial Functions For Image Approximation", *Signal Processing* (Netherlands) Vol. 11, No. 1, July 1986, pp. 47-60, which is hereby incorporated by reference.

The second video signal compression method set forth above, relative encoding, involves partitioning the image into contiguous segments which are defined in terms of corresponding segments from the previous image of a multi-image sequence. This encoding method is appropriate for a set of video fields that represent full motion video. An image encoded using this method is represented by a plurality of data records. An exemplary record is shown in FIG. 1B. The fields X POS, Y POS, W and H are the same as in the absolute record. The two one-byte fields $\Delta X$ and $\Delta Y$ indicate the pixel displacement in the horizontal and vertical directions, respectively, of the segment in the current video field relative to its corresponding segment in the previous video field. These displacement values may be in units of a fraction of the distance between adjacent pixels in the display image.

The fields A, B and C in the relative code record are similar to the corresponding fields in the absolute code record. These values are used as the coefficients of the bilinear equation (1) to develop values which are added to the pixel values in the segment.

The record format for relative coded images also assumes that the segments are rectangular and that only one of the luminance and color information components of an image is described by a given record. A general description of the complexities of relative encoding is presented in an article by S. Brofferio and F. Rocca entitled "Interframe Redundancy Reduction of Video Signal Generated by Translating Objects", IEEE Transactions on Communications, April 1977 pp. 448-455, which is hereby incorporated by reference.

The third encoding method listed above, DPCM, in general describes each pixel in an image as the sum of a predicted pixel value and a differential pixel value. This method is applied to segments in an image which are not easily described by absolute or relative code records. An example of a DPCM record is shown in FIG. 1C. The fields X POS, Y POS, W and H for this record are the same as for the absolute code record and relative code record set forth above. The remainder of the DPCM code record is a series of N bytes where N is the product of the values held in the W and H field. The first of these N bytes, $DP_0$ is a differential value which, when added to a fixed predicted value of, for example, 128, produces the pixel in the upper left corner of the segment. The next byte, $DP_1$, is a difference value, which, when added to the sum $128 + DP_0$, produces the next successive pixel value on the top line of the segment. Similarly, the value $DP_2$ is a difference value which, when added to the accumulated sum of 128, $DP_0$ and $DP_1$ produces the third pixel value on the top line of the segment. The successive values in the DCPM code record each describe a pixel value as the accumulation of the preceding values in the record. An example of a video signal compression system which uses the DPCM encoding technique may be found in U.S. Pat. 4,125,861 entitled "Video Signal Encoding", which is hereby incorporated by reference.

If the DPCM data were stored or transmitted as shown in FIG. 1C, there would be little or no advantage to using the DPCM encoding technique since each of the values that describes a pixel occupies one data byte, the same as a non-encoded pixel value. However, as set forth in the referenced patent 4,125,861, the frequency of occurrence of encoded bytes having relatively small values is much larger than the frequency of occurrence of encoded bytes having relatively large values. This unequal distribution of the encoded bytes is used in the referenced patent to further compress the video data stream by encoding the smaller-valued samples in a smaller number of bits than are used for the larger-valued samples. Variable length statistical encoders which perform this type of compression are known in the art. An algorithm for generating a code of this type, a Huffman Code, is described in a section of a book by N. Abramson entitled "Information Theory and Coding", McGraw Hill, 1963 pp. 77-85, which is hereby incorporated by reference.

Each of the encoding methods described above work well on some types of video information and poorly on others. The absolute encoding technique is best for still images or for the first video field of a motion sequence, when the image to be encoded includes relatively large areas of uniform or linearly varying luminance or color information. The relative coding technique is best for the second and subsequent video fields of a motion sequence. The DPCM encoding technique is best for images containing areas of finely detailed information.

Due to the different types of video information that are efficiently represented by these codes, it may be desirable to combine two or more of the codes to represent a single video image. For example, the combination of absolute encoding and DPCM encoding would produce a compact representation of an image that includes both low and high levels of detail. For motion sequences, it may also be desirable to represent portions of the image using the relative encoding techniques. As shown in FIGS. 1A, 1B and 1C, these three encoding methods can be tailored to produce compatible record formats.

Once so encoded, however, it would be desirable for the image to be decoded rapidly so that the reproduced images may be displayed with natural detail and motion.

The circuitry used to decode an encoded image of this type would desirably include various processing elements which are conditioned to act in concert under the control of a stored-program controller. One type of stored-program controller which may be used is a microcode sequencer such as is found in many current microprocessor integrated circuits. A general discussion of microcode sequencer design may be found in a textbook by H. W. Gschwind, entitled *Design of Digital Computers, An Introduction*, Springer-Verlang, 1967, pp. 379-387, which is hereby incorporated by reference. As set forth in this discussion, the implementation of a conditional branch operation is an important consideration in designing a microcode sequencer.

A conditional branch operation effects a change in the sequence of microcode instructions provided by the microcode sequencer in response to the occurrence of a particular condition in processing circuitry external to the microcode sequencer. Such a condition may be, for example, that the value held in a specified register is zero. If, when the conditional branch operation is invoked, the specified condition is met, one sequence of microcode instructions is provided by the microcode sequencer. If the condition is not met, another independent sequence of instructions is provided.

In a video signal processor which processes encoded data, such as that described above, to produce a real-time full motion display, the speed of the decoding processor is an important consideration. The implementation of the conditional branch operation may significantly affect the performance of the decoding processor. Each of the conditional branch operations described in the above-referenced textbook, for example, may require as much as one extra instruction cycle when the first instruction in one of the alternate sequences of instructions is not the next instruction scheduled to be provided. In this instance, the additional instruction cycle may be needed to set up a new address value for the random access memory which holds the microcode instructions and to read the target instruction.

It would be desirable to provide a stored-program controller which did not have a significant time penalty for either outcome of a conditional branch operation.

SUMMARY OF THE INVENTION

The present invention is embodied in a stored-program controller of a data processing system. The stored-program controller includes an addressable memory for holding a plurality of instruction values and an instruction decoder which, responsive to instruction values provided by said memory, controls processing circuitry in the data processing system. In response to an address value provided by the instruction decoding circuitry, two instruction values are read from the memory by circuitry internal to the stored-program controller. When the instruction held in the instruction decoding circuitry invokes a conditional branch operation, the value of a condition in processing circuitry external to the stored-program controller determines which of the two instructions read from the memory is the next instruction applied to the decoding circuitry.

BRIEF DESCRIPTION OF THE DRAWINGS

FIGS. 1A, 1B and 1C, referred to above, are diagrams showing the data formats of records produced by three data compression methods.

FIG. 3C is a diagram showing the data format of a microcode control word for the microcode RAM and sequencer used in the circuitry shown in FIG. 2.

FIGS. 7A, 7B, 7C, 7D and 7E are timing diagrams that are useful for explaining the operation of the data RAM circuitry shown in FIG. 6.

FIG. 8B is a block diagram of the multiplier used in the pixel interpolator shown in FIG. 8A.

FIGS. 9A, 9B, 9C, 9D, 9E and 9F are diagrams that are useful to explain the operation of the pixel interpolator shown in FIG. 8.

FIG. 10A is a block diagram of a statistical decoder suitable for use in the video signal processing circuitry shown in FIG. 2.

FIGS. 15 through 23 are control flow diagrams and other diagrams useful for explaining the operation of the circuitry shown in FIGS. 2-13.

DETAILED DESCRIPTION

Figure 2:
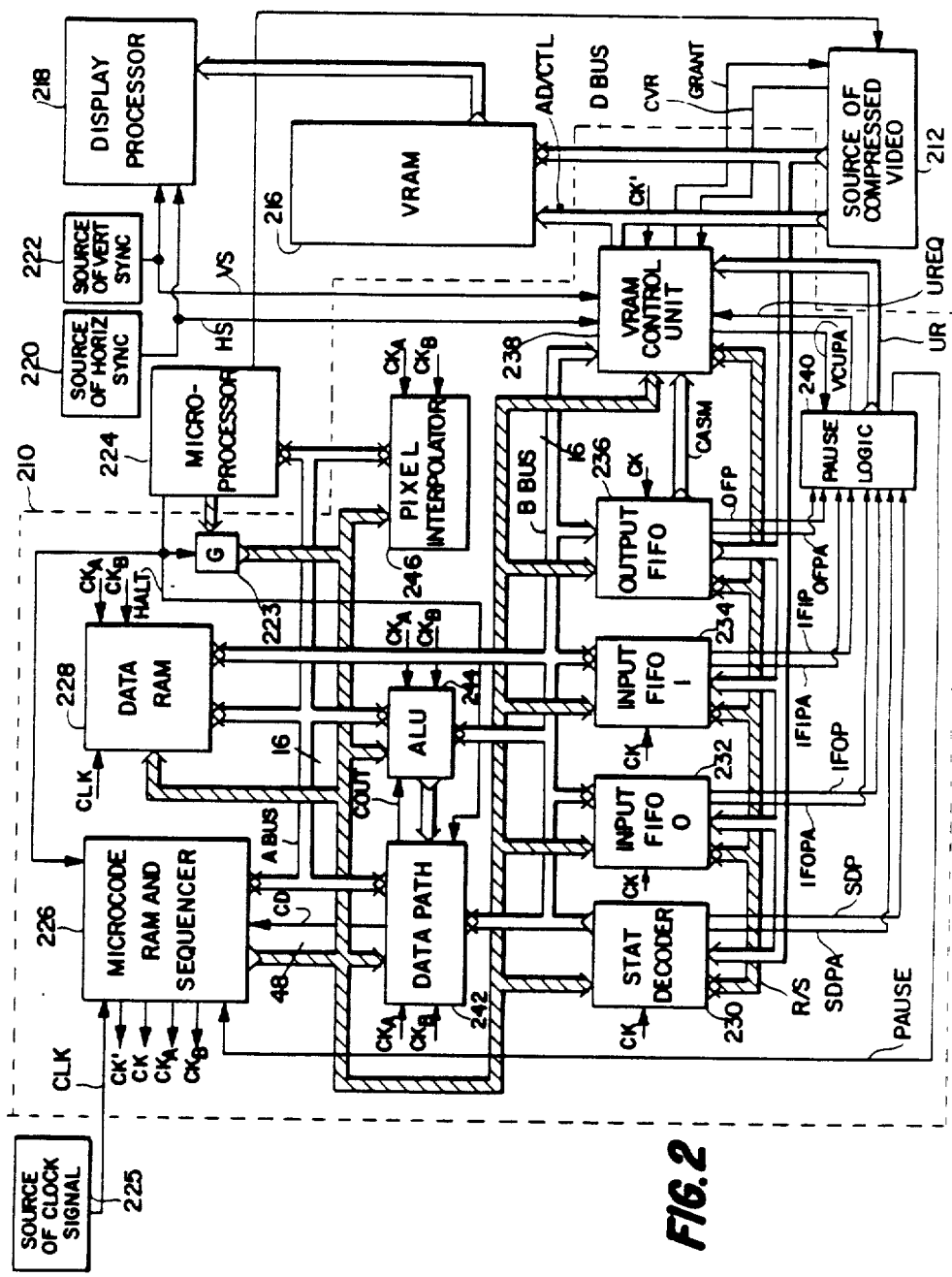
FIG. 2 is a block diagram of video signal processing circuitry which includes an embodiment of the present invention.

In the drawings, broad arrows represent busses for conveying multiple-bit parallel digital signals and line arrows represent connections for conveying analog signals or single bit digital signals. Depending on the processing speed of the devices, compensating delays may be required in certain of the signal paths. One skilled in the art of digital signal processing circuit design would know where such delays would be needed in a particular system.

FIG. 2 is a block diagram showing the video signal processing circuitry 210 and associated peripheral circuitry. In the present embodiment of the invention, the circuitry 210 is implemented as a single integrated circuit. The video signal processing system is described below briefly, with reference to FIG. 2 only, and then in greater detail with reference to FIGS. 2-13. A third section of this application refers to FIGS. 14-23 and describes how the various components of the system operate in parallel to convert compressed video data in formats such as those shown in FIGS. 1A, 1B and 1C into pixel values.

In FIG. 2, a source of compressed video signal 212 provides video signal data which has been compressed using one or more of the video signal compression techniques set forth above and which includes data that has been statistically encoded. In this embodiment of the invention, the data provided by the source 212 is applied to a video random access memory (VRAM) 216 under control of a VRAM control unit 238 that is internal to the video signal processor 210. The source 212 used in this embodiment of the invention is a compact disk read only memory (CD ROM). It continually provides the compressed data to the VRAM 216 in blocks of, for example, 32 bits each. The VRAM control unit 238 coordinates data access requests to the VRAM 216 from the source 212 and the circuitry 210 to ensure that all of the data provided by source 212 is written into the VRAM 216.

The VRAM 216 used in this embodiment of the invention is composed of 128 of the μPD41264 64K by 4-bit dual port random access memory integrated circuits manufactured by NEC Electronics Inc. The memory integrated circuits are arranged in a matrix having 16 rows and eight columns. In this configuration, the VRAM 216 provides 4 megabytes (MB) of storage, arranged as 1,048,576 words of 32 bits each.

A display processor 218 accesses the VRAM 216 via a serial output port to develop the active video portion of a displayed video signal. The video signal processing circuitry 210 and source of compressed video signals 212 access the data cells of the VRAM 216 via the standard input-output bus. All access to the VRAM 216 by the video signal processor 210 and display processor 218 is controlled by the VRAM control unit 238 of the circuitry 210.

Data held in the VRAM 216 is provided to the processing circuitry 210 by the statistical decoder 230 and by the input first-in-first-out (FIFO) circuits 232 and 234. Data is provided by the circuitry 210 to the VRAM 216 via the output FIFO circuitry 236. The data values provided by the statistical decoder 230 and the input FIFO's 232 and 234 are applied to data path circuitry 242, an arithmetic and logic unit (ALU) 244 and a data RAM 228 via a bidirectional data bus B BUS. The bus B BUS is also used to provide address values to the VRAM control unit 238. A second bidirectional bus, A BUS, is included in the circuitry 210 to provide an alternate means for passing data values among the data path circuitry 242, ALU 244 and data RAM 228, and to provide data to, and accept data from a pixel interpolator 246. In addition to the coupling set forth above, the data bus A BUS is connected to a microcode RAM and sequencer 226 and may be coupled to a microprocessor 224.

In general terms, the circuitry shown in FIG. 2 operates as follows. Compressed video signals, provided by the source 212, are written into the VRAM 216. These compressed video signals are accessed via the statistical decoder 230 and the input FIFO's 232 and 234 under control of the sequencing circuitry 226. The values provided by the decoder 230 and the FIFO's 232 and 234 are applied to the data path 242, ALU 244 and pixel interpolator 246, also under control of the sequencing circuitry 226, to expand the compressed video signals and generate pixel values that describe the encoded image. The generated pixel values are written into the VRAM 216 via the output FIFO 236 as a matrix having, for example, 240 rows and 256 columns. These correspond to 240 lines of a video signal where each line has 256 pixel values. This matrix is hereinafter referred to as a bit-map. The bit-map is read from the VRAM 216 by the display processor 218 to reproduce an image. The display processor 218 used with this embodiment of the invention converts the pixel values in the bit-map into a video signal and adds the required horizontal and vertical synchronization signals to enable the image to be reproduced on a raster scan display device. To coordinate transfers of data from the VRAM 216 to the display processor 218, a horizontal line synchronizing signal, HS, and a vertical field synchronizing signal, VS, are provided to the processors 210 and 218 by respective signal sources 220 and 222. In a preferred embodiment of the invention, these signals may be generated by the display processor 218.

In the present embodiment of the invention, a source of clock signal 225 provides a 25 MHz clock signal, CLK, to the microcode RAM and sequencer circuitry 226. The circuitry 226 generates signals CK and CK', each having a frequency of 12.5 MHz, a signal $CK_A$, having substantially the same frequency and phase as the signal CK, and a signal $CK_B$ which is substantially antiphasal to the signal CK. The clock signals CLK, $CK_A$ and $CK_B$ are applied to the data RAM 228. The signals $CK_A$ and $CK_B$ are applied to the data path 242, the ALU 244 and the pixel interpolator 246. The signal CK is applied to the statistical decoder 230, the input FIFO's 232 and 234, and to the output FIFO 236. The signal CK' is applied to the VRAM control unit 238.

To simplify the explanation of the circuitry shown in FIG. 2, it is assumed that the source of compressed video signals provides only encoded luminance signals and, thus, that the circuitry 210 builds only one bit-map, the luminance bit-map. In a practical system, additional bit-maps for color information signals, for example the I and Q color-difference signals, would be generated as well.

Figure 3A:
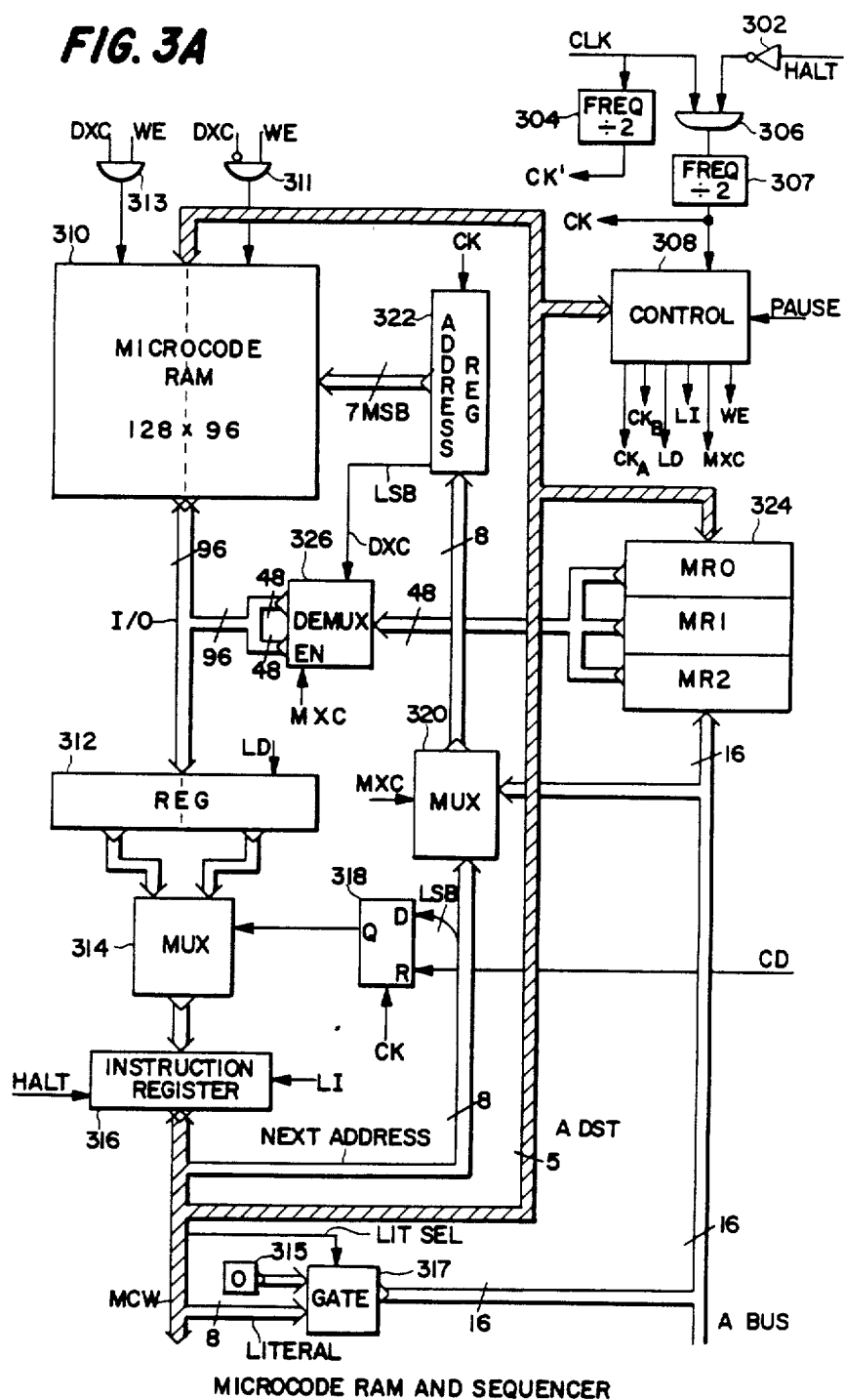
FIG. 3A is a block diagram showing circuitry, embodying the present invention, suitable for use as the microcode RAM and sequencing circuitry of the video signal processing circuitry shown in FIG. 2.

As set forth above, the central control element in the video signal processing circuitry 210 is the microcode RAM and sequencer circuitry 226. FIG. 3A is block diagram showing circuitry suitable for use as the microcode RAM and sequencer 226. The microcode RAM 310 is a conventional random access memory arranged as 128 words, each of which has 96 bits. In normal operation, the microcode RAM 310 provides a 96-bit word, addressed by the seven MSB's of an address value held in an address register 322, to the input port of a register 312. The register 312 is conditioned by a signal LD provided by control circuitry 308 to load the value applied to its input port. Each of the 96-bit values provided by the microcode RAM 310 contains two 48-bit microcode control words or instructions. One of these instructions, in the 48 MSB positions of the register 312, is applied to one input port of a multiplexer 314 and the other instruction, in the 48 LSB positions of the register 312, is applied to a second input port of the multiplexer 314. The multiplexer 314 is conditioned by a single-bit signal provided by a flip-flop 318 to pass one of the 48-bit instructions to the input port of the instruction register 316. The instruction register 316 loads the microcode control word applied to its input port in response to a signal LI provided by the control circuitry 308.

The individual bits of the instruction register 316 are connected, via a bus MCW, to control input terminals of each of the components of the video signal processing circuitry 210. As the microcode control words provided by the microcode RAM 310 sequence through the instruction register 316, the individual components of the circuitry 210 are conditioned to perform operations which, in concert, convert the compressed video data into bit-map pixel data. The function of each bit of the microcode control word is described below in reference to FIG. 3C.

The clock signals CK and CK' used by the video signal processor 210 are generated by circuitry included in the microcode RAM and sequencer 226. The 25 MHz clock signal CLK provided by the source 225 is applied to frequency dividing circuitry 304 which divides the frequency of the signal CLK by two to produce the 12.5 MHz clock signal CK'. The signal CLK is further applied to one input terminal of an AND gate 306, the other input terminal of which is coupled to an inverter 302 to receive an inverted version of a signal HALT, provided by the microprocessor 224. The output signal of the AND gate 306 is applied to frequency dividing circuitry 307 which divides its frequency by two to produce the 12.5 MHz clock signal CK. When the signal HALT has a logic zero value, the signal CK is a 12.5 MHz square-wave oscillatory signal. When the signal HALT changes to a logic one, however, the state of the signal CK is frozen at logic-one or logic-zero, its state when the change in the signal HALT occurred.

As set forth below, the eight LSB's of the microcode control word define the NEXT ADDRESS field. In any microcode control word, this field contains the address, in the microcode RAM 310, of the next microcode control word to be loaded into the instruction register 316. The value held in the NEXT ADDRESS field is applied to the address register 322 via a multiplexer 320. The LSB of the NEXT ADDRESS value is applied to the input terminal D of the flip-flop 318. The address register 322 and the flip-flop 318 are conditioned, by the signal CK, to load the values applied to their respective input ports.

A signal CD, provided by the data path circuitry 242, as set forth below, is coupled to the reset input terminal, R, of the flip-flop 318. The value of the signal CD is controlled by the condition code select (COND CODE SEL) field (described below) of the microcode control word. This signal is used in the microcode RAM and sequencing circuitry 226 to conditionally change the sequence of microcode control words applied to the instruction register 316. The signal CD represents a condition that occurred earlier in the signal processing, for example, that the output value of the ALU 244 is zero. When the selected condition is true the output signal, Q, provided by the flip-flop 318 becomes a logic-zero. This value conditions the multiplexer 314 to pass the value held in the 48 LSB positions of the register 312 to the instruction register 316.

To understand how this circuitry may be used to conditionally change the control flow of the microcode RAM and sequencer circuitry 226, in other words to perform a conditional branch operation, assume that a microcode control word A has a non-zero value in its COND CODE SEL field and a value of 81 in its NEXT ADDRESS field. When this microcode control word is loaded into the instruction register 316, the eight-bit value in the NEXT ADDRESS field is applied to the address register 322 and the microcode control words at addresses 80 and 81 in the microcode RAM 310 are loaded into the register 312. If the value of the condition signal, CD, is logic-zero, the microcode control word occupying the 48 MSB positions (address 81) of the register 312 is the next to be used. Otherwise, the microcode control word occupying the 48 LSB positions (address 80) of the register 213 is next. Each of these instructions has a distinct NEXT ADDRESS field and, so, each defines a different sequence of microcode control words, that is to say, a different functioning of the video signal processor 210. Since the microcode RAM 310 provides the next instruction for both possible values of the condition code, no time is lost in fetching the next microcode control word once the value of the condition is determined.

The microcode RAM and sequencer circuitry 226 is able to load microcode control words, supplied via the bus A BUS, into the microcode RAM 310. Three 16-bit values, each representing one-third of a microcode control word, are successively applied to three registers 324. The first 16-bit value is stored into the register MR0, the second, into the register MR1 and the third, into the register MR2. Next, an address value, which may also be provided by the VRAM 216 via the input FIFO 232 and data RAM 228, is applied to the address register 322. The LSB of this address value, the signal DXC, conditions a demultiplexer 326 to apply the 48-bit value provided by the three registers MR0, MR1 and MR2 either to the 48 MSB positions or to 48LSB positions of the I/O bus for the microcode RAM 310. At the same time, a write enable signal, WE, is pulsed to condition the RAM 310 to store the 48-bit value into the addressed memory cell.

The microcode control words written into the microcode RAM 310 by these operations are provided from the VRAM 216 via, for example, the input FIFO 232 and data RAM circuitry 228. This ability to load microcode instructions from the VRAM 216 allows the source of compressed video 212 to provide both compressed data and the instructions needed to decompress it to the video signal processor 210. Initially, a bootstrap program may be loaded into the microcode RAM 310 by the microprocessor 224 which may take control of the processor 210 as set forth below. Responsive to the instructions in this bootstrap program, the microcode RAM and sequencer circuitry 226 loads the instructions from the VRAM 216 which enable the processor 210 to decode the compressed video data.

Figure 3B:
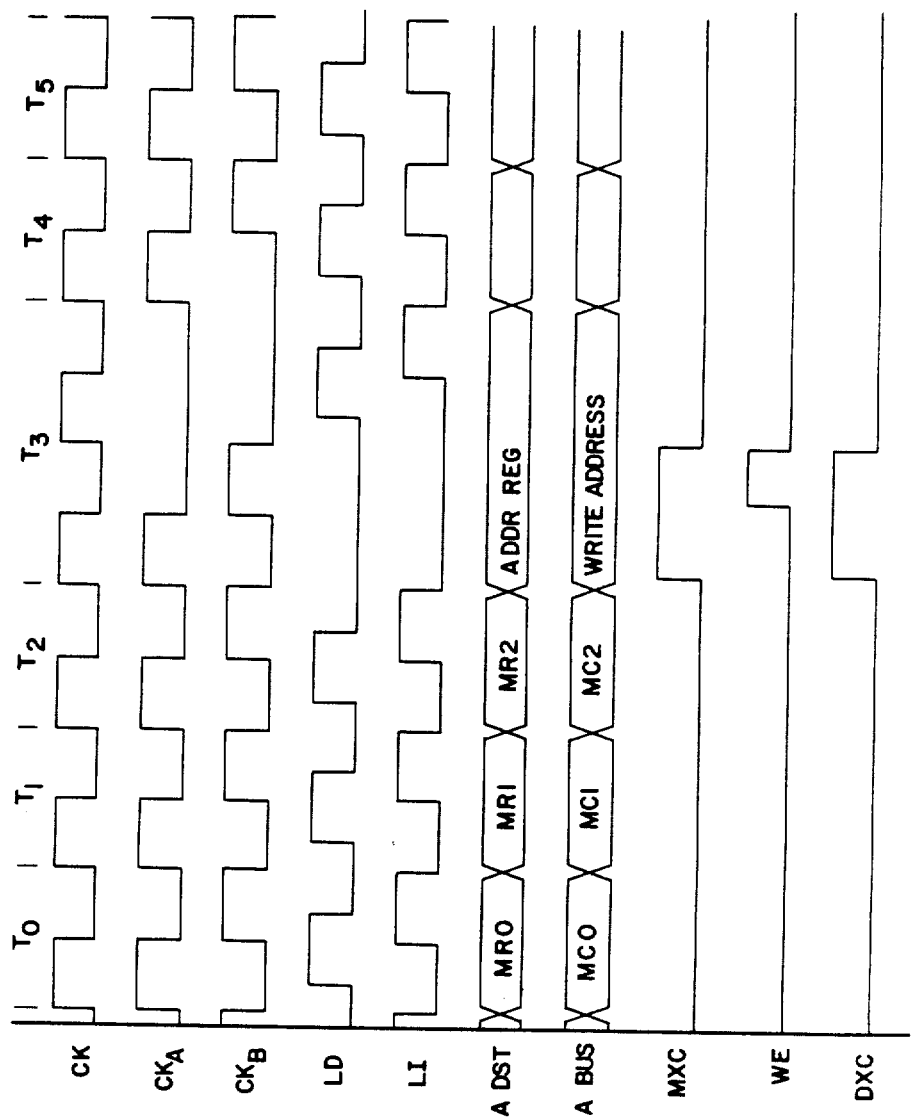
FIG. 3B is a timing diagram showing signal amplitudes as a function of time for several signals that are useful in explaining the operation of the circuitry shown in FIG. 3A.

FIG. 3B is a timing diagram which illustrates the operation of the microcode RAM and sequencing circuitry 226 when a microcode control word, MC, is stored into the microcode RAM 310. In the timing diagram, the symbols $T_0$ through $T_5$ represent six microcode instruction cycles. Each instruction cycle begins and ends on a positive-going transition of the signal $CK_A$.

During the instruction cycle $T_0$, the microcode control word held in the instruction register 316 has a value (e.g. 8) in its A DST field indicating that the 16-bit value conveyed by the bus A BUS is to be stored into the register MR0. In this instruction cycle, the value MC0, the 16 LSB's of the microcode control word MC, is gated onto the bus A BUS by, for example, the data RAM circuitry 228. During the instruction cycle $T_0$, the register MR0 is conditioned by the value of the signal A DST to store the 16-bit value MC0 provided by the bus A BUS. The store operation occurs coincident with the negative-going transition of the signal $CK_A$, at the midpoint of the instruction cycle $T_0$. At substantially the same time that the value MC0 is stored into the register MR0, the value in the NEXT ADDRESS field of the microcode control word in the instruction register 316 is stored into the address register 322 and the LSB of this address value is stored into the flip-flop 318. The value stored in the address register 322 conditions the microcode RAM 310 to apply a 96-bit value, which includes the next instruction, to the register 312. This 96-bit value is loaded into the register 312 coincident with the negative-going transition of the signal LD which occurs slightly after the midpoint of the instruction cycle $T_0$. Responsive to the single-bit value held in the flip-flop 318, the addressed 48-bit microcode control word is applied to the input port of the instruction register 316. This microcode control word is loaded into the instruction register 316 coincident with the negative-going edge of the signal LI, occurring at the end of the instruction cycle $T_0$. During the instruction cycle $T_1$, the newly loaded microcode control word conditions the register MR1 to load a value MC1, representing the middle 16-bits of the microcode control word MC. In the same manner, a microcode control word loaded into the instruction register 316 at the end of the instruction cycle $T_1$, conditions the register MR2 to load the 16 MSB's of the microcode control word MC during the instruction cycle $T_2$.

The microcode control word loaded into the instruction register 316 at the end of the instruction cycle $T_2$ controls the transfer of the microcode control word MC from the registers 324 to the microcode RAM 310. The address used to store the microcode control word MC is provided via the bus A BUS. At the start of the instruction cycle $T_3$, the A DST field of the microcode control word in the instruction register 316 has a value of 11, indicating that the 16-bit value provided by the bus A BUS is to be loaded into the address register 322. Responsive to this value in the A DST field, the control circuitry 308 applies a logic-one value, as the signal MXC to the multiplexer 320 for approximately one cycle of the signal CK. This signal conditions the multiplexer 320 to apply the 8 LSB's of the value provided by the bus A BUS to the input port of the address register 322. This address value is loaded into the register 322 coincident with the first negative-going transition of the signal CK in the instruction cycle $T_3$. The LSB of the value held in the address register 322, the signal DXC, is applied to a control input terminal of a demultiplexer 326. The demultiplexer 326 is conditioned by the signal DXC having values of logic-one or logic-zero to gate the 48-bit value provided by the registers 324 onto the respective 48 MSB positions or 48 LSB positions of the I/O bus.

The signal DXC is also used to generate a separate write enable signal, via AND gates 311 and 313, for each half of the microcode RAM 310. As set forth above, the microcode RAM 310 is configured as 128 words where each word has 96 bits. This memory is divided into two halves. The left half contains the 48 MSB's of the 128 words and the right half contains the 48 LSB's of the 128 words. The signal DXC is combined, in the AND gate 313, with the write enable signal WE, provided by the control circuitry 308 to generate the write enable signal for the left half of the microcode RAM 310. The signal DXC is inverted and then logically ANDed with the signal WE by the gate 311 to produce the write enable signal for the right half of the microcode RAM 310.

In the present example, the signal DXC has a value of logic one for approximately one period of the signal CK at the start of the instruction cycle $T_3$. Consequently, the microcode control word MC is written into the 48 MSB positions of the cell in the microcode RAM 310 that has the address value represented by the seven MSB's value held in the address register 322. The microcode control word is written into the microcode RAM 310 coincident with the signal WE shown in FIG. 3B.

Since the instruction cycle $T_3$ performs a memory write operation, the next microcode control word is not loaded into the instruction register 316 during the first period of the signal CK. This operation occurs during the second period of the signal CK in the instruction cycle $T_3$. Coincident with the second positive-going transition of the signal CK during the instruction cycle $T_3$, the value of the signal MXC is changed to logic zero, and an instruction fetch operation proceeds as set forth in reference to the instruction cycle $T_0$. The microcode RAM and sequencing circuitry 226 operates in the manner described in reference to the instruction interval $T_0$ for the instruction cycles $T_4$ and $T_5$.

In the example set forth in FIG. 3B, the signals LD and LI are inhibited during the first half of the instruction cycle $T_3$ to prevent erroneous microcode control words from being loaded into the registers 312 and 316. In addition, the signals $CK_A$ and $CK_B$ are frozen by the control circuitry 308 during the second half of the instruction cycle $T_3$ to put the video signal processing circuitry in a paused state. This is done to maintain synchronous operation among the ALU 244, data RAM 228 and pixel interpolator 246. Since the clock signals $CK_A$ and $CK_B$ are disabled during the second half of the instruction cycle $T_3$, the internal states of the ALU 244, data RAM 228 and pixel interpolator 246 do not change in this time period.

In the present embodiment of the invention, a data read operation and a data write operation for the microcode RAM 310 occur during separate periods of the signal CK. Alternatively, the microcode RAM and sequencing circuitry 226 may be designed to perform both operations in a single period of the signal CK.

The control circuitry 308 is also responsive to a signal PAUSE provided by the pause logic 240 to freeze the clock signals $CK_A$ and $CK_B$. In addition, the control circuitry 308 is responsive to a signal, HALT, provided by the microprocessor 224 to inhibit the signal CK, effectively freezing the internal state of the entire video signal processor 210 except for the VRAM control unit 238.

Using the signal HALT, the microprocessor 224 may effectively assume the control functions of the video signal processor 210. The signal HALT is applied to the instruction register 316 to condition that register to accept data from the bus MCW, provided by the microprocessor 224 via the gating circuitry 223. The microprocessor 224 causes the register 316 to load the applied microcode control word by changing the signal HALT from a logic-one to a logic-zero. During the next period of the clock signal CK after this change, the microcode RAM and sequencer circuitry 226 causes this microcode instruction to be executed. At the completion of this clock period, the microprocessor 224 again changes the signal HALT to a logic-one value and applies another microcode instruction to the register 316. By operating in this manner, the microprocessor 224 may cause the microcode RAM and sequencer circuitry 226 to write data into any register connected to the busses A BUS or B BUS or to load a bootstrap program as set forth above. In addition, by virtue of its connection to the bus A BUS and of a bus gate 520, described below in reference to FIG. 5, the microprocessor 224 may read the contents of any register or either of the busses A BUS or B BUS.

FIG. 3C is a diagram showing the format of a microcode control word or instruction used by the microcode RAM and sequencing circuitry 226. The control word contains 13 fields. Each field is described below in terms of the values that the field may have and the effect of these values on the various components of the video signal processor 210. The structure of the controlled components is described below in reference to the various FIGS. 4–13.

Bits 0–7 of the microcode control word form the NEXT ADDRESS field. The value represented by these bits is the address, in the microcode RAM 310, of the next microcode control word to be loaded into the instruction register 316. During a given microcode instruction cycle, the value represented by this field is stored in the microcode address register 322.

The condition code select field, COND CODE SEL, occupies bits 8–10 of the microcode control word. These three bits select one of the condition values held by a condition register in the data path circuitry 242, described below. The selected condition value, is the signal CD. This signal is used to perform a conditional branch operation. As set forth above, a conditional branch is a change in the sequence of microcode control words applied to the instruction register 316, which occurs only when a selected condition is met (i.e., when CD is logic-one). Table 1 lists the condition code selection values and their corresponding descriptions.

TABLE 1

| Value in COND CODE SEL Field | Description of the Selected Condition |
|---|---|
| 0 | NULL, no conditional branch |
| 1 | ALU carry out flag |
| 2 | ALU overflow flag |
| 3 | ALU output value is negative |
| 4 | ALU output value is zero |
| 5 | the value of the loop counter in the data path 242 is zero |
| 6 | the LSB of the register RO in the data path 242 |
| 7 | the MSB of the register RO in the data path 242 |

The bits 11–29 of the microcode control word contain four fields which control how data values are transferred between the various components of the circuitry 210 via the busses A BUS and B BUS. Bits 11–15 are the A SRC field. This field indicates which of the components, or registers within a component, acts as a source by providing an output value to the bus A BUS. Bits 16–20 of the microcode control word are the A DST field. This field indicates which of the components, or registers within a component, acts as a destination by accepting the value on the bus A BUS as its input value. Similarly, the field B SRC, bits 21–24, and B DST, bits 25–29, determine which components of the circuitry 210 respectively provide values to and accept values from the bus B BUS. The busses A BUS and B BUS may convey both data and control information to the various components of the video signal processor 210. The registers which may be coupled to the busses A BUS and B BUS and the control information conveyed by these busses are described below in reference to the appropriate component of the circuitry 210.

In general, the registers coupled to the busses A BUS and B BUS include conventional decoding circuitry (not shown) which is coupled to one of the fields A SRC, A DST, B SRC or B DST of the microcode control word. This decoding circuitry produces a logic one value when the control value which allows access to the register is detected. The decoding circuitry that is responsive to the A SRC field is inhibited by a value of logic-one in the LIT SEL field, bit 31, of the microcode control word. When this bit is logic-one, the value in the A SRC field is not a valid A SRC value but a portion of an eight-bit literal value as described below. For the registers controlled by the fields A SRC and B SRC, the output value of decoding circuits is coupled to an output enable input terminal of the register. A logic-one value applied to this input terminal conditions the register to apply its stored value to the appropriate bus and a logic-zero value conditions the register to present a high-impedance to the bus. For the registers controlled by the fields A DST and B DST, the output value of the decoding circuitry is coupled to a data-load input terminal of the register. These registers are conditioned to load the value conveyed by the appropriate bus while the signal provided by the decoding circuits has a logic-one value.

Bit 30 of the microcode control word is the field DEC LOOP CTR. When this field has a value of 1, the loop counter in the data path circuitry 242 is conditioned to decrement its value during the microcode instruction cycle.

Bit 31 of the microcode control word is the field LIT SEL. A value of 1 in this field conditions the microcode RAM and sequencing circuitry 226 to treat the bits 8–15 of the current microcode control word as a literal value. This value is applied as a source value to the eight LSB positions of the bus A BUS via the gate circuitry 317 which is enabled by the bit 31 of the microcode control word. A zero value, from a digital value source 315, is applied to the eight MSB positions on the bus A BUS when the literal value is selected.

Bit 31 of the microcode control word is further coupled to any of the registers which may use the bus A BUS as a source, as set forth above, and to the condition code logic 518 of the data path circuitry, described below.

Bit 32 of the microcode control word is the INT μP field. When this bit has a logic-one value, the microprocessor 224 is interrupted. This control function may be used, for example, to signal the microprocessor 224 that a certain microcode instruction sequence has been completed.

Bit 33 of the microcode control word is the LATCH COND CODE field. When this field has a value of 1, the data path circuitry 242 latches the values of the various conditions produced by the ALU 244 into the condition code register. This control function is generally included in an instruction preceding the instruction which selects a condition for a conditional branch operation.

Bits 34 and 35 of the microcode control word are the SHIFT CONT field. This field controls bit shifting operations which are performed by the register RO of the data path circuitry 242. Table 2 describes the function performed by the register RO in response to the various values of the SHIFT CONT field.

TABLE 2

| Value | Function |
|---|---|
| 0 | No shift |
| 1 | Shift all bits one bit position toward the LSB. The MSB of the value before the shift operation is copied into the MSB position of the value produced by the shift operation. |
| 2 | Shift all bits one bit position toward the MSB. The LSB of the shifted value is zero. |
| 3 | Exchange the upper and lower bytes of a value applied to the register RO during the current instruction cycle. |

Bits 38–46 of the microcode control word determine the function of the ALU 244 during the microcode instruction cycle. Bit 47 is unused. To understand the function of the ALU 244 it is helpful to first describe its structure. The ALU 244 shown in FIG. 4A consists of five parts, two operand input registers, 410 and 412, arithmetic and logic circuitry (ALC) 414, an output register 416 and a demultiplexer 418. Register 412 is connected to the bus B BUS and is enabled by a value of 1 in bit 36 of the microcode control word, provided via the bus MCW, to load a value from the bus B BUS. Register 410 is connected to the bus A BUS and is enabled to load a value from that bus by a value of 1 in bit 37 of the microcode control word. The ALC 414 performs various arithmetic and logical operations on the values held in the register 410 and 412. The operation performed during any one instruction cycle is controlled by the nine-bit value held in the field ALU 0P CODE, bits 38–46 of the microcode control word, which are provided to the ALU via the bus MCW. In this nine-bit field, the value held in bits 38–44 determine the function performed by the ALU according to Table 3. In Table 3, A and B represent values held in the latches 410 and 412, respectively, and CIN represents is the value applied to the carry-in input terminal, CIN, of the ALC 414.

TABLE 3

| Value of bits 38–44 | Operation |
|---|---|
| 31 | A OR B |
| 32 | 0 |
| 33 | NOT A |
| 34 | No operation |
| 36 | NOT B |
| 47 | A XOR B |
| 65 | NOT A + CIN |
| 67 | A + CIN |
| 68 | NOT B + CIN |
| 71 | A − B − NOT CIN |
| 76 | B + CIN |
| 77 | B − A − NOT CIN |
| 79 | A + B + CIN |
| 85 | A AND B |

In the above table, 'NOT' indicates a ones complement operation and 'XOR' indicates an EXCLUSIVE OR operation.

Bits 45 and 46 of the microcode control word are applied to a multiplexer 420 via the bus MCW to change the carry in signal, CIN, and to change the ADD operation (opcode 79) to a dual-ADD-with-saturate operation. When the bits 45 and 46 are both zero valued or when bit 45 is zero and bit 46 is one, the multiplexer 420 applies a value of zero from a digital value source 422 as the signal CIN. When bit 45 is one and bit 46 is zero, the multiplexer 420 applies a value of one from a digital value source 424 as the signal CIN. If both bit 45 and bit 46 have values of one, the CIN input value provided by the multiplexer 420 is the carry out condition value, COUT, provided by the condition code register of the data path circuitry 242.

Figure 4A:
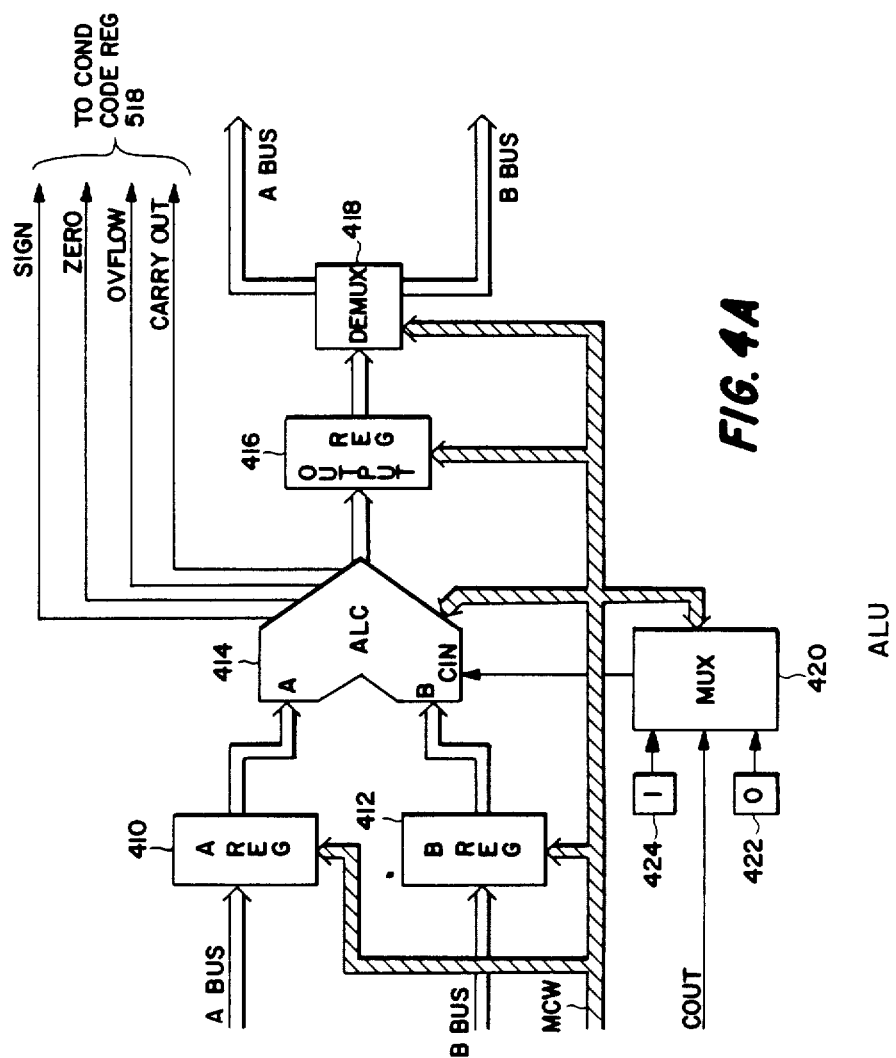
FIG. 4A is a block diagram of the arithmetic and logic unit used with the embodiment of the invention shown in FIG. 2.
Figure 4B:
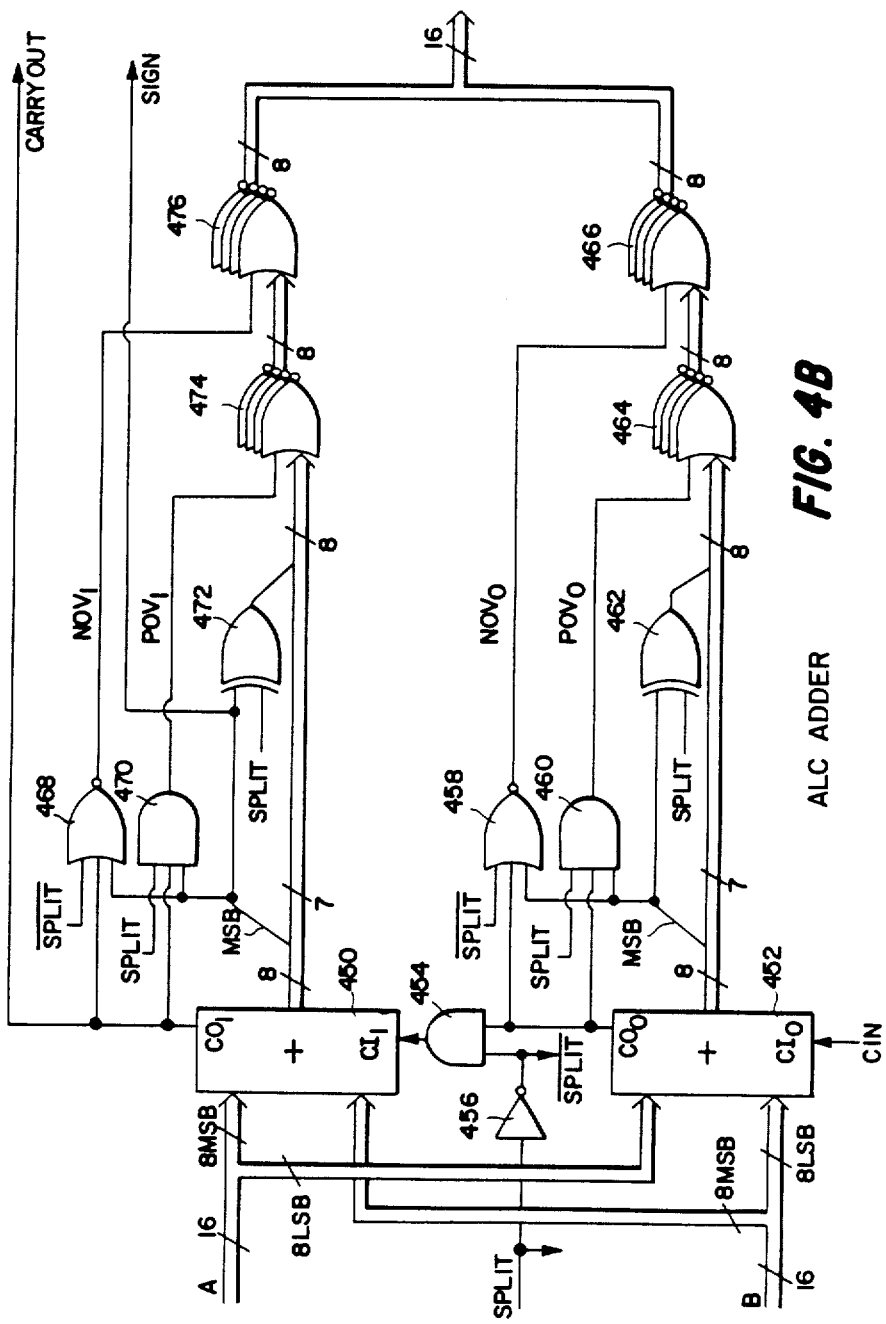
FIG. 4B is a partial block diagram of the arithmetic and logic circuitry shown in FIG. 4A.

The signal CARRY OUT produced by the ALC 414 is the carry out signal provided by the MSB stage of the 16-bit adder shown in FIG. 4B. The signal SIGN is the MSB of the 16-bit result produced by the ALC 414. The signal OVERFLOW is a logical combination of the sign bits of the two input values applied to the ALC 414 and the sign bit of the output value produced by the ALC 414. This signal has a logic-one value when two negative input values produce a positive output value or when two positive input values produce a negative output value. For all other combinations of the three sign bits, the signal OVERFLOW has a logic-zero value.

The ADD operation becomes a dual-ADD-with-saturate operation when bit 45 is zero and bit 46 is one. In the dual-ADD-with-saturate operation, each of the 16-bit registers 410 and 412 is treated as containing two eight-bit values. The eight MSB's of the value held in the register 410 are added to the eight MSB's of the value held in register 412 and the result is stored in the eight MSB's of the output register 416. Likewise, the eight LSB's of the values held in the registers 410 and 412 are summed and the result stored in the eight LSB's of the register 416. Neither of these ADD operations can produce an overflow condition. Instead, circuitry in the ALC 414 saturates the sum. If the input values to the dual addition operation are such that either the eight LSB sum or the eight MSB sum would produce a negative overflow condition or a positive overflow condition, the value provided for the sum is saturated at 0 or 255 respectively, the smallest and largest values that may be represented by an eight-bit unsigned binary value.

To switch between providing a conventional ADD and a dual-add-with-saturate operation, an unconventional adder is used by the ALC 414.

FIG. 4B is a block diagram of an adder which is suitable for use in the ALC 414. Conventional 16-bit arithmetic and logic circuitry would include a 16-bit adder capable of summing two 16-bit two's complement numbers and a carry-in signal to produce a 16-bit two's complement output value and a carry-out signal. The circuitry shown in FIG. 4B is responsive to a signal, SPLIT, to operate as a conventional 16-bit two's complement adder, when SPLIT is zero or, as two independent eight-bit adders, in the dual-add-with-saturate mode described above, when SPLIT is one.

In FIG. 4B, the two 16-bit input values applied to the input ports A and B of the ALC 414 are each split into an eight-MSB portion and an eight-LSB portion. The eight MSB portions of the A and B input values are applied to respectively different input ports of an adder 450. The eight LSB portions of the A and B values are applied to respectively different input ports of an adder 452. The adders 450 and 452 used in this embodiment of the invention are conventional eight-bit two's complement adders. The carry-in input signal to the adder 452 is the signal CIN applied to the ALC 414. The carry-in input signal to the adder 450 is provided by an AND gate 454. This signal is the logical AND of a carry-out signal, $CO_o$, provided by the adder 452 and a signal $\overline{SPLIT}$, a logically inverted version of the signal SPLIT, provided by an inverter 456. The signal in the MSB position of the eight-bit output signal provided by the adder 450 is the condition signal SIGN, indicating the polarity of the value provided by the ALC adder 414. The carry out signal, $CO_1$ of the adder 450 is the signal CARRY OUT provided by the ALC 414.

The eight-bit value provided by the adder 450 is the two's complement sum of the eight MSB's of the values applied to the input ports A and B of the ALC 414. The MSB of this output value is applied to one input terminal of an exclusive OR gate 472, the other input terminal of which is coupled to receive the signal SPLIT. The output signal provided by the exclusive OR gate 472 is concatenated to the seven LSB's of the value provided by the adder 450 to develop an eight-bit modified sum. When the signal SPLIT is zero, the modified sum is an eight-bit two's complement value representing the sum of two eight-bit two's complement values. When the signal SPLIT is one, however, the modified sum is an eight-bit unsigned binary value representing the sum of an eight-bit unsigned binary value and an eight-bit offset-128 binary value.

The change in the type of input values applied to the ALC adder is not a function of the adder circuitry but a convention established for programming the video signal processor 210. By this convention, when the signal SPLIT has a value of zero, the values applied to the ALC adder are conventional 16-bit two's complement values. When the signal SPLIT has a value of one, however, one of the values applied to each of the adders 450 and 452 is an eight-bit unsigned binary value and the other value is an eight-bit value in off set-128 notation. These values may be provided by any register in any device which may act as a source for the busses A BUS or B BUS.

When the signal SPLIT is one, the eight-bit unsigned binary input value may occupy a range of values between 0 and 255 and the offset 128 value may occupy a range of values between −128 and +127, respectively. Thus, the modified sum may represent values between −128 and 382, inclusive. However, since the modified sum in this mode is an eight-bit unsigned binary number, only the values between 0 and 255 are valid. The ALC adder shown in FIG. 4B includes circuitry to detect values outside of this valid range and to saturate, or limit, the value of the modified sum to zero, for values less than zero and to 255 for values greater than 255.

An AND gate 470 develops a positive overflow signal $POV_1$ which indicates that the value of the modified sum is greater than 255. The three input signals to the AND gate 470 are the signal SPLIT, the carry-out signal, $CO_1$, from the adder 450, and the MSB of the eight-bit value provided by the adder 450. The signal POVI is zero when the signal SPLIT is zero or when the signal SPLIT is one and the value of the modified sum is less than 256. The signal $POV_1$ is applied to one input terminal of each of eight NOR gates 474. The other input terminal of each of the NOR gates 474 is coupled to receive a respectively different one of the eight bits of the modified sum.

A NOR gate 468 is responsive to the signal $\overline{SPLIT}$, the signal $CO_1$, and the MSB of the eight-bit value provided by the adder 450 to generate a negative overflow signal, $NOV_1$ This signal indicates that the modified sum has a value less than zero. The signal $NOV_1$, is coupled to one input terminal of each of eight NOR gates 476. The other input terminal of each of the NOR gates 476 is coupled to receive a respectively different one of the signals provided by the eight NOR gates 476. The eight output signals of the NOR gates 476 are the eight MSB's of the 16-bit output signal of the ALC adder.

The adder 452 is coupled to value limiting circuitry that is identical to that described above. The eight output signals of eight NOR gates 466, which correspond to the NOR gate 476, are the eight LSB's of the 16-bit output signal of the ALC adder.

When the bits 45 and 46 of the microcode control word have respective values of zero and one, the signal SPLIT is 1 and the ALC adder is conditioned to operate in its dual-add-with-saturate mode. For all other combinations of values of the bits 45 and 46 of the microcode control word, the signal SPLIT is 0 and the ALC adder is conditioned to operate as a conventional 16-bit two's complement adder.

The following is an explanation of the operation of the ALC adder in each of its two modes. When the signal SPLIT is 0, the AND gate 454 is conditioned to apply the carry-out signal from the output terminal $CO_0$ of the adder 452 to the carry-in input terminal $CI_1$ of the adder 450 configuring the adders 450 and 452 as one 16-bit two's complement adder. The zero valued SPLIT signal applied to the exclusive OR gates 462 and 472 conditions these gates to pass, unchanged, the MSB's of the eight-bit output values provided by the respective adders 452 and 450 to the respective NOR gates 464 and 474. The zero-valued signal SPLIT applied to the AND gates 460 and 470 condition these gates to apply zero-valued positive overflow signals $POV_0$ and $POV_1$, respectively, to the respective NOR gates 464 and 474. In the same manner, the logic-one valued $\overline{SPLIT}$ signal applied to the NOR gates 458 and 468 condition these gates to apply zero-valued negative overflow signals, $NOV_0$ and $NOV_1$, respectively, to the respective NOR gates 466 and 476. The effect of the zero-valued signals $POV_0$ and $NOV_0$ applied to the NOR gates 464 and 466 is to invert the output value provided by the adder 452 twice and, so, provide the value at the output port of the adder 452 as the eight LSB's of the 16-bit value provided by the ALC circuit. The same is true for the 8 MSB value provided by the adder 450 to the output port of the ALC adder via the NOR gates 474 and 476.

When the signal SPLIT has a logic-one value, the signal $\overline{SPLIT}$, provided by the inverter 456, has a logic-zero value and the AND gate 454 is inhibited from passing the carry-out signal from the adder 452 to the carry-in input terminal, CI, of the adder 450. This configures the adders 450 and 452 as two separate eight-bit adders. The logic-one signal SPLIT applied to the exclusive or gates 462 and 472 condition these gates to logically invert the MSB's of the respective eight-bit values provided by the adders 452 and 450. The MSB is inverted so that the eight-bit unsigned binary values produced by each of the adders 452 and 450 properly represent the sum of an eight-bit unsigned binary value and an offset-128 binary value.

When the signal SPLIT has a logic-one value, the AND gates 460 and 470 are enabled to produce the respective positive overflow signals $POV_0$ and $POV_1$ and the NOR gates 458 and 468 are enabled to produce the respective negative overflow signals $NOV_0$ and $NOV_1$. When the negative overflow signal $NOV_1$ is a logic-one, the output signals of the eight NOR gates 476 all become logic-zero and the value of the most significant byte of the value produced by the ALC adder is zero. When the signal $POV_1$ is a logic-one, the output values of the eight NOR gates 474 all become logic-zero. These signals are inverted by the NOR gates 476. Thus, the 8 MSB's of the output value of the ALC adder all have values of logic-one. This corresponds to an unsigned binary value of 255. The same analysis holds for the signals $NOV_0$ and $POV_0$ applied to the respective NOR gates 466 and 464.

The result obtained by performing any of the operations shown in Table 3 is stored in the output register 416. This register may be coupled to one or both of the busses A BUS and B BUS by the demultiplexing circuitry 418, in response to appropriate values in the fields A SRC and B SRC of the microcode control word.

The ALC used in this embodiment of the invention is exemplary. One skilled in the art of digital logic design may design and build alternative circuitry capable of performing equivalent operations to those described above.

The input registers 410 and 412 of the ALU access the respective busses A BUS and B BUS independently of the bus source and destination fields, A SPC, A DST, B SRC and B DST, of the microcode control word. Consequently, in one operation, the microcode RAM and sequencing circuitry 226 can direct that data values be transferred from a source to a destination on each of the busses A BUS and B BUS, while simultaneously directing the ALU to perform an operation on one or both of the data values being transferred.

Figure 5:
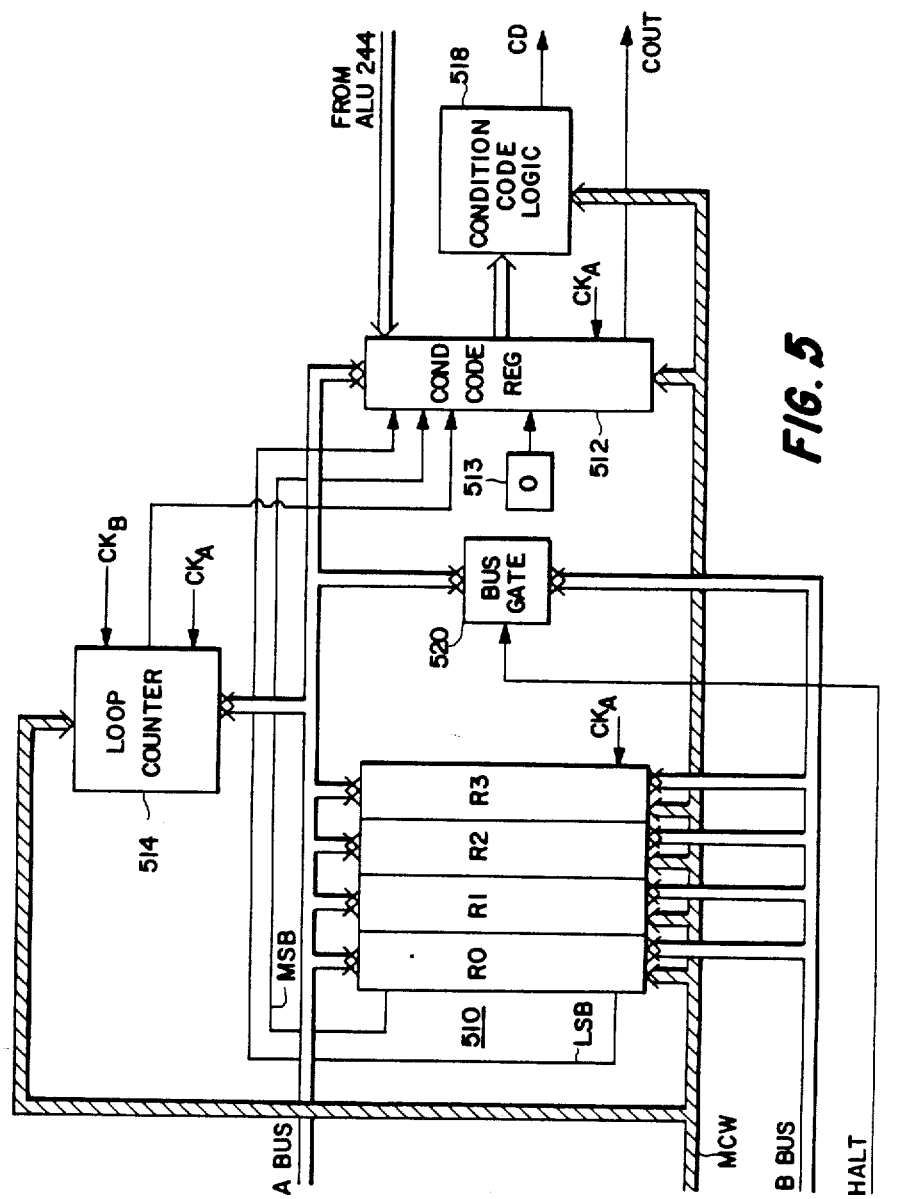
FIG. 5 is a block diagram of the data path circuitry used in the embodiment of the invention shown in FIG. 2.

One source of input values to the ALU 244 and a destination for output values from the ALU 244 is a register file 510 in the data path circuitry 242. FIG. 5 is a block diagram of the data path circuitry 242 used in the present& embodiment of the invention. The register file 510 used in this exemplary embodiment includes four general purpose registers: R0, R1, R2 and R3. Each of these registers is coupled to both of the busses A BUS and B BUS. Under control of the fields A SRC and B SRC of the microcode control word, provided via the bus MCW, any one of these register may be enabled to apply a value to either one or both of the busses. However, responsive to the fields A DST and B DST, a register can serve as the destination for only one of the busses A BUS and B BUS during any one microcode instruction cycle. As set forth above, the register R0 includes circuitry responsive to the SHIFT CONT field of the microcode control word to shift the contents of the register to bit positions of greater or less significance or to swap the eight MSB's and eight LSB's of a value applied to the register.

The MSB and LSB of the register R0 are connected to respectively different input terminals of the condition code register 512. In addition to these values, the condition code register is coupled to receive a zero value from a digital value source 513, the condition values SIGN, ZERO, OVFLOW, and CARRY OUT provided by the ALU 244 and a condition value which indicates that the value held by a loop counter 514 is zero. The condition code register is responsive to the LATCH COND CODE field of the microcode control word to store the values of the conditions produced by the ALU 244 at the end of a microcode instruction cycle. Other condition codes are latched into the condition code register 512 asynchronously as they occur.

The condition code logic 518 is responsive to the COND CODE SEL field of the microcode control word to select one of the condition values held in the condition code register 512 as the condition signal, CD, to be used to perform a conditional branch operation in the microcode RAM and sequencing circuitry 226, as set forth above. The condition code logic is also responsive to the LIT SEL field of the microcode control word to inhibit the selection of a condition when the COND CODE SEL field is being used along with the A SRC field to apply a literal value to the bus A BUS.

The loop counter 514 is a 16-bit counter which, under control of the fields A SRC and A DST of the microcode control word, may serve either as a source or as a destination for data values on the bus A BUS. The loop counter 514 is decremented synchronous with the clock signal $CK_B$ when bit 30 of the microcode control word has a value of logic-one. This counter is used to count the number of times that the instructions in an iterative loop are performed by the microcode sequencer 226.

In general modes of operation, the busses A BUS and B BUS are entirely independent. However, the video signal processor 210 may be placed in a state in which these two busses are joined into a single bus. This mode is the HALT mode. The processor 210 may be placed in the HALT mode by the microprocessor 224. The signal HALT provided by the microprocessor 224 conditions a bidirectional gating circuit 520 to join the two busses. When in this mode, the microprocessor 224 may access any register on the joined bus as a source or destination. This feature facilitates testing the video signal processor 210 and allows the microprocessor 224 to configure the processor 210 to start in any of a number of predetermined states. While it is not shown in the present embodiment of the invention, it is contemplated that the bus gate 520 may, alternatively, be controlled by a bit in the microcode control word, for example, bit 47. Under control of a microcode instruction, the gate 520 could be conditioned to join the busses A BUS and B BUS to effect the transfer of data provided by a source on one of the busses to a destination which is coupled to the other bus.

Figure 6:
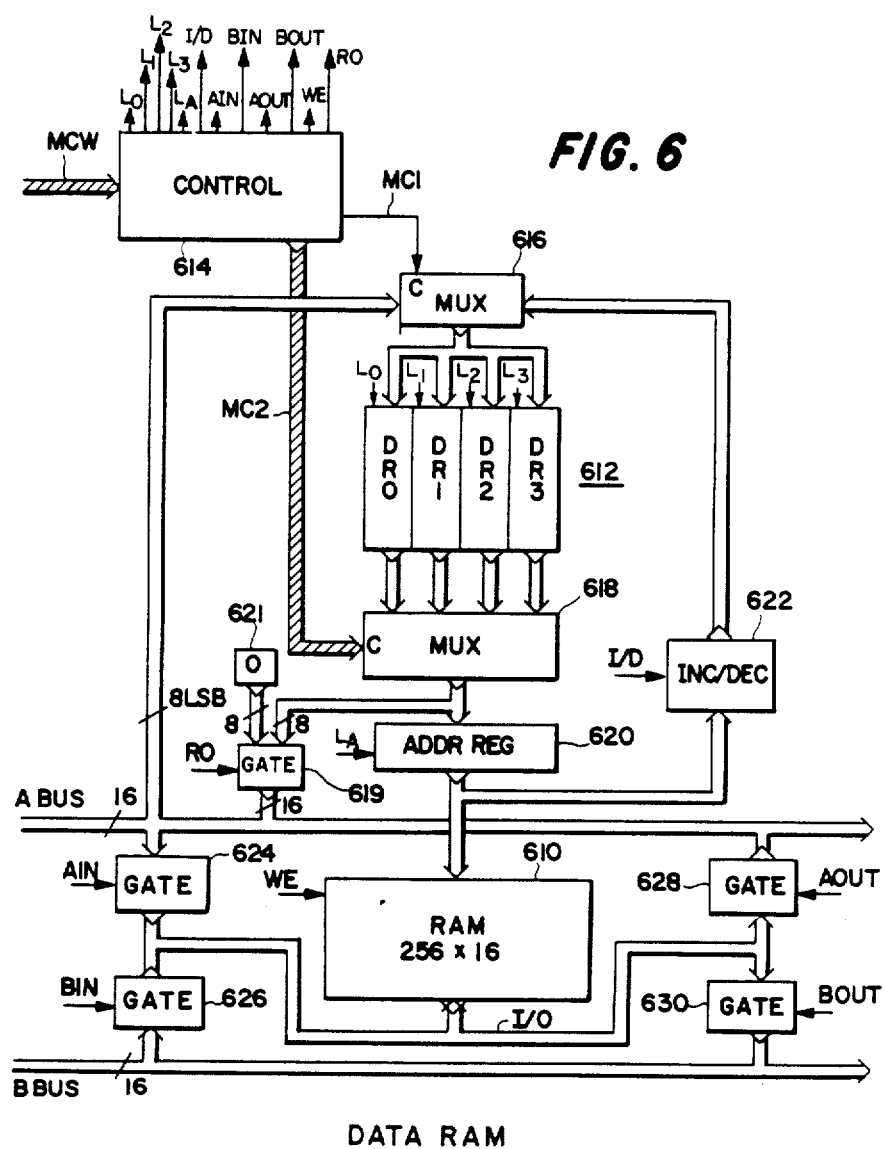
FIG. 6 is a block diagram of the data RAM circuitry used with the embodiment of the invention shown in FIG. 2.

In addition to the four general purpose registers R0, R1, R2 and R3, the video signal processor 210 uses the data RAM circuitry 228 for temporary storage of data values. FIG. 6 is a block diagram showing details of the data RAM circuitry 228 used with this embodiment of the invention. The data RAM circuitry 228 includes a 256 by 16 bit RAM 610, a register file 612, containing four address registers DR0, DR1, DR2 and DR3, incrementing/decrementing circuitry 622 and control circuitry 614. The control circuitry 614 is responsive to the fields A SRC, A DST, B SRC, and B DST of the microcode control word for transferring data to and from the RAM 610 and for loading and possibly incrementing or decrementing address values in the various registers of the register file 612.

In normal operation, the relevant fields of the microcode control word are applied to the control circuitry 614 via the bus MCW. Values representing addresses for accessing the RAM 610 are applied by, for example, the ALU circuitry 244, to one input port of a multiplexer 616 as the eight LSB positions of the bus A BUS. Another input port of the multiplexer 616 is coupled to receive 8-bit address values generated by incrementing/decrementing circuitry 622 as set forth below. The multiplexer 616 is conditioned by a signal MC1, provided by the control circuitry 614, to provide one of the two address values applied to its input ports to the registers DR0 through DR3. The registers DR0 through DR3 are 8-bit parallel-input parallel-output registers and are conditioned to load values applied to their input ports by the signals $L_0$, $L_1$, $L_2$ and $L_3$, respectively. The output values provided by the registers DR0 through DR3 are applied to respectively different input ports of a multiplexer 618. A control signal, MC2, provided by the control circuitry 614 conditions the multiplexer 618 to apply one of the address values held by the registers DR0 through DR3 to the input port of an 8-bit address register 620. Address values are loaded into the address register 620 responsive to a control signal $L_A$ provided by the control circuitry 614. The address values held in the register 620 are applied to an address input port of the RAM 610 and to the input port of incrementing/decrementing circuitry 622. The circuitry 622 is controlled by a signal I/D provided by the control circuitry 614 to either increment or decrement the address value applied to its input port and to provide this modified address value to the second input port of the multiplexer 616 as set forth above.

The address value provided by the multiplexer 618 may be applied to the bus A BUS via a 3-state gate 619. Responsive to a signal RO, provided by the control circuitry 614, the gate 619 applies either the 16-bit value provided by the multiplexer 618 and a source 621 or a high impedance to the bus A BUS. The gate 619 is used in this embodiment of the invention to allow the values held in registers DR0 through DR3 to be applied to the bus A BUS as an eight-bit data value. The eight MSB's of the value applied to the bus A BUS are set to zero. The signal R0 conditions the gate 619 to apply a value to the bus A BUS when the A SRC field of the microcode control word, provided via the bus MCW, indicates that one of the registers DR0 through DR3 is the source of the data value to be transferred via the bus A BUS.

Data values to be stored into the RAM 610 are applied to the data RAM circuitry 228 via the two 16-bit busses A BUS and B BUS. A 16-bit three-state gate, 624, is responsive to a signal AIN generated by the control circuitry 614 for applying either a data value from the bus A BUS or a high impedance to the I/O bus of the RAM 610. An identical gate 626 is responsive to a signal BIN generated by the control circuitry 614 for selectively applying a data value from the bus B BUS or a high impedance to the I/O bus of the RAM 610.

Data values applied to the I/O bus of the RAM 610 are written into data cells that are addressed by the address value held in the address register 620. The control circuitry 614 generates a write enable signal, WE, which conditions the RAM 610 to write the data value into the addressed cell during a given memory cycle.

Data values may be read from an addressed cell of the RAM 610 by holding the signal WE in a logic zero state during at least a portion of a memory cycle. Values read from the RAM 610 may be applied to either one or both of the busses A BUS or B BUS via the respective gates 628 and 630. The gates 628 and 630 are identical to the gates 624 and 626, they are responsive to the signals AOUT and BOUT, respectively, which are provided by the control circuitry 614, to apply either the output value provided by the RAM 610 via its I/O bus or a high impedance to the respective bus A BUS or B BUS.

As set forth above, the operation performed by the data RAM circuitry 228 is determined by the values of the fields A SRC, A DST, B SRC and B DST of the microcode control word. Table 4 is a description of the operations which may be performed in response to various values of these four fields.

TABLE 4

| VALUE | A SRC | A DST | B SRC | B DST |
|---|---|---|---|---|
| 2 | | | *DR2 | *DR2 |
| 3 | | | *DR3 | *DR3 |
| 4 | | | *DR2++ | *DR2++ |
| 5 | | | *DR3++ | *DR3++ |
| 6 | | | *DR2-- | *DR2-- |
| 7 | | | *DR3-- | *DR3-- |
| 16 | *DR0 | *DR0 | | |
| 17 | *DR1 | *DR1 | | |
| 18 | *DR0++ | *DR0++ | | |
| 19 | *DR1++ | *DR1++ | | |
| 20 | *DR0-- | *DR0-- | | |
| 21 | *DR1-- | *DR1-- | | |
| 28 | DR0 | DR0 | | |
| 29 | DR1 | DR1 | | |
| 30 | DR2 | DR2 | | |
| 31 | DR3 | DR3 | | |

The functions in the table 4 are encoded as in the assembly language that is used to generate microcode control words for the video signal processor 210. An asterisk (*) preceding a register name indicates that the value written or read is a value to be transferred to or from the RAM cell addressed by the value held in the register. If there is no preceding asterisk, the value read or written is the 8-bit value held by the named register. The "++" and "−−" following a register name indicates that the value in the register is incremented or decremented, respectively, after the addressed memory cell is accessed.

If the encoded operation is in the A SRC or B SRC columns, then the operation is a read operation and the output value is gated onto the bus A BUS or B BUS, respectively. If the encoded operation is in the A DST or B DST columns, then the operation is a write operation and the input value is provided by the bus A BUS or B BUS, respectively.

FIGS. 7A through 7E are timing diagrams which illustrate various signals provided by the control circuitry 614 in response to different values of the fields A SRC, A DST, B SRC and B DST of the microcode control word. To provide a comparison with other timing diagrams in the present application, the clock signal $CK_A$, provided by the microcode RAM and sequencing circuitry 226 is shown in each of the timing diagrams 7A through 7E.

FIG. 7A illustrates the timing of the various signals produced by the control circuitry 614 in response to a request to write an 8-bit value from the bus A BUS into register DR0 (i.e. A DST=28). At a predetermined time early in the instruction cycle, the value, VAL, to be written into the register DR0 is applied to the bus A BUS. During this instruction cycle, the control circuitry 614 holds the signal MCI at a logic zero value, conditioning the multiplexer 616 to apply the value conveyed by the eight LSB positions of the bus A BUS to the input ports of the registers DR0 through DR3. When the value applied to the bus A BUS has stabilized, the control circuitry 614 pulses the signal L0 to condition the register DR0 to load the value applied to its input port. The commands for loading the registers DR1, DR2 and DR3 are similar, the only difference being that one of the respective signals L1, L2 or L3 is pulsed instead of the signal L0, as shown in FIG. 7A.

FIG. 7B is a timing diagram showing signals that are generated by the control circuitry 614 to transfer the value held in the register DR0 to the eight LSB positions of the bus A BUS (i.e. A SRC=28). At a predetermined time, shortly after the start of an instruction cycle, the control circuitry 614 changes the signal MC2 to have a zero value. This signal conditions the multiplexer 618 to provide the value held in the register DR0 to the input port of the gate 619. After changing the signal MC2, the control circuitry 614 applies a logic-one as the signal R0 to the gate 619. This signal conditions the gate 619 to apply the value held by the register R0 to the eight LSB positions of the bus A BUS and to apply a value of zero to the eight MSB positions of the bus A BUS. Values in the registers DR1, DR2 or DR3 may be read using a similar sequence of signal changes. The only difference is that the value of MC2 is one, two or three, respectively, instead of zero, as shown in FIG. 7B.

FIG. 7C illustrates the timing of several signals used to read a value from a memory cell in the RAM 610 which is addressed by an address value held in register DR0 (i.e. A SRC=16). For this operation, the control circuitry 614 first changes the signal MC2 to have a zero value, conditioning the multiplexer 618 to apply the address value held by DR0 to the input port of the address register 620. When this signal has stabilized, the control circuitry 614 pulses the signal $L_A$ to load the address value into the address register 620. When the address value has propagated through address decoding logic of the RAM 610, the addressed value is available on the I/O bus of the RAM 610. The control circuitry 614 then gates this value onto the bus A BUS by changing the value of the signal AOUT to logic one. Values addressed by the register DR1 may be read using the same instruction sequence except that the value of the signal MC2 is a one instead of a zero. In this embodiment of the invention, data in the RAM 610 which is addressed by the registers DR2 or DR3 may be read out only via the bus B BUS. The sequence of signals to read these values may be obtained by changing the value of MC2 in FIG. 7C to be two or three respectively and by using the gating signal BOUT instead of the signal AOUT.

FIG. 7D illustrates the control signals which condition the data RAM circuitry 228 to write a value provided by the bus B BUS into a cell of the RAM 610 that has the address value held in the register DR2 (i.e. B DST= 2). As a first step in this operation, the control circuitry 614 changes the value of the signal MC2 to two. This conditions the multiplexer 618 to apply the address value held in the register DR2 to the input port of the address register 620. When the address value has stabilized, the control circuitry 614 pulses the signal LA, conditioning the address register 620 to load the value applied to its input port. After the address value applied to the RAM 610 has stabilized, the control circuitry 614 changes the signal BIN to a logic-one value, conditioning the gate 626 to apply the value on the bus B BUS to the I/O bus of the RAM 610. After a stabilization period, the control circuitry 614 pulses the signal WE to condition the RAM 610 to write the data on its I/O bus into the cell having the address value applied to its address input port. The signals used to write data values from the bus B BUS to the RAM 610 using the address value in DR3 are the same as those shown in FIG. 7D except that the signal MC2 has a value of three rather than two. In the present embodiment of the invention, memory write operations using data on the bus A BUS may only use the registers DR0 and DR1. Consequently, to represent the signals used for these operations (A DST=28 or 29), the FIG. 7D would be changed in three ways: the signal B BUS would become the signal A BUS, the value of the signal MC2 would be 0 or 1, respectively, and the signal BIN would become the signal AIN.

FIG. 7E represents the same operation as in 7D except that the address value is incremented after the data value is stored. This operation is invoked when the value in the field B DST is 4. The signals B BUS, MC2, LA, BIN and WE are the same as those described in reference to FIG. 7D. In addition, shortly after changing the value of the signal BIN, the control circuitry 614 changes the signal I/D to have a logic one value. This signal conditions the incrementing/decrementing circuitry 622 to increment the value held in the address register 620 and to apply the result to the second input port of the multiplexer 616. When this value has stabilized, the control circuitry 614 pulses the signal MC1 to apply the incremented address value to the registers DR0 through DR2. The control circuitry 614 pulses the signal L2, while the signal MC1 is in a logic one state, to load the incremented address value into the register DR2.

By holding the value of the signal I/D at logic zero through the instruction cycle, the signals shown in FIG. 7E can be modified to decrement the address value instead of incrementing it. Signals for the write operations which use registers DR0, DR1 and DR3 can be obtained based on FIG. 7E by modifying the signals B BUS, MC2 and BIN as set forth above in reference to FIG. 7D. Moreover, the signals used for the read-and-increment operations (A SRC=18 and 19 and B SRC=4 and 5) and the read-and-decrement operations (A SRC=20 and 21 and B SRC=6 and 7) may be obtained by adding the signals MC1, I/D and L2 from FIG. 7E, with the appropriate modifications, to the signals shown in FIG. 7C.

In this embodiment of the invention, the pulse signal shown in FIGS. 7A through 7E are generated by selectively gating pulses of the 25 MHz signal CLK provided to the data RAM circuitry 228 by the source 225, and by delaying the gated clock pulses via cascade-connected gating elements. Even though the clock signal CLK is used to generate its control signals, the data RAM circuitry 228 is responsive to the clock signals $CK_A$ and $CK_B$ to suspend its operation when these clock signals are frozen by a PAUSE or HALT command.

Using the FIGS. 6 and 7A through 7E, and the related description, one skilled in the art of digital signal processing circuit design could readily construct suitable control circuitry 614 for use in the data RAM circuitry 228.

As set forth above in reference to FIG. 1B, a segment of an image may be encoded as a modification of a corresponding segment from the previous image. This form of encoding, called relative encoding, includes parameters which describe an offset in the horizontal and vertical directions between corresponding pixel positions in the two segments (e.g., $\Delta X$ and $\Delta Y$ from FIG. 1B). As described above, these offset values may be in terms of fractions of the distance between adjacent pixels. In order to properly decode images in which the fractional part of a pixel offset value is non-zero, the video signal processor 210 desirably includes circuitry for generating psuedo-pixels from the pixels of the segment in the previous field. These psuedo-pixels have values which approximate the values of fractionally offset pixels. In the present embodiment of the invention, the psuedo-pixels are generated by the pixel interpolator 246.

The pixel interpolator 246 is configured to calculate and store pairs of intermediate values corresponding to pixels interpolated in the vertical direction. These pairs of intermediate values are then fed back to the interpolator, which, operating on successive intermediate values, performs a horizontal interpolation to produce pixel values that are interpolated both horizontally and vertically. In other words, the pixel interpolator 246 performs interleaved vertical and horizontal interpolation calculations to produce the output psuedo-pixel values.

Figure 8A:
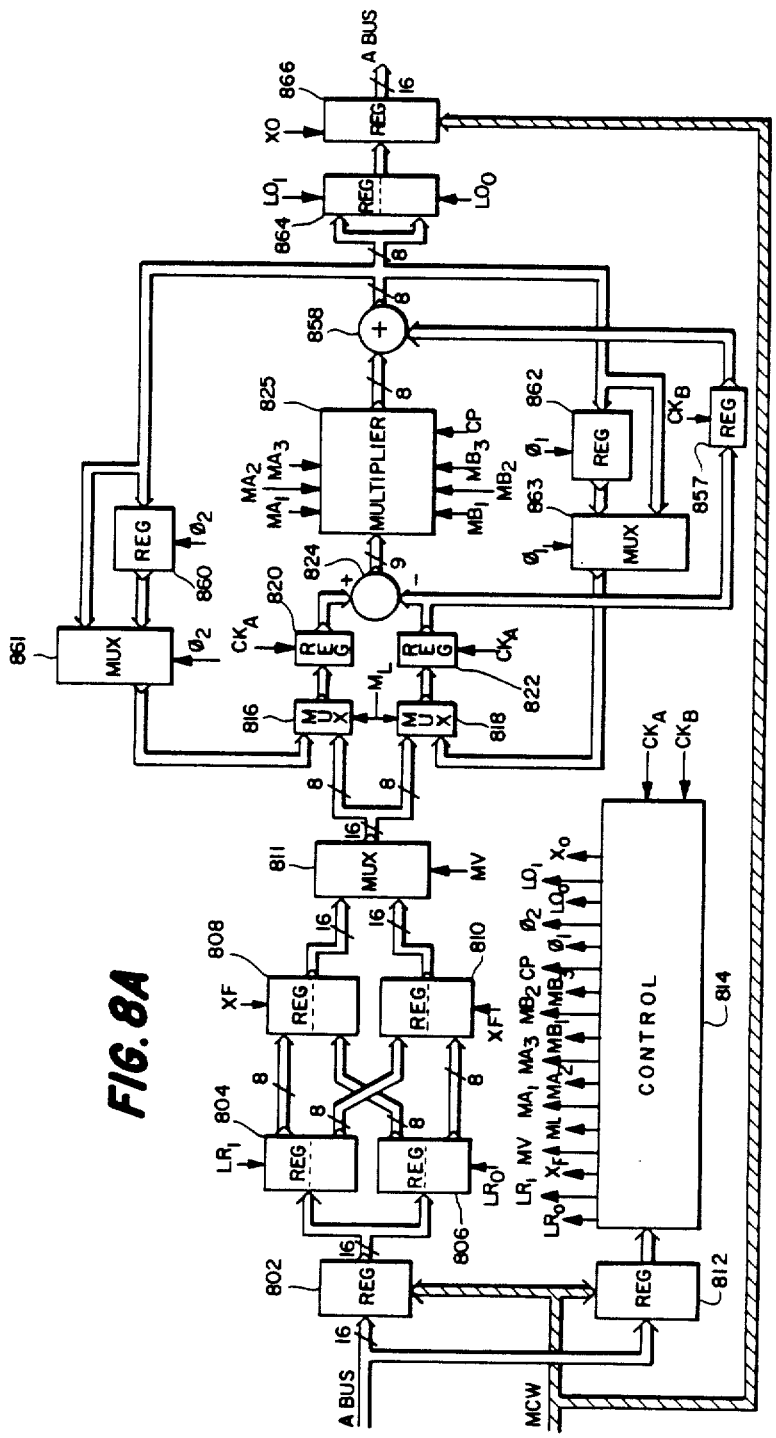
FIG. 8A is a block diagram of the pixel interpolator used with the embodiment of the invention shown in FIG. 2.

FIG. 8A is a block diagram showing circuitry suitable for use as the pixel interpolator 246. In FIG. 8A, the 16-bit bus A BUS is coupled to the respective input ports of registers 802 and 812 to provide, respectively, pixel data from, for example, the data RAM 228, and control values from, for example, the ALU 244, to the pixel interpolator 246. The registers 802 and 812 are conditioned to load values from the bus A BUS when the A DST field of the microcode control word has values of five and four, respectively. The microcode control word is applied to the pixel interpolator 246 via the control bus MCW. The register 812 is coupled to control circuitry 814 which develops control signals for the various component parts of the pixel interpolator 246 as described below.

The 16-bit value loaded into the register 802, when the A DST field has a value of five, is interpreted by the pixel interpolator 246 as two 8-bit pixel values having successive positions on a horizontal line of the input video signal. Responsive to signals $LR_0$ and $LR_1$, the values held in the register 802 are alternately transferred to the respective 16-bit registers 804 and 806. In the normal operation of the pixel interpolator 246, alternate values applied to the register 802 are corresponding pairs of samples from successive lines of the input video signal. For example, in FIG. 9A where the triangles represent pixels of the input video signal, the first value applied to the register 802 would include the values representing pixels $S_{00}$ and $S_{01}$. The next successive value applied to the register would include values representing pixels $S_{10}$ and $S_{11}$, the corresponding pixel values from the next line of the video signal.

As set forth below in reference to FIGS. 9A through 9C, it is desirable for the pixel interpolator to convert the pixel pairs stored in the registers 804 and 806 from horizontally adjacent pixel values to pairs of vertically adjacent pixel values. To this end, the eight MSB positions of the registers 804 and 806 are coupled, respectively, to the eight MSB positions and eight LSB positions of a register 808 and the eight LSB positions of the registers 804 and 806 are coupled, respectively, to the eight MSB positions and eight LSB position of a register 810. The registers 808 and 810 are conditioned to load the values applied to their input ports by a signal XF which is provided by the control circuitry 814. In the example set forth above, the registers 808 and 810 contain the respective pixel value pairs S00, S10 and S01, S11 immediately after the control circuitry 814 has pulsed the signal XF.

The 16-bit values provided by the registers 808 and 810 are applied to respectively different input ports of a multiplexer 811. The multiplexer 811 is conditioned by a signal MV, provided by the control circuitry 814, to pass the 16-bit value applied to a selected one of its input ports to the multiplexers 816 and 818. The eight MSB positions of the output value of the multiplexer 811 are applied to one input port of the multiplexer 816. The eight LSB positions of the output value of the multiplexer 811 are applied to a corresponding input port of the multiplexer 818.

The multiplexers 816 and 818 are conditioned by a signal ML, provided by the control circuitry 814, to pass either the two pixel values provided by the multiplexer 811 or two 8-bit vertically interpolated pixel values provided by respective multiplexers 861 and 863. The pixel values passed by the multiplexers 816 and 818 are applied to registers 820 and 822, respectively. The registers 820 and 822 are responsive to the clock signal $CK_A$ provided by the microcode RAM and sequencing circuitry 226, to load the values applied to their respective input ports. The pixel value held in the register 822 is subtracted from the pixel value held in the register 820 by the subtracter 824. The pixel difference value developed by the subtracter 824 is applied to a multiplier circuit 825.

The multiplier 825, used in this embodiment of the invention, is a programmable shift-and-add type of multiplier. Circuitry suitable for use as the multiplier 825 is shown in FIG. 8B. The value to be multiplied is applied to two data paths, each of which contains three serially coupled shifter-multiplexer pairs. Both the first and second data paths convey nine-bit values. The eight-bit value provided by the subtracter 824 is applied as the eight MSB positions of the nine-bit value applied to the shifters 826 and 840 and to the multiplexers 828 and 842. The LSB of this value is zero. The extra bit of precision is used in the multiplier 825 to mitigate truncation errors which may occur due to the shift-and-add multiplication technique.

The first data path includes a shifter 826 which is coupled to receive the pixel difference value provided by the subtracter 824 and to provide a bit-shifted version of this value to one input port of a multiplexer 828. The other input port of the multiplexer 828 is coupled directly to the output port of the subtracter 824. The shifter 826, and each of the shifters in the multiplier 825, provides the eight MSB positions of its nine-bit input value as the eight LSB positions of its nine-bit output value. A logic-zero value is inserted in the MSB position of the output value. One skilled in the art of digital signal processing circuit design will recognize a shift of this type as the equivalent of a division by two. The multiplexer 828 is conditioned by a signal $MA_1$ provided by the control circuitry 814 to provide either the shifted or unshifted value at its output port. The output port of the multiplexer 828 is coupled to the input port of a shifter 830 and to one input port of a multiplexer 832. The shifter 830 and multiplexer 832 are in the same configuration as the shifter 826 and multiplexer 828. The multiplexer 832 is controlled by a signal $MA_2$ to selectively provide the output value of the multiplexer 828 or a bit-shifted version of this output value. The multiplexer 832 is coupled to provide its output value to a shifter 834 and multiplexer 836 which are in the same configuration as the shifter 830 and multiplexer 832. The multiplexer 836 is controlled by a signal $MA_3$ provided by the control circuitry 814.

The second data path includes three shifter-multiplexer pairs 840,842; 844,846; and 848,850, each configured in the same manner as the shifter multiplexer pairs in the first data path. The multiplexers 842, 846 and 850 are controlled by the respective signals $MB_1$, $MB_2$, and $MB_3$.

The output values provided by the multiplexer 850 are applied to a selective two's complementing circuit 852. The circuit 852 is controlled by a signal CP provided by the control circuitry 814 to provide either its input value or the two's complement of its input value to the input port of a register 854. The output values provided by the multiplexer 836 of the first data path are applied directly to the input port of a register 838. Both of the registers 838 and 854 are responsive to the clock signal $CK_B$, provided by the microcode RAM and sequencing circuitry 226 to load the values applied to their respective input ports. The output values provided by the registers 838 and 854 are coupled to respectively different input ports of an adder 856. The values provided by the adder 856 are the output values of the multiplier 825.

By controlling the values of the signals $MA_1$, $MA_2$, $MA_3$, $MB_1$, $MB_2$, $MB_3$ and CP, the multiplier 825 may be conditioned to multiply the values provided by the subtracter 824 by scale factors having values between one-eighth and one in steps of one-eighth. Table 5 lists the values of the various control signals needed to produce the scaled output values. In table 5, a control value of 0 for one of the MA or MB signals conditions the corresponding multiplexer to pass the unshifted value while a control value of 1 conditions the multiplexer to pass the shifted value. A value of 1 for the signal CP conditions the selective two's complementing circuitry 852 to complement the value applied to its input port.

TABLE 5

| $MA_1$ | $MA_2$ | $MA_3$ | $MB_1$ | $MB_2$ | $MB_3$ | CP | SCALE FACTOR |
|---|---|---|---|---|---|---|---|
| 1 | 1 | 0 | 1 | 1 | 1 | 1 | 1/8 |
| 1 | 0 | 0 | 1 | 1 | 0 | 1 | 1/4 |
| 1 | 0 | 0 | 1 | 1 | 1 | 1 | 3/8 |
| 0 | 0 | 0 | 1 | 0 | 0 | 1 | 1/2 |
| 1 | 0 | 0 | 1 | 1 | 1 | 0 | 5/8 |
| 0 | 0 | 0 | 1 | 1 | 0 | 1 | 3/4 |
| 0 | 0 | 0 | 1 | 1 | 1 | 1 | 7/8 |
| 1 | 0 | 0 | 1 | 0 | 0 | 0 | 1 |

The values of the signals $MA_1$, $MA_2$, $MA_3$, $MB_1$, $MB_2$, $MB_3$ and CP are generated by the control circuitry 814 in response to the control value provided by the register 812.

The scaled pixel difference value provided by the adder 856 is added to a pixel value provided by a register 857. The pixel value held in the register 857 is loaded from the register 822 in synchronism with the clock signal $CK_B$ provided by the microcode RAM and sequencing circuitry 226. The function performed by the subtracter 824, multiplier 825 and the adders 856 and 858 may be represented by the equation (2)

$$R = SF * (A-B) + B \qquad (2)$$

where A and B are the pixel values held in the respective registers 820 and 822. SF is the scale factor value provided, for example, by the ALU 244 as a field in the control value, and held in the register 812. The scale factor SF is provided to the multiplier 825 via the MA, MB, and CP signals. R is the value provided by the adder 858. An algebraic manipulation of the equation (2) yields an equation (3) which describes a conventional linear interpolation operation.

$$R = SF * A + (1-SF) * B \qquad (3)$$

Thus, the combination of the subtractor 824, multiplier 825 and adders 856 and 858 is a linear interpolator.

The value provided by the adder 858 is applied to the respective input ports of registers 860 and 862 and to first input ports of the respective multiplexers 861 and 863. The second input ports of the multiplexers 861 and 863 are coupled to the respective output ports of registers 860 and 862. The registers 860 and 862 load the values applied to their respective input ports coincident with the negative-going transitions of the respective clock signals $\phi_2$ and $\phi_1$. The multiplexers 861 and 863 pass the value provided by the adder 858 to the respective multiplexers 816 and 818 when the respective clock signals $\phi_2$ and $\phi_1$ have logic-one values and pass the value held in the respective registers 860 and 861 otherwise. This configuration of the registers 860 and 862 and multiplexers 861 and 863 enables simultaneous loading of the value generated by the adder 858 to into both the registers 860 and 820 or into the registers 862 and 822.

The importance of this capability is described below in reference to FIG. 9C.

The pixel values provided by the adder 858 are further coupled to both the eight MSB and eight LSB bit positions of a 16-bit register 864. The eight MSB positions of the register 864 are loaded in synchronism with a signal $LO_1$ provided by the control circuitry 814 and the eight LSB positions of the register 864 are loaded in synchronism with a signal $LO_0$ provided by the circuitry 814. The pixel values held in the register 864 are transferred to a register 866 in response to a signal XO provided by the control circuitry 814. These pixel values are then applied to the bus A BUS, from the register 866, under control of the A SRC field of the microcode control word applied to the register 866 via the bus MCW.

In normal operation as a component part of the video signal processor 210, the pixel interpolator 246 develops interpolated pseudo-pixel values, from the pixel values of a previous image, as a step in developing pixel values for the current image. FIGS. 9A through 9C illustrate the operation of the circuitry 246.

Figure 9A:
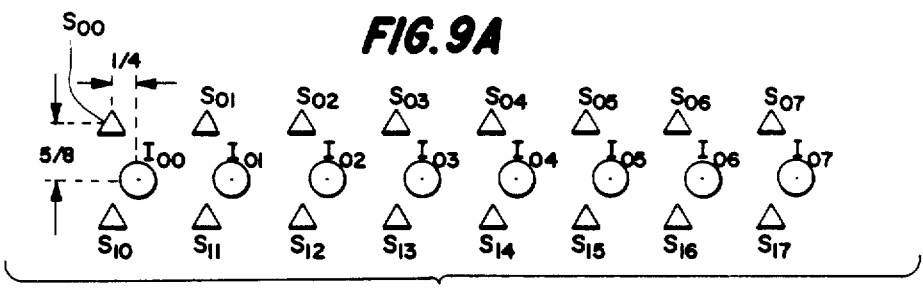

In FIG. 9A, the triangular points $S_{00}$ through $S_{07}$ and $S_{10}$ through $S_{17}$ represent corresponding pixel values from two successive lines of the previous image, which are provided from a bit-map in the VRAM 216 via the input FIFO 232 and data path 242. The circular points $I_{00}$ through $I_{06}$ represent interpolated pseudo-pixel values. As illustrated in FIG. 9A, the interpolated pixel values are offset by one-quarter of the inter-pixel distance horizontally and five-eighths of the inter-pixel distance vertically, with respect to the pixels in the previous image.

Figure 9B:
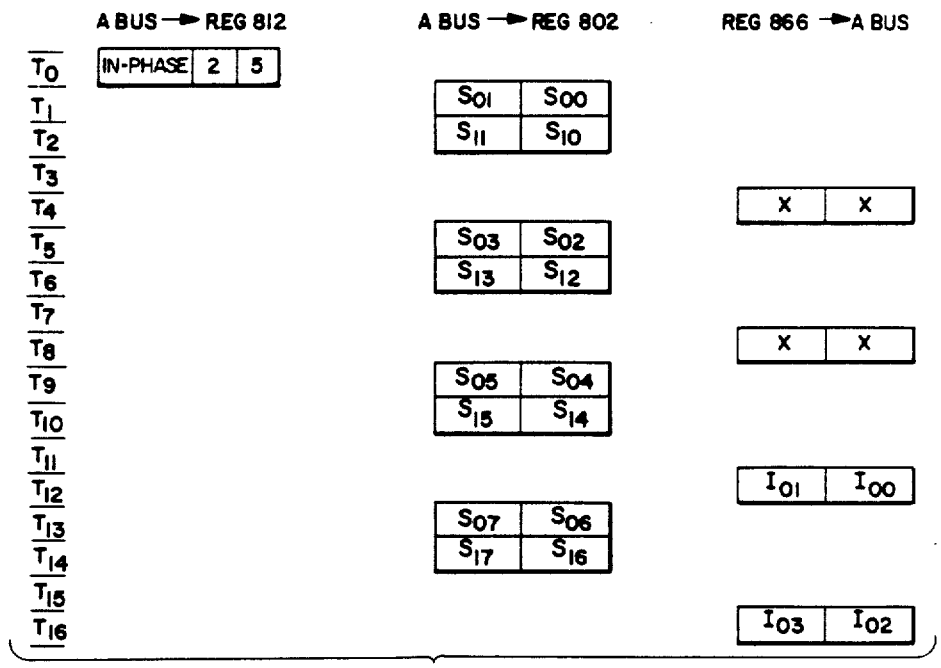

FIG. 9B illustrates how the pixel interpolator 246 is controlled by data values applied to the bus A BUS to provide the psuedo-pixel values $I_{00}$ through $I_{03}$ In FIG. 9B, the time intervals $T_0$ through $T_{16}$ represent 17 successive instruction cycles of the video signal processor 210. During the instruction cycle $T_0$, the field A DST of the microcode control word has a value of four, conditioning the pixel interpolator 246 to load a 16-bit control value provided, for example, from the ALU 244 via the bus A BUS. The eight MSB positions of this 16-bit control value condition the pixel interpolator 246 to operate in its in-phase mode. In this mode, the input pixel values and their corresponding output pixel values both have even addresses in the VRAM 216. The pixel interpolator 246 may alternatively operate in an out-of-phase mode. In the out-of-phase mode, the input pixel addresses are odd and the output pixel addresses are even. The control value applied to the pixel interpolator at time $T_0$ further includes the values 5 and 2 in the bits 0–3 and 4–7, respectively. The value 2 corresponds to the offset or scale factor 2/8 or ¼ in the horizontal direction and the value 5 corresponds to the offset of ⅝ in the vertical direction. In the present example, the values 5 and 2 are obtained from the fractional part of the values $\Delta X$ and $\Delta Y$ of a relative code record such as that shown in FIG. 1B.

During the instruction cycles $T_1$ and $T_2$, the A DST field of the microcode control word has avalue of five and the pixel value pairs $S_{00}$, $S_{01}$ and $S_{10}$, $S_{11}$ respectively, are applied to the register 802 of the pixel interpolator 246. For the instruction cycle $T_3$ there is no activity on the bus A BUS related to the pixel interpolator 246. During the instruction cycle $T_4$, an invalid pair of interpolated pixel values (x, x) is available at the output port of the pixel interpolator 246. These values are ignored by the video signal processing circuitry 210.

In the instruction cycles $T_5$ and $T_6$, the respective pixel pairs $S_{02}$, $S_{03}$ and $S_{12}$, $S_{13}$ are applied to the register 802 of the pixel interpolator 246. There is no activity on the bus A BUS for the pixel interpolator 246 during the instruction cycle $T_7$. In the instruction cycle $T_8$, a second invalid pair of interpolated pixel values is available at the output port of the pixel interpolator 246. These values are ignored. During the instruction cycles $T_9$ and $T_{10}$, the respective pixel value pairs $S_{04}$, $S_{05}$ and $S_{14}$, $S_{15}$ are applied to the register 802 of the pixel interpolator 246. In the instruction cycle $T_{11}$, there is no activity on the bus A BUS related to the pixel interpolator. During the instruction cycle $T_{12}$, the A SRC field of the microcode control word has a value of five conditioning the pixel interpolator 246 to apply a 16-bit value representing the interpolated pixel values $I_{00}$ and $I_{01}$ to the bus A BUS.

The instruction cycles $T_{13}$ through $T_{16}$ are similar to the instruction cycles $T_9$ through $T_{12}$, the only differences being the pixel values applied to and provided by the pixel interpolation circuitry 246. Generally, the microcode sequencer 226 repeats the operations in the instruction cycles $T_9$ through $T_{12}$ using different input and output pixel values, a number of times necessary to produce all of the desired interpolated psuedo-pixel values.

The pixel interpolator 246 used in this embodiment of the invention is a highly pipelined device. The pipeline delay is 11 instruction cycles; the delay between the application of the first input value, at $T_1$, and the presentation of the first valid output value, at $T_{12}$.

FIG. 9C is a signal timing diagram which illustrates the timing of the various signals produced by the control circuitry 814 in the example set forth in FIG. 9B. The signals $CK_A$ and $CK_B$ are anti-phasal clock signals having a period that is substantially equal to one instruction cycle time. The clock signals $CK_A$ and $CK_B$ are applied to the pixel interpolator by the microcode RAM and sequencing circuitry 226.

All of the registers used in the pixel interpolator circuitry shown in FIG. 8 are negative-edge triggered. In other words, they are all conditioned to load the values applied to their input ports coincident with negative going transitions of their respective clock or load signals. The registers in FIG. 8 are synchronized to either clock signal $CK_A$ or clock signal $CK_B$.

Referring to FIGS. 9B and 9C, the control value for the pixel interpolator is loaded into the register 812 during the instruction cycle $T_0$ coincident with the negative-going transition of the signal $CK_A$. This value stabilizes in the control circuitry 814 by the end of the instruction cycle $T_0$ conditioning the circuitry 814 to apply the values 1, 0, 0, 1, 1, 1, and 0 for the respective signals MA1, MA2, MA3, MB1, MB2, MB3 and CP. These values correspond to a scale factor of five-eighths, the scale factor used in the present example for interpolating between pairs of vertically aligned pixel values.

The first pair of pixel values, $S_{00}$ and $S_{01}$, is loaded into the register 802 during the instruction cycle $T_1$ coincident with the negative-going transition of the signal $CK_A$. These pixel values are transferred to the register 806 at the end of the instruction cycle $T_1$, coincident with the negative-going edge of the signal $LR_0$ The second pair of pixel values, $S_{10}$ and $S_{11}$, is loaded into the register 802 coincident with the negative-going transition of the clock signal $CK_A$ which occurs during the instruction cycle $T_2$ These pixel values are transferred to the register 804 coincident with the negative going transition of the signal $LR_1$, occurring at the end of the instruction cycle $T_2$.

During the instruction cycle $T_3$, the pixel values held in the eight-MSB positions of the registers 804 and 806 are transferred to the respective eight MSB and eight LSB positions of the register 808 and the pixel values held in the eight LSB positions of the registers 804 and 806 are transferred to the respective eight MSB and eight LSB positions of the register 810. This transfer occurs coincident with the negative-going transition of the signal XF. The effect of this transfer is to convert the pairs of horizontally aligned pixel values $S_{00}$, $S_{01}$ and $S_{10}$, $S_{11}$ in the respective registers 804 and 806 into pairs of vertically aligned pixel values $S_{01}$, $S_{11}$ and $S_{00}$, $S_{10}$ in the registers 808 and 810, respectively.

During cycle $T_4$, the control circuitry 814 changes the signals $MA_1$ through $MA_3$, $MB_1$ through $MB_3$ and CP to have values consistent with a scale factor of five-eighths. The control circuitry 814 further produces a logic-one value as the signal MV, and a logic-zero value as the signal ML, conditioning the multiplexer 811 which is controlled by the signal MV and the multiplexers 816 and 818 which are controlled by the signal ML to couple the two pixel values held in the register 810 to the respective input ports of the registers 820 and 822. Coincident with the negative going edge of the signal $CK_A$, during the instruction cycle $T_4$, the pixel value $S_{00}$ is loaded into the register 822 and the pixel value $S_{10}$ is loaded into the register 820. During the remainder of the instruction cycle $T_4$, the values held in the registers 820 and 822 propagate through the subtracter 824 and the first and second data paths of the multiplier 825, as set forth above. The scaled pixel difference values provided by the multiplexer 836 and selective two's complimenter 852 are loaded into the respective registers 838 and 854 coincident with the negative going edge of the signal $CK_B$ occurring at the end of the instruction cycle $T_4$. At this same time, the pixel value $S_{00}$ from the register 822 is loaded into the register 857.

In the instruction cycle $T_5$, the pixel difference values held in the registers 838 and 854 are summed by the adder 856. The resultant sum is then added, by the adder 858, to the pixel value $S_{00}$ provided by the register 857. The sum provided by the adder 858, representing five-eighths times the pixel value $S_{10}$ plus three-eighths times the pixel value $S_{00}$ is stored in the register 86 synchronous with the negative going edge of the signal $\phi_1$.

Also during the instruction cycle $T_5$, the pixel values $S_{02}$ and $S_{03}$ provided via the bus A BUS are loaded in to the register 802 and then transferred to the register 806 synchronous with the negative going transition of the signal $LR_0$.

During the instruction cycle $T_6$, the pixel values $S_{12}$ and $S_{13}$ are applied to the bus A BUS, loaded into the register 802 and then transferred to the register 804 synchronous with the negative going transition of the signal $LR_1$.

At the midpoint of the instruction cycle $T_6$, the pixel values $S_{01}$ and $S_{11}$ held in the register 808 are applied to the respective registers 822 and 820 via the multiplexers 811, 816 and 818 and loaded into these registers responsive to the negative-going transition of the signal $CK_A$. These pixel values are propagated through the subtractor 824, multiplier 825 register 857 and adder 858 during the remainder of the instruction cycle $T_6$ and the first half of the instruction cycle $T_7$.

During the first half of the instruction cycle $T_7$ the horizontally aligned pixel values $S_{02}$, $S_{03}$ and $S_{12}$, $S_{13}$ held in the respective register 806 and 804 are converted into vertically aligned pixel pairs $S_{02}$, $S_{12}$ and $S_{03}$, $S_{13}$ which are stored into the respective register 810 and 808 synchronous with the negative going transition of the signal XF occurring at the midpoint of the instruction cycle $T_7$.

The vertically interpolated pixel value $(S_{01}, S_{11})$ provided by the adder 858 during the instruction cycle $T_7$ is loaded into the register 860 and, via the multiplexers 861 and 816, into the register 820, synchronous with the negative going edge of the signal $CK_A$ occurring at the midpoint of the instruction cycle $T_7$. The signal ML, which conditions the multiplexer 816 to pass the value provided by the multiplexer 861 to the register 820, also conditions the multiplexer 818 to apply the vertically interpolated pixel value $(S_{00}, S_{10})$ provided by the multiplexer 863 to the register 822. This pixel value is loaded into the register 822 synchronous with the negative going transition of the clock signal $CK_A$ occurring at the midpoint of the instruction cycle $T_7$, the signals $MA_1$ through $MA_3$, $MB_1$ through $MB_3$ and the signal CP are changed to have respective values of 1,0,0,1,1,0 and 1. These values correspond to a scale factor of one-fourth. During the second half of the instruction cycle $T_7$ and the first half of the instruction cycle $T_8$, the subtractor 824, multiplier 825 and adder 858 horizontally interpolate a pixel value from this pair of vertically interpolated pixel values to generate the pixel value $I_{00}$. This value is stored in the eight LSB positions of the register 864 coincident with the negative going edge of the signal $L0_0$, occurring at the midpoint of the instruction cycle $T_8$.

Also during the instruction cycle $T_8$, the pair of pixel values $S_{02}$, $S_{12}$ held in the register 810 are transferred to the respective registers 822 and 820 via the multiplexers 811, 816 and 818. These pixel values are loaded into the registers 822 and 820 synchronous with the negative going transition of the signal $CK_A$ occurring at the midpoint of the instruction cycle $T_8$. In the remainder of the instruction cycle $T_8$ and the first half of the instruction cycle $T_9$, the subtractor 824, multiplier 825 and adder 858 calculate a vertically interpolated pixel value from the pair of pixel values $S_{02}$, $S_{12}$. This interpolated pixel value is stored into the registers 862 and 822 synchronous with the negative going transitions of the respective signals $\phi_1$ and $CK_A$, both occurring at the midpoint of the instruction cycle $T_9$. During the remainder of the instruction cycle $T_9$, and the first half of the instruction cycle $T_{10}$, the horizontally interpolated pixel value, $I_{01}$, is developed from the vertically interpolated pixel values provided by the multiplexers 861 and 863. The signals $MA_1$ through $MA_3$, $MB_1$ through $MB_3$, and CP are set by the control circuitry 814 to have respective values of 0,0,0,1,1,0 and 1 during the instruction cycle $T_9$. These values correspond to a scale factor of ¾. The pixel value $I_{01}$ is stored in the eight MSB positions of the register 864 synchronous with the negative going transition of the signal $L_{01}$ occurring at the midpoint of the instruction cycle $T_{10}$. The pixel pair $I_{00}$, $I_{01}$ is transferred from the register 864 to the register 866 at the end of the instruction cycle $T_{10}$, synchronous with the negative-going transition of the signal X0.

Also at the midpoint of the instruction cycle $T_{10}$, the pixel values $S_{03}$ and $S_{13}$, held in the register 808 are loaded into the respective registers 822 and 820 synchronous with the negative going edge of the signal $CK_A$. In the remainder of the instruction cycle $T_{10}$ and the first half of the instruction cycle $T_{11}$, a vertically interpolated pixel value is developed from the pixel values $S_{03}$ and $S_{13}$ This pixel value is stored into the registers 860 and 820 synchronous with the negative going transitions of the respective signals $\phi_2$ and $CK_A$ occurring at the midpoint of the cycle $T_{11}$.

During the instruction cycles $T_9$ and $T_{10}$, the respective pixel pairs $S_{04}$, $S_{05}$ and $S_{14}$, $S_{15}$ are loaded into the respective registers 806 and 804. At the midpoint of the instruction cycle $T_{11}$, these pixel values are configured into vertically aligned pixel pairs $S_{04}$, $S_{14}$ and $S_{05}$, $S_{15}$ which are stored in the respective registers 810 and 808.

In the second half of the instruction cycle $T_{11}$ and the first half of the instruction cycle $T_{12}$, the subtracter 824, multiplier 825 and adder 858 calculate the pixel value $I_{02}$, which is stored in the eight LSB positions of the register 864 synchronous with the negative going transition of the signal $L0_0$ occurring at the midpoint of the cycle $T_{12}$. Also at the midpoint of the instruction cycle $T_{12}$, the pixel pair $I_{00}$, $I_{01}$ is applied to the bus A BUS from the register 866.

During the instruction cycles $T_{12}$ and $T_{13}$, a vertically interpolated pixel value is developed for the pixel pair $S_{04}$, $S_{14}$. This interpolated pixel value is loaded into the registers 860 and 820 synchronous with the negative going transitions of the respective signals $\phi_2$ and $CK_A$ occurring at the midpoint of the instruction cycle $T_{13}$. During the instruction cycles $T_{13}$ and $T_{14}$, the pixel value $I_{03}$ is developed, using a scale factor of $\frac{3}{4}$. This pixel value is stored into the eight MSB positions of the register 864 at the midpoint of the instruction cycle $T_{14}$. At the end of the instruction cycle $T_{14}$ the pixel pair $I_{02}$, $I_{03}$ is transferred from the register 864 to the register 866. This pixel pair is applied to the bus A BUS during the instruction cycle $T_{16}$.

The signals which drive the pixel interpolator 246 repeat every four instruction cycles. For example, the signals for the instruction cycles $T_{13}$ through $T_{16}$ are the same as those for the instruction cycles $T_9$ through $T_{12}$. This sequence of signals repeats as many times as needed to produce the desired number of psuedo-pixel values.

It should be noted that the first vertically interpolated pixel value of a pair of pixel values which are to be horizontally interpolated, alternately occupies the registers 820 and 822. Consequently, the vertically interpolated value which is added to the scaled vertically interpolated difference value in the adder 858 alternates between the first and second vertically interpolated values in successive pairs of vertically interpolated values which are combined to generate successive horizontally interpolated values. To accommodate this alternation for the horizontal interpolation calculations, the control circuitry 814 alternately provides values for the signals $MA_1$ through $MA_3$, $MB_1$ through $MB_3$ and CP that correspond to the scale factors $SF_H$ and $(1-SF_H)$, respectively, where $SF_H$ is the horizontal interpolation scale factor. In the present example, when the first pixel value of a pair is in the register 822, the horizontal interpolation factor of one-fourth produces the correct psuedo-pixel output value. When the first pixel value of a pair is in the register 820, however, the horizontal interpolation factor is changed to three-fourths to produce the correct psuedo-pixel output value.

Figure 9D:
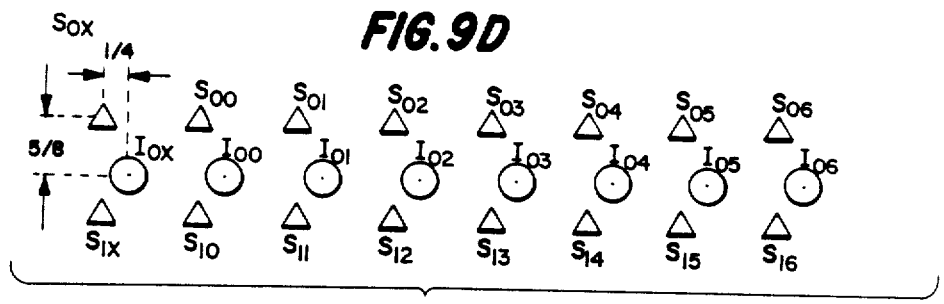
Figure 9E:
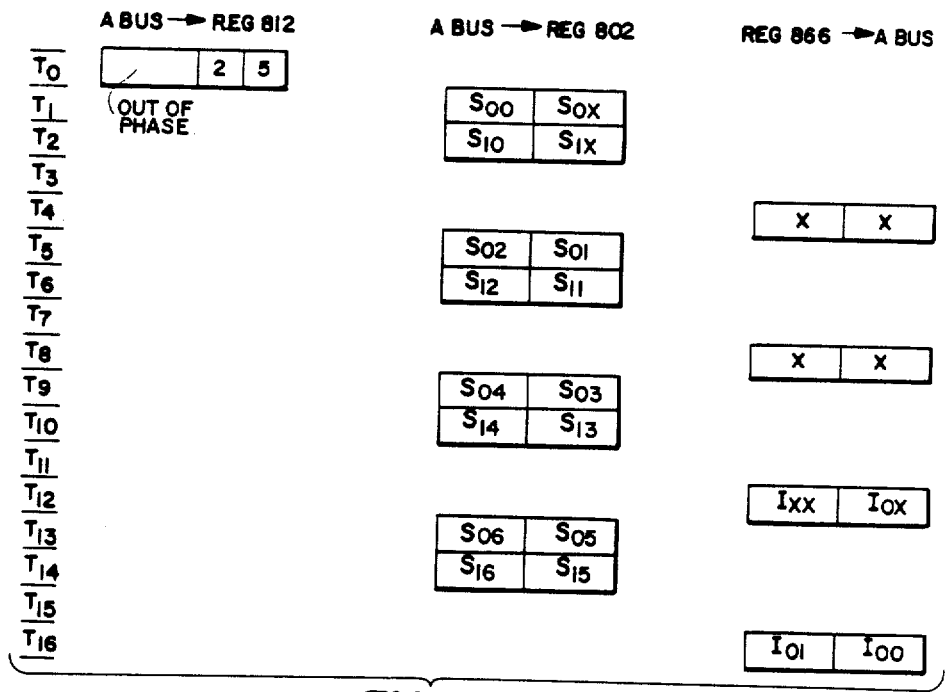

In the description set forth above, the control value applied to the pixel interpolator 246 during the instruction cycle $T_0$ conditions the interpolator to operate in the in-phase mode. FIGS. 9D and 9E illustrate the operation of the pixel interpolator in the out-of-phase mode. As set forth above, the out-of-phase mode is selected for the pixel interpolator 246 when the address of an input pixel pair does not coincide with the address of a 16-bit value in the VRAM 216. This condition occurs when the pairs of input pixel values are split across a VRAM word boundary. FIG. 9E illustrates this situation.

Figure 9F:
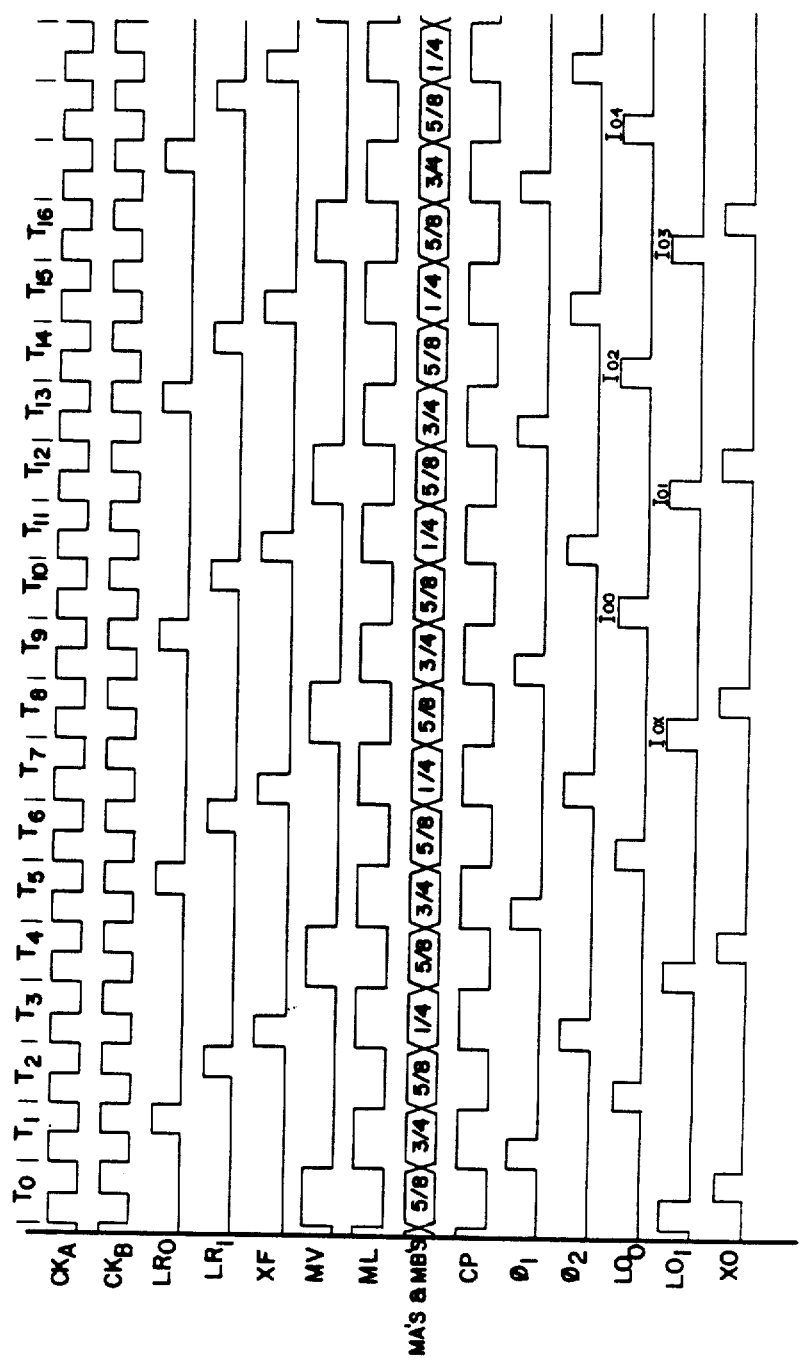

The fundamental difference in the operation of the pixel interpolator 246 in its in-phase and out-of-phase modes are shown in FIGS. 9E and 9F. As shown in FIG. 9E, the pixel values $I_{00}$ and $I_{01}$ are available at the output register 866 during the instruction cycle $T_{16}$ rather than during the cycle $T_{12}$ as in the in-phase mode. This change in operation is accomplished, as shown in FIG. 9F, by switching the signals $L0_0$ and $L0_1$ and delaying the signal X0 by two periods of the signal $CK_A$.

Although the pixel interpolator 246 is described as a device for spatially interpolating pixel values for a video image, it may also be used, more generally, for averaging pixel values in either the horizontal or vertical direction. This function is useful in various filtering algorithms. For example, if the pixel values in FIG. 9A were to be applied to the pixel interpolator 246 in the sequence $S_{00}$, $S_{01}$, $S_{00}$, $S_{01}$, $S_{02}$, $S_{03}$, $S_{02}$, $S_{03}$; etc. the output values provided by the interpolator represent pixels that are interpolated, or averaged in the horizontal direction only.

Using the foregoing description and the FIGS. 8A, 8B and 9A through 9F, one skilled in the art of digital video signal processing circuit design could readily design and build suitable circuitry for use as the pixel interpolator 246.

Pixel values and data held in the VRAM 216 are accessed by the video signal processor 210 via the statistical decoder 230, input FIFO's 232 and 234 and output FIFO 236. All data read and data write operations performed on the VRAM 216 using these devices, are coordinated by the VRAM control unit 238. The statistical decoder and each of the FIFOs has an associated VRAM address and control value. The microcode sequencer 226 initializes the FIFO parameters after which, each FIFO runs autonomously. From the point of view of the video signal processor 210, there are three input instructions and one output instruction. The three input instructions are to get pixel values from the statistical decoder 230, input FIFO 232 or input FIFO 234 and the output instruction is to send a pixel value to the output FIFO 236. Each of these devices automatically issues memory access requests for 32-bit words to and from the VRAM 216 and performs the packing and unpacking needed to convert between eight or 16-bit pixel values and the 32-bit words stored in the VRAM 216, or to convert statistically encoded data into pixel values.

The statistical decoder 230 translates variable length encoded data held in the VRAM 216 into 16-bit binary values which are applied to the bus B BUS in response to a value of 14 in the B SRC field of the microcode control word. FIG. 10A is a block diagram of circuitry suitable for use as the statistical decoder 230.

As set forth below in reference to FIG. 13A, the address value used to access the VRAM 216 for the statistical decoder 230 is loaded into the VRAM control unit from, for example, the data RAM 228, in two steps. First, a value representing the 8 MSB positions of a 22 bit address value is applied to the bus B BUS, while the B DST field of the microcode control word has a value of 31. Next the 14 LSB positions of the address value are loaded from the 14 MSB positions of a value applied to the bus B BUS while the B DST field has a value of 30. A value of 30 in the B DST field of the microcode control word conditions control circuitry 1018 to reset the statistical decoder 230 and to initiate a statistical decoding operation.

A typical sequence of instructions would proceed as follows. During two successive instruction cycles, the eight MSB's and 14 LSB's, respectively, of an address value are loaded into a pair of registers in the VRAM control unit 238. In the same instruction cycle in which the 14 LSB's of the address value are loaded, the statistical decoder 230 is reset and starts to operate.

The reset operation is performed by control circuitry 1018 which applies a logic-one value as the signal RV to the flip-flop 1017, marking the eight-bit value held in the output register 1016 as invalid. At the same time, the control circuitry 1018 pulses a signal RDR, which is applied to the set input terminal, S, of a flip-flop 1022. This operation changes the output signal, SDR, of the flip-flop 1022 to a logic-one value. The signal SDR is applied to the VRAM control unit 238 via the bus R/S, to request a read operation at the addressed location in the VRAM 216. The output signal, SDR, of the flip-flop 1022 is also applied to the control circuitry 1018 to indicate that data has been requested from the VRAM 216.

When the VRAM control unit 238 has processed the requested read operation and the VRAM 216 applies the requested 32-bit value to the bus D BUS, the VRAM control unit 238 pulses a strobe signal SDS, provided via the bus R/S. This signal conditions a register 1010 to load the 32-bit value from the bus D BUS. The signal SDS is also applied to the reset input terminal R of the flip-flop 1022 to change the state of the signal SDR to logic-zero when the 32-bit data value is loaded into the register 1010. One-half of one period of the signal CK after the signal SDS becomes logic-zero, the control circuitry 1018 provides a signal SRL which transfers the 32-bit value from the register 1010 to a shift register 1012 and resets the value held in a counter 1020 to zero.

The statistical decoder 230 always begins its decoding operation with the LSB of the 32-bit value read from the VRAM 216. As described below, the input FIFO's 232 and 234 and the output FIFO 236 may specify a byte position value as the first byte to be transferred from the four-byte value which is read from or written to the VRAM 216. The byte-position value for these devices is encoded as the two LSB positions of a 24-bit address value. In the present embodiment of the invention, the statistical decoder 230 ignores this byte-position value. Consequently, data applied to the statistical decoder 230 is assumed to begin with the LSB position of a 32-bit word in the VRAM 216.

Whenever the control circuitry 1018 pulses the signal SRL to transfer a 32-bit data value from the register 1010, it also pulses the signal RDR to condition the VRAM control unit 238 to increment the stored address value and provide the next successive 32-bit data value from the VRAM 216 to the register 1010. One-half of one period of the signal CK after pulsing the signals SRL and RDR, the circuitry 1018 applies a logic-one value as the signal EN to the statistical decoding circuitry 1014, enabling the circuitry 1014 to begin decoding the value held in the shift register 1012.

The statistical decoding circuitry 1014 used in this embodiment of the invention may, for example, be of the type described in U.S. Pat. No. 4,396,906 entitled "Method and Apparatus for Digital Huffman Encoding", which is hereby incorporated by reference. When enabled, the circuitry 1014 gates the system clock signal CK as a signal SRCK to the shift register 101 and to the counter 1020. The shift register 1012, provides one bit of the value it holds for each cycle of the signal SRCK, starting with the LSB position and continuing toward to the MSB position. As each bit is provided by the shift register 1012, the value in the counter 1020 is incremented by one.

When the statistical decoding circuitry 1014 has processed a sufficient number of bits to produce a 16-bit output value, in other words, when it has decoded one variable-length encoded value, it applies the decoded 16-bit value to the input port of the output register 1016 and applies a logic-one value, as the signal RDY, to the control circuitry 1018. The control circuitry 1018 then pulses the signal ORL to load the value provided by the circuitry 1014 into the output register 1016 and to set the flip-flop 1017, marking the data held by the register 1016 as valid.

This decoding operation is complete when the value held in the output register 1016 is accessed as a source for the bus B BUS by the use of a microcode control word having a B SRC field with a value of 14 or 15. On the next clock period after the control circuitry 1018 detects this value in the B SRC field, it pulses the signal RV, marking the data held in the register 1016 as invalid. A value of 14 for BSRC indicates that more data values are expected while a value of 15 indicates that the value accessed is the last in the sequence.

The analysis set forth above assumes that the data in the register 1016 is not accessed until it is valid. If an attempt is made to access invalid data (e.g. B SRC=14 and ORV=0), the control circuitry 1018 pulses the signal PR. The signal PR is applied to the set input terminal, S, of a flip-flop 1023. When the signal PR is pulsed, the output signal SDPA of the flip-flop 1023 changes to a logic-one value. This signal is applied to the pause logic 240 to cause the microcode RAM and sequencer 226 to place the video signal processor in a paused state. The signal SDPA is further applied to one input terminal of an AND gate 1025, the other input terminal of which is coupled to receive the signal SDR. If both SDR and SDPA have logic-one values, the output signal, SDP, of the AND gate 1025 becomes logic-one. This signal is applied to the VRAM control unit 238 via the pause logic 240 to increase the priority of the requested read operation. The signal SDP is an urgent read operation request signal from the statistical decoder 230. The signal SDPA becomes a logic-zero, releasing the paused state, when the control circuitry 1018 pulses the signal ORL to mark the value held in the register 1016 as valid.

The example set forth above describes the internal operation of the statistical decoder 230 in producing one 16-bit output value. Typically, the decoder 230 will produce a sequence of such values. To produce the first value in this sequence, the circuitry shown in FIG. 10 operates as described above. Once that value has been transferred to the output register 1016, the control circuitry 1018 applies a logic-one value as the signal EN, enabling the statistical decoding circuitry 1014 to produce the next decoded value. When the first decoded value is accessed from the output register 1016 and the signal ORV is changed to have a logic-zero value, the control circuitry 1018 pulses the signal ORL to load the second value. If the second value has not been decoded when the first value is accessed, the control circuitry 1018 does not pulse the signal ORL until the signal RDY is changed to a logic-one value by the statistical decoding circuitry 1014. This sequence of operations repeats until the value in the output register 1016 is accessed using a value of 15 in the BSRC field of the microcode control word. When the value in the output register 1016 is accessed in response to a microcode control word having a value of 15 in its BSRC field, the control circuitry 1016 terminates the operation of the statistical decoding circuitry 230 by changing values of the signal EN to a logic-zero. Data may not be accessed using the statistical decoder 230 until a new value is established for the 14 LSB positions of the VRAM address value used by the decoder 230.

In any of the decoding operations described above, 32-bit data values are provided from the VRAM 216 to the register 1010 as required. When the counter 1020 is incremented to have a value of 31, indicating that the MSB of the current 32-bit value has been applied to the circuitry 1014, the control circuitry 1018 pulses the signal SRL to transfer the next 32-bit value from the register 1010 to the shift register 1012 and to reset the value of the counter 1020. At the same time, the control circuitry 1018 pulses the signal RDR to request the next sequential 32-bit value from the VRAM 216.

If, when the value in the counter 1020 equals 31, the value of the signal SDR is a logic-one, the control circuitry 1018 cannot transfer a value from the register 1010 to the register 1012 because the read operation to fill the register 1010 has not yet been completed. In this instance, the control circuitry 1018 changes the signal EN to have a logic-zero value, to disable the decoding circuitry 1014. When the requested read operation is completed, the control circuitry 1018 pulses the signal SRL to transfer the new 32-bit value from the register 1010 to the register 1012, changes the value of the signal EN to a logic-one and pulses the signal RDR. These signals enable the statistical decoder 230 to resume normal operation, and request a new 32-bit value from the VRAM 216.

Figure 10B:
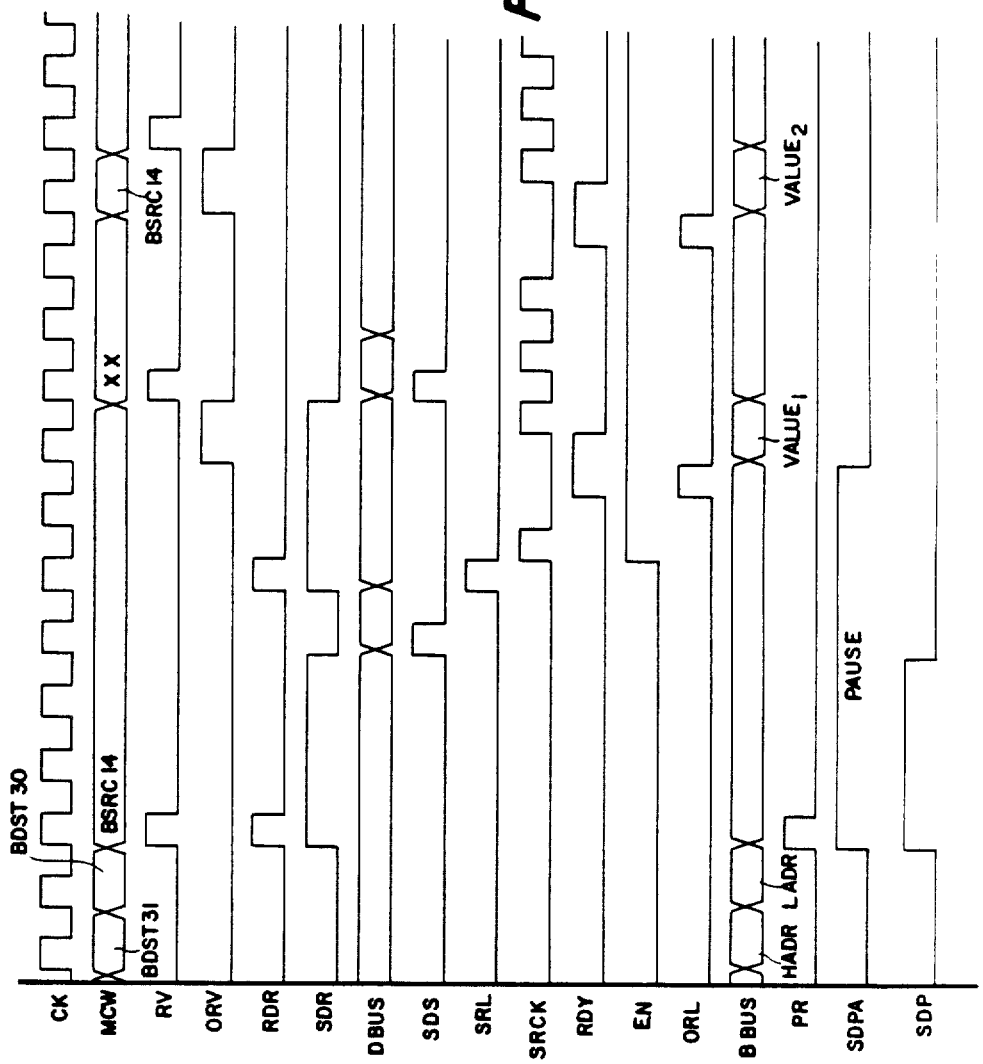
FIG. 10B is a timing diagram that is useful for understanding the operation of the circuitry shown in FIG. 10A.

FIG. 10B is a timing diagram which shows the relative timing of signals produced by the control circuitry 1018 as two data values are decoded.

From the FIGS. 10A and 10B and from the description set forth above, one skilled in the art of digital signal processing circuit design could readily design and construct suitable circuitry for use as the statistical decoder 230.

The input FIFO's 232 and 234 allow the video signal processor 210 to read a random eight-bit or 16-bit value or to read a sequence of eight-bit or 16-bit values for the VRAM 216 for processing by its pixel processing elements. In either the random or the sequential mode, the microcode control word instructions executed by the microcode RAM and sequencing circuitry 226 apply an initial address value to the VRAM control unit 238. The selected input FIFO accesses the VRAM 216 via the VRAM control unit 238 and provides the requested value or values to the bus B BUS without further intervention by the microcode RAM and sequencer 226.

The starting address values for the input FIFO's 232 and 234 supplied by, for example, the data RAM 228, are established in the VRAM control unit 238 in the same manner that address values are specified for the statistical decoder 230. The eight MSB positions of an address value are transferred via the bus B BUS to the address registers for the respective input FIFO's 232 and 234, responsive to the B DST field of microcode control words having respective values of 23 and 27. The 14 LSB positions of an address value for the input FIFO's 232 and 234 are transferred from the 14 MSB positions of values applied to the bus B BUS when the B DST field of the microcode control word has values of 22 and 26, respectively. The two LSB positions of the values applied to the bus B BUS when the B DST field has values of 22 and 26 are stored internally in the respective input FIFO's 232 and 234. The value represented by these two bits points to a particular byte of the four byte value provided by the VRAM 216 as the first byte to be provided to the bus B BUS.

Figure 11A:
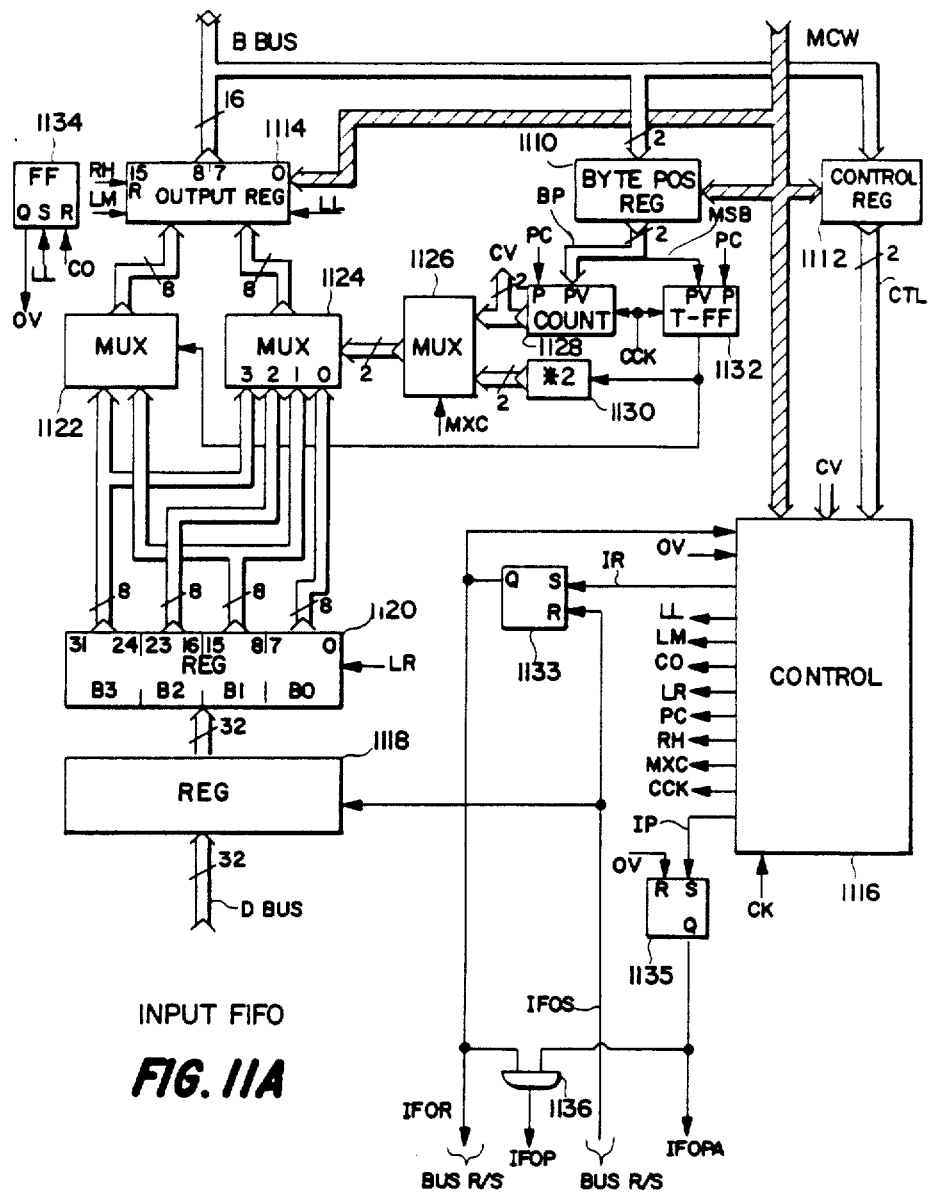
FIG. 11A is a block diagram of input FIFO circuitry suitable for use in the video signal processing circuitry shown in FIG. 2.

FIG. 11A is a block diagram showing circuitry suitable for use as either of the input FIFO's 232 or 234. The circuitry is described below for the input FIFO 232. Variations in the description to cover the input FIFO 234 are indicated parenthetically where appropriate. The circuitry shown in FIG. 11A is described in terms of a normal sequence of operations, where the input FIFO is set to operate in the random mode. This description is followed by an explanation of the changes in the sequence of operations when the FIFO is set to operate in the sequential mode.

The first step in the sequence is to apply a control value to the bus B BUS using a microcode control word having a value of 21 (29 for the FIFO 234) in its B DST field. Responsive to this B DST value, the control value provided, for example, by the ALU 244, is loaded into a register 1112. The control value used in this example conditions the input FIFO 232 to operate in its random mode as opposed to its sequential mode and to provide eight-bit values as opposed to 16-bit values to the bus B BUS.

The next step in the sequence is to establish the address value for the FIFO 232 in the VRAM control unit 238 as set forth above. A register 1110 internal to the FIFO 232 is responsive to the B DST field of the microcode control word having a value of 22 (26) to load the byte position value, that is, the two LSB's of the 16-bit address value provided via the bus B BUS. Control circuitry 1116 is also conditioned by this value of the B DST field to reset the input FIFO 232 to an initial state and to initiate a VRAM read operation.

In this reset operation, the control circuitry 1116 pulses a signal CO to reset a flip-flop 1134. One-half of one period of the signal CK later, the control circuitry 1116 pulses the signal PC to load the byte position value, BP, from the register 1110 into the counter 1128 and flip-flop 1132. One-half of one period of the signal CK after this operation, the control circuitry 1116 pulses a signal IR, which is applied to the set input terminal, S, of a flip-flop 1133. The signal, IFOR, provided by the flip-flop 1133 is applied to the VRAM control unit 238 via the control bus R/S, to condition the VRAM control unit 238 to initiate a read operation for the addressed memory location in the VRAM 216. The signal IFOR is also applied to the control circuitry 1116 to indicate that a read operation is in progress.

When the VRAM control unit 238 has processed the read operation, and the VRAM 216 has applied the requested data to the bus D BUS, the VRAM control unit pulses a strobe signal IFOS, provided via the bus R/S, to condition a register 1118 to load the 32-bit value from the bus D BUS. The signal IFOS is further applied to the reset input terminal, R, of the flip-flop 1133, to reset the internal state of the flip-flop 1133 and, so the signal IFOR, to a logic-zero value, indicating that the memory read operation is complete.

During the first period of the signal CK after the signal IFOR becomes a logic zero, the control circuitry 1116 pulses a signal LR to transfer the 32 bit value held in the register 1118 to the register 1120.

The bits of the register 1120 are divided into four eight-bit segments, B0, B1, B2, and B3 encompassing bits 0–7, 8–15, 16–23 and 24–31, respectively. The eight-bit values B0, B1, B2 and B3 are applied to respectively different input ports of a multiplexer 1124. The multiplexer 1124 is controlled by a value provided by the counter 1128 or by the multiplier 1130 to provide one of the four values applied to its input port to the eight LSB positions of the output register 1114.

In the present example, the control value in the register 1112 indicates that eight-bit values are to be provided by the output register 1114. Consequently, the control circuitry 1116 applies a logic-one value as the signal MXC to a multiplexer 1126. This value of the signal MXC conditions the multiplexer 1126 to apply the value held in the counter 1128 to the control input port of the multiplexer 1124. This value, which is the value of the first byte position, conditions the multiplexer 1124 to apply the addressed byte to the eight LSB positions of the output register 1114. In the next successive period of the signal CK after pulsing the signal LR, the control circuitry 1116 pulses the signals LL and RH to load the value applied by the multiplexer 1124 into the eight LSB positions of register 1114, reset the eight MSB positions of the register 1114 and to set the flip-flop 1134. Since the flip-flop 1134 is set, its output signal, OV is a logic-one indicating that the value in the output register 1114 is valid.

The sequence of operations for this example is completed when the microcode RAM and sequencing circuitry 226 executes a microcode control word in which the B SRC field has a value of 12 (13 for the input FIFO 234). This value, applied to the register 1114, enables that register to provide its stored value to the bus B BUS. The control circuitry 1116 is also responsive to a value of 12 (13) in the B SRC field to pulse the signal CO and thereby reset the flip-flop 1134, marking the value in the output register 1114 as invalid.

If the value in the control register 1112 indicates that 16-bit values are to be provided to the bus B BUS, the control circuitry 1116 applies a logic-zero value, as the signal MXC, to the control input terminal of the multiplexer 1126. This control value conditions the multiplexer 1126 to apply the value provided by the multiplier 1130 to the control input port of the multiplexer 1124.

The multiplier 1130 is coupled to the output terminal of the flip-flop 1132. As set forth above, the flip-flop 1132 is preset to the value of the MSB of the byte-position-value stored in the register 1110. This one-bit value is shifted one bit position toward greater significance by the multiplier 1130 (i.e multiplied by two). Thus, the value provided by the multiplexer 1124 is either a two or a zero. Accordingly, the multiplexer applies either byte B0 or byte B2 to the eight LSB positions of the output register 1114.

The output terminal of the flip-flop 1132 is further coupled to the control input terminal of a multiplexer 1122. The multiplexer 1122 is coupled to the B3 and B1 sections of the register 1120. When the value provided by the flip-flop 1132 is a logic zero or a logic-one the multiplexer 1122 applies the value held in the respective B1 or B3 sections of the register 1120 to the eight MSB positions of the register 1114. In the 16-bit mode, the control circuitry 1116 simultaneously pulses the signals LL and LM to load both the selected eight MSB's and eight LSB's into the register 1114. When this value is accessed, via a microcode control word having a value of 12 (13) in its B SRC field, the 16 MSB's or the 16 LSB's of the 32-bit value provided by the VRAM 216 may be read. If the byte position value held in the register 1110 is a 1 or a 3, it will be interpreted as a 0 or a 2, respectively; a 16-bit value including bytes B1 and B2 cannot be provided by the input FIFO's 232 and 234 used with this embodiment of the invention.

In the examples set forth above, the control value applied to the input FIFO conditions it to operate in its random mode. In this mode, the FIFO provides only the addressed value to the bus B BUS. In its sequential mode, the input FIFO 232 or 234 may provide a sequence of values starting with a value having the specified address in the VRAM 216 and continuing through successively greater address values. The operation of the FIFO's 232 and 234 in the sequential mode is described in terms of the differences from its operation in the random mode.

A first difference between the random and sequential modes is that, in the sequential mode, whenever the control circuitry 1116 pulses the signal LR to load a new 32-bit value into the register 1120, it also pulses the signal IR to request the next 32-bit value from the VRAM 216.

In the random mode, the counter 1128 and flip-flop 1132 were used only as registers to hold the byte-position value stored in the register 1110. In the sequential mode, the counter 1128 and flip-flop 1132 are used to sequentially provide successive eight-bit or 16-bit values, respectively, from the register 1120 to the output register 1114. The counter 1128 is a conventional two-bit binary counter having a preset-value input port and a preset input terminal. When the signal applied to the preset input terminal is pulsed, the counter 1128 is conditioned to load the value applied to its preset-value input terminal as its internal value. The flip-flop 1132 is a conventional trigger type or T flip-flop. This flip-flop has preset-value and preset input terminals which are conditioned by the signals applied thereto to operate as described above. A clock signal, CCK, provided by the control circuitry 1116 is applied to clock signal input terminals of both the counter 1128 and the flip-flop 1132. In response to successive pulses of the clock signal CCK, the counter 1128 cycles its internal value, CV through the values 0,1,2 and 3. The flip-flop 1132 changes its internal state between 0 and 1 in response to successive pulses of the signal CCK. In this embodiment of the invention, when the input FIFO is in its sequential mode, the signal CCK is the same as the signal LL, when the FIFO is in its random mode, the signal CCK has a constant logic-zero value. Consequently, as soon as a value is loaded into the output register 1114, the counter 1128 or flip-flop 1132 condition the multiplexers 1122 and 1124 to apply the next sequential value to the input port of the register 1114. Since the value applied to the input port of the register 1114 is changed each time a new value is loaded into the output register 1114, this applied value may be loaded into the output register as soon as the value in the register 1114 is applied to the bus B BUS.

The output value, CV, of the counter 1128 is applied to the control circuitry 1116. The control circuitry 1116 monitors this signal to determine when to transfer a 32-bit value from the register 1118 to the register 1120. When the control value held in the register 1112 indicates that the input FIFO 232 is operating in its eight-bit mode, the control circuitry 1116 pulses the signal LR to transfer a 32-bit value from the register 1118 to the register 1120 coincident with the value of the signal CV changing from three to zero (i.e. when the MSB of the signal CV changes from one to zero). When the input FIFO is operating in 16-bit mode, the control circuitry 1116 pulses the signal LR when the value of the signal CV changes from one to two or from three to zero (i.e. when the LSB of the signal CV changes from one to zero).

The examples set forth above assume that the VRAM control unit 238 and VRAM 216 provide 32-bit data values to the input FIFO's 232 and 234 in a steady stream. If this stream should be interrupted and, for example, the signal IFOR has a value of logic-one, indicating that a read operation is in progress, when the value of the signal CV changes from three to zero, the control circuitry 1116 does not pulse the signal LR. In this instance, the circuitry 1116 freezes its internal state until the signal IFOR changes to a logic-zero value, indicating that the requested VRAM read operation has occurred and, thus, that the register 1118 contains valid data. When the signal IFOR becomes zero, the control circuitry 1116 resumes its operation.

If, while the internal state of the control circuitry 1116 is frozen, a request is received to read the contents of the register 1114 onto the bus B BUS (i.e. BSRC = 12), the control circuitry 1116 pulses a signal IP which is applied to the set input terminal, S, of a flip-flop 1135. This action changes the state of the signal, IFOPA, provided by the flip-flop 1135 to a logic-one. The signal IFOPA is applied to the pause logic circuitry 240 which conditions the microcode RAM and sequencer circuitry to place the video signal processing circuitry 210 into the paused state. As set forth above, in reference to FIG. 3A, the clock signals $CK_A$ and $CK_B$ are disabled in the paused state, effectively freezing the internal state of the data path circuitry 242, ALU 244, data RAM 228 and pixel interpolator 246. The signal IFOPA and the signal IFOR are applied to the input terminals of an AND gate 1136. When both of these signals have logic-one values, indicating that a read operation has been requested and that the processor 210 is in a paused state waiting for a value from the input FIFO 232, the output signal, IFOR of the AND gate 1136 changes to a logic-one value. The signal IFOR is applied, via the pause logic 240, to the VRAM control unit 238. A logic-one value for the signal IFOR conditions the VRAM control unit 238 to process the read request operation for the input FIFO 232 as an urgent request, that is to say, with increased priority. When the read operation completes the signal IFOS resets the flip-flop 1133, changing the signals IFOR and IFOP to a logic-zero value. When the requested value from the register 1118 has been propagated to the output register 1114, the control circuitry 1116 sets the flip-flop 1134, the output signal OV of which resets the flip-flop 1135 to release the processor circuitry 210 from the paused state.

Figure 11B:
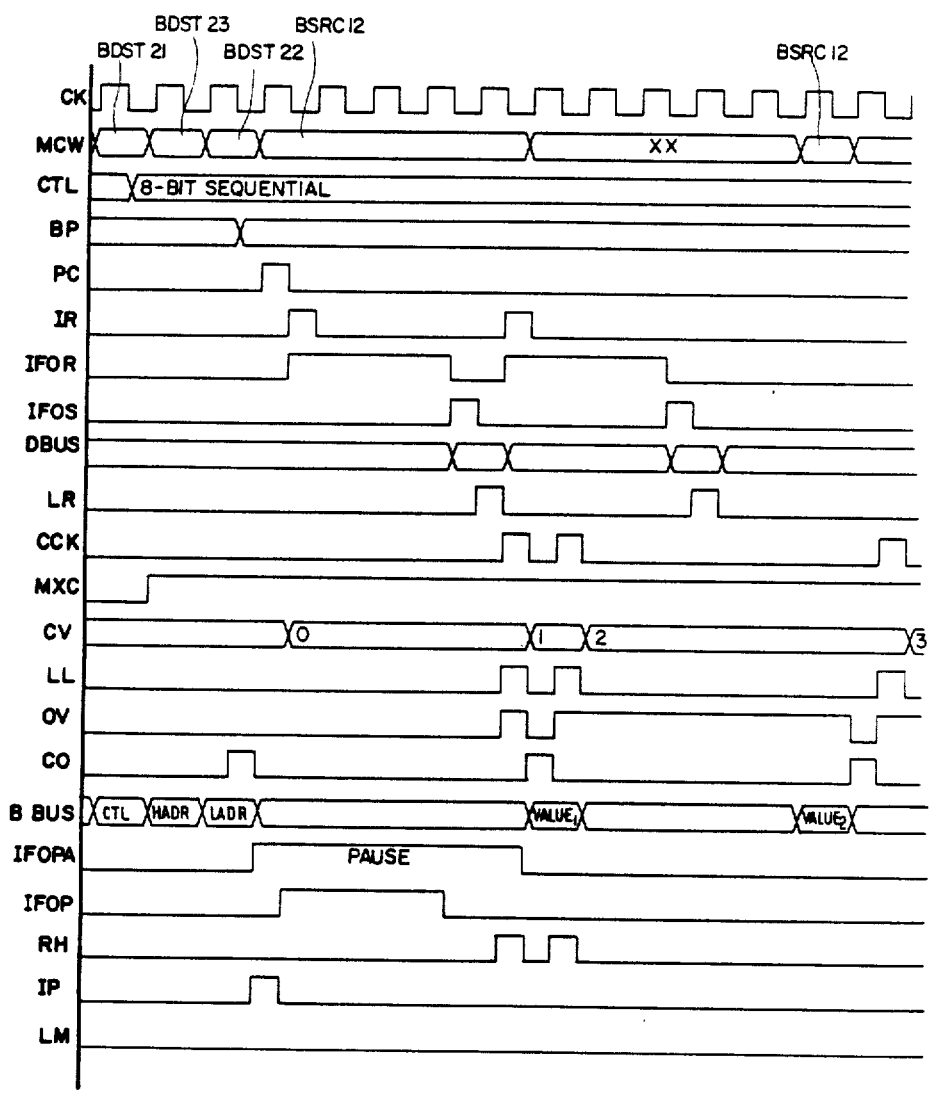
FIG. 11B is a timing diagram that is useful for understanding the operation of the circuitry shown in FIG. 11A.

FIG. 11B is a timing diagram showing the relative timing of the signals produced by the control circuitry 1116 for two sequential eight-bit data requests of the input FIFO 232.

The output FIFO 236 performs a function that is essentially the opposite of that performed by the input FIFO's 232 and 234; it accepts data in one or two bytes at a time from the pixel processing elements of the video signal processor 210, formats this data into 32-bit blocks and transfers these blocks to the VRAM 216. The output FIFO 236 has two operational modes, a random mode in which a single eight or 16-bit data value is written into VRAM 216 using a given address value, and a sequential mode in which a sequence of eight or 16-bit data values are written using successively increasing address values.

The address value used for a random transfer or the starting address value used for a sequential transfer is established in the VRAM control unit in the same manner as set forth above for the statistical decoder 230 and the input FIFO's 232 and 234. The value of the B DST fields used for the eight MSB's and 14 LSB's of the 22-bit address value are 15 and 14, respectively. The value in the two LSB positions of the 16-bit value applied to the bus B BUS when the B DST field is 14, are stored in a register internal to the output FIFO 236. This value points to a particular byte position in the 32-bit (four-byte) value applied to the VRAM 216 that will be the lowest byte, or the only byte to be written. The output FIFO 236 and VRAM control unit 238 include circuitry that prevents the corruption of data in the VRAM 216 which corresponds to the other byte-positions in the 32-bit value which are not written into the VRAM 216.

Figure 12A:
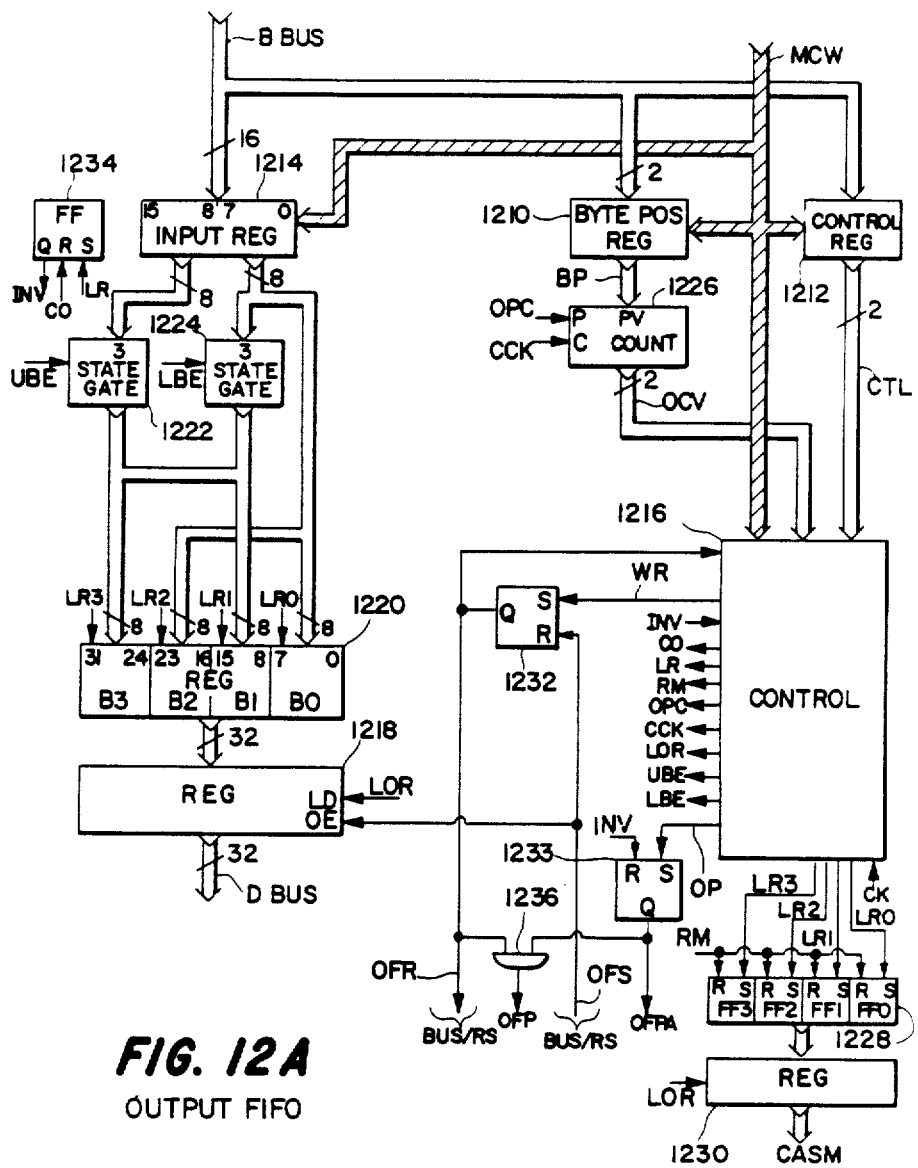
FIG. 12A is a block diagram of output FIFO circuitry suitable for use in the video signal processing circuitry shown in FIG. 2.

FIG. 12A is a block diagram showing circuitry suitable for use as the output FIFO 236. This circuitry is described in terms of a normal sequence of operations in the random mode in which a single eight-bit value is to be written into the VRAM 216 using a predetermined address value. This description is followed by an explanation of the differences in the operation of the output FIFO when the FIFO is operated in the sequential mode instead of the random mode and when 16-bit data values are used instead of eight-bit values.

The first step in the sequence of operations which writes one byte of data to a random location in VRAM 216 is to apply a control value to the output FIFO 236 which conditions the output FIFO to operate in its random mode and to expect eight-bit input values. In the present embodiment of the invention, a two-bit control value is applied to the bus B BUS by, for example, the ALU 244, in response to a microcode control word that has a value of 13 in its B DST field. The B DST field of the microcode control word is applied, via the bus MCW, to a control register 1212. The register 1212 is responsive to the B DST field of the microcode control word having a value of 13 to load the value conveyed by the two LSB positions of the bus B BUS as the control value for the output FIFO 236.

Control circuitry 1216, internal to the output FIFO 236, is also responsive to the value of 13 in the B DST field to initiate a write operation which transfers data held in a register 1220 to the VRAM 216. This data is the last partial block of data from the previous data output operation.

If a signal OFR, provided by a flip-flop 1232 has a logic-zero value, indicating that no memory write operation is in progress for the output FIFO 236, the control circuitry 1216 pulses a signal LOR to transfer the value in the register 1220 to the output register 1218 and to transfer a four-bit byte mask held in a latch 1228 into a four-bit register 1230. One-half of one period of the signal CK after the control circuitry pulses the signal LOR, it pulses a signal WR which is applied to the set input terminal, S, of the flip-flop 1232. This action changes the state of the signal OFR, provided by the flip-flop 1232 to a logic-one value.

The signal OFR is applied to the VRAM control unit 238 via the bus R/S. A value of logic-one from the signal OFR is interpreted by the VRAM control unit 238 as a request for a VRAM write operation using the address value held in the VRAM control unit for the output FIFO 236 and using the 32-bit data value held in the register 1218. The byte mask in the register 1230 is applied to the VRAM control unit 238 via the bus CASM. This mask is used in the VRAM control unit 238 to condition the VRAM 218 to store only those bytes in the register 1218 having byte positions that correspond to the byte mask signal CASM, that is, only those bytes which were marked as valid by the control circuitry 1216 as they were loaded into the register 1220. The method by which bytes are marked as valid and the use of the signal CASM by the VRAM control unit 238 are described in detail below.

At the same time that the control circuitry 1216 pulses the signal WR, it pulses a signal RM, which is applied to the reset input terminal R, of each of the four flip-flops in the latch 1228. This signal resets the flip-flops FF0 through FF3 in the latch 1228 marking the values of the respective byte-positions B0 through B3 as invalid.

As set forth above, the control unit 1216 initiates a write operation only if the signal OFR is zero. If the signal OFR is a logic-one when the value in the control register 1212 is changed, the control circuitry 1216 freezes its internal state until a signal, OFS, provided by the VRAM control unit 238 indicates that the requested memory write operation has been done. The signal OFS is applied to an output enable terminal, OE, of the register 1218 to enable that register to apply its stored value to the bus D BUS. While the signal OFS has a logic one value, the data in the register 1218 is transferred to the VRAM 216. The signal OFS also resets the flip-flop 1232 which changes the value of the signal OFR to a logic-zero. The control circuitry 1216 is responsive to the signal OFR having a logic-zero value to resume its normal operation.

To prevent erroneous data from being written into the VRAM 216 by the first output FIFO request after power is applied to the video signal processor 210, the flip-flops 1228 are conditioned, for example, by conventional power-on reset circuitry, to have initial values of logic-zero. As set forth below, values of logic-zero in these flip-flops prevent data from the register 1220 from being written into the VRAM 216.

When the data from the previous output operation has been transferred from the register 1220 to the register 1218 and a memory write operation has been performed, the address value for the exemplary random output operation may be specified. This step is described above. A byte-position register 1210 is responsive to a value of 14 in the B DST field to load the value conveyed by the two LSB positions of the bus B BUS.

As set forth above, this value indicates which byte position of the register 1220; B0, B1, B2 or B3; will hold the applied data value.

The control circuitry 1216 is responsive to a value of 14 in the B DST field to pulse a signal OPC, one-half of one period of the signal CK after the byte position register is loaded, to establish the byte position value as the internal value of a two-bit counter 1226. This value is applied to the control circuitry 1216 as the signal OCV. Simultaneous with the pulsing of the signal OPC, the control circuitry 1216 pulses a signal LR to set flip-flop 1234, marking the data in the input register 1234 as invalid. The output signal, INV, of the flip-flop 1234 is applied to the control circuitry 1216 to indicate that data from the bus B BUS may be loaded into the register 1214.

The next step in the exemplary sequence of operations is to apply the eight-bit data value to the output FIFO 236. This occurs when a microcode control word has a value of 20 in its B DST field. This value in the B DST field conditions the register 1214 to load the 16-bit value provided, for example, by the ALU 244 and conveyed by the bus B BUS. Since the value in the control register 1212 indicates that eight-bit values are to be processed, only the eight LSB positions of the value in the register 1214 are relevant. When a value is loaded into the register 1214, the control circuitry 1216 pulses the signal CO which is applied to the reset input terminal of the flip-flop 1234. This action changes the state of the signal INV to logic-zero, marking the value held in the input register 1214 as valid.

The eight LSB positions of the input register 1214 are coupled directly to the bit positions 0-7 (byte position B0) and 16-23 (byte position B2) of the register 1220 and, via a three-state gate 1224 to the bit positions 8-15 (byte position B1) and 24-31 (byte position B3) of the register 1220. The eight MSB positions of the input register 1214 are coupled through a three-state gate 1222 to the byte positions B1 and B3 of the register 1220. The three-state gates 1222 and 1224 are controlled by the respective signals UBE and LBE which are provided by the control circuitry 1216. When, as in the present example, the control value in the register 1212 indicates that the output FIFO 236 is to process eight-bit values, the control signal UBE conditions the three-state gate 1222 to present a high impedance at its output port and the control signal LBE conditions the three-state gate 1224 to apply its data input value at its output port and thus, to the byte positions $B_1$ and $B_3$ of the register 1220. In the present example, therefore, the eight LSB positions of the register 1214 are coupled to each of the byte positions B0 through B3 of the register 1220.

The control circuitry 1216 is also responsive to a value of 20 in the B DST field. One-half of one period of the signal CK after this value is detected, the control circuitry 1216 pulses one of the signals LR0, LR1, LR2 or LR3 to load the eight-bit value from the register 1214 into one of the byte positions of the register 1220 and to mark the selected byte position as containing valid data by setting the respective flip-flop FF0, FF1, FF2, or FF3 in the latch 1228. Simultaneously, the control circuitry 1216 pulses the signal LR to mark the data held in the input register 1214 as invalid. The byte position in the register 1220 that is selected is determined by the signal OCV provided by the counter 1226. In the present example, this signal, the output signal of the counter 1226, is the same as the byte position value held in the register 1210.

The one-byte data value that was applied to the output FIFO 236 occupies one of the byte positions in the register 1220. This value is written into the VRAM 216 when a new control value is applied to the register 1212 as set forth above.

In the example described above, the initial control value applied to the output FIFO 236 conditioned it to operate in its random mode. If, instead, the control value had specified that the sequential mode be used, the example set forth above would describe only the first of a sequence of byte transfer operations. In the sequential mode, the value held by the counter 1226 is incremented by a pulse of the signal CCK. In this embodiment of the invention, when the output FIFO 236 is set to operate in its sequential mode, the control circuitry 1216 pulses the signal CCK whenever it pulses one of the signals LR0 through LR3.

When the second byte of a sequence is applied to the register 1214, the incremented count value signal OCV conditions control circuitry 1216 to pulse the next sequential one of the signals LR0, LR1, LR2 or LR3 and, thus, to load the input byte into the next sequential byte position B0, B1, B2 or B3, respectively, of the register 1220. Since the counter 1226 is a two-bit counter it produces a modulo-four output value, that is, it produces the values zero, one, two, three, zero, one, etc.

When the counter value OCV is incremented from three to zero, the last byte position, B3, of the register 1220 has been filled. The control circuitry 1216 then pulses the signal LOR to transfer the data in the register 1220 to the register 1218 and pulses the signal WR to cause the VRAM control unit 238 to schedule a VRAM write operation for the data held in the register 1218. If, when the signal OCV changes from three to zero, the signal OFR has a logic-one value, indicating that a write operation is in progress, the control circuitry 1216 will not pulse the signal LOR. Instead, it will freeze its internal state until the signal OFS, provided by the VRAM control unit 238 resets the flip-flop 1232, changing the state of the signal OFR to logic-zero.

If an attempt is ,made to transfer data from the bus B BUS to the register 1214 while the signal INV provided by the flip-flop 1234 indicates that the data in the register 1214 is valid (i.e. that it has not been transferred to the register 1220), the control circuitry 1216 will pulse the signal OP, which sets the flip-flop 1233 and, via the signal OFPA provided by the flip-flop 1233 to the pause logic 240, it will place the circuitry 210 in a paused state. The signal OFPA is logically ANDed with the signal OFR by an AND gate 1236 to produce a signal OFP. The signal OFP is applied, via the pause logic 240, to the VRAM control unit 238. This signal raises the priority of the VRAM write operation that is currently in progress. When this write operation is complete, the VRAM control unit 1216 pulses the signal OFS which resets the flip-flop 1232 changing the value of the signals OFR and OFP to logic-zero.

Responsive to the transition of the signal OFR from a value of logic-one to a value of logic-zero, the circuitry 1216 pulses the signal LOR to load the value in the register 1220 into the register 1218, and to load the value of the latch 1228 into the register 1230. The control circuitry 1216 then pulses the signal WR to request a VRAM write operation. One-half of one period of the signal CK after the control circuitry 1216 pulses the signal LOR, it pulses the signal RM to reset the flip-flops FF0, FF1, FF2 and FF3 of the latch 1228. At this point in its sequence of operations, the output F1FO 236 is conditioned to accept the next byte of input data and to store it in the byte position B0 of the register 1220. Accordingly, the control circuitry 1216 pulses one of the signals LR0 through LR3 to load the value held in the register 1214 into the corresponding byte position B0 through B3 of the register 1220. Simultaneously, the control circuitry 1216 pulses the signal LR to set the flip-flop 1234, marking the value in the input register 1214 as invalid and, via the signal INV, resetting the flip-flop 1233 to release the processor 210 from its paused state.

The last variation in the operation of the output FIFO 236 is the 16-bit data transfer. In this mode, the output F1FO accepts 16-bit values from the bus B BUS and writes them either randomly or sequentially to the VRAM 216. The output F1FO 236 is placed in the 16-bit data transfer mode by a control value loaded into the control register 1212. When the output F1FO is in this mode, the signal UBE, provided by the control circuitry 1216 conditions the three-state gate 1222 to apply the value in the eight MSB positions of the register 1214 to the bit positions B1 and B3 of the register 1220. The signal LBE has a value, in this mode, which conditions the three state gate 1224 to present a high impedance at its output port.

In the 16-bit transfer mode, the MSB of the byte position value in the register 1210 is loaded into the LSB position of the register 1226 and the control circuitry 1216 is responsive only to the LSB of the signal OCV. When this bit is a zero and a data value is loaded into the register 1214, the control circuitry pulses the signals LR0, LR1 and LR to transfer the 16-bit value from the register 1214 to the byte positions B0 and B1 of the register 1220, to set the flip-flops FF0 and FF1 in the latch 1228, and to mark the register 1214 as holding invalid data. Alternatively, when the LSB of the signal OCV is a one, the control circuitry 1216 pulses the signals LR2, LR3, and LR to transfer the 16-bit value to the bit positions B2 and B3 of the register 1220, to set the flip-flops FF2 and FF3 in the latch 1228, and to mark the register 1214 as holding invalid data. The control circuitry 1216 is responsive to a transition in the value of the LSB of the signal OCV from one to zero to transfer data held in the register 1220 to the register 1218 and to schedule a VRAM write operation.

Figure 12B:
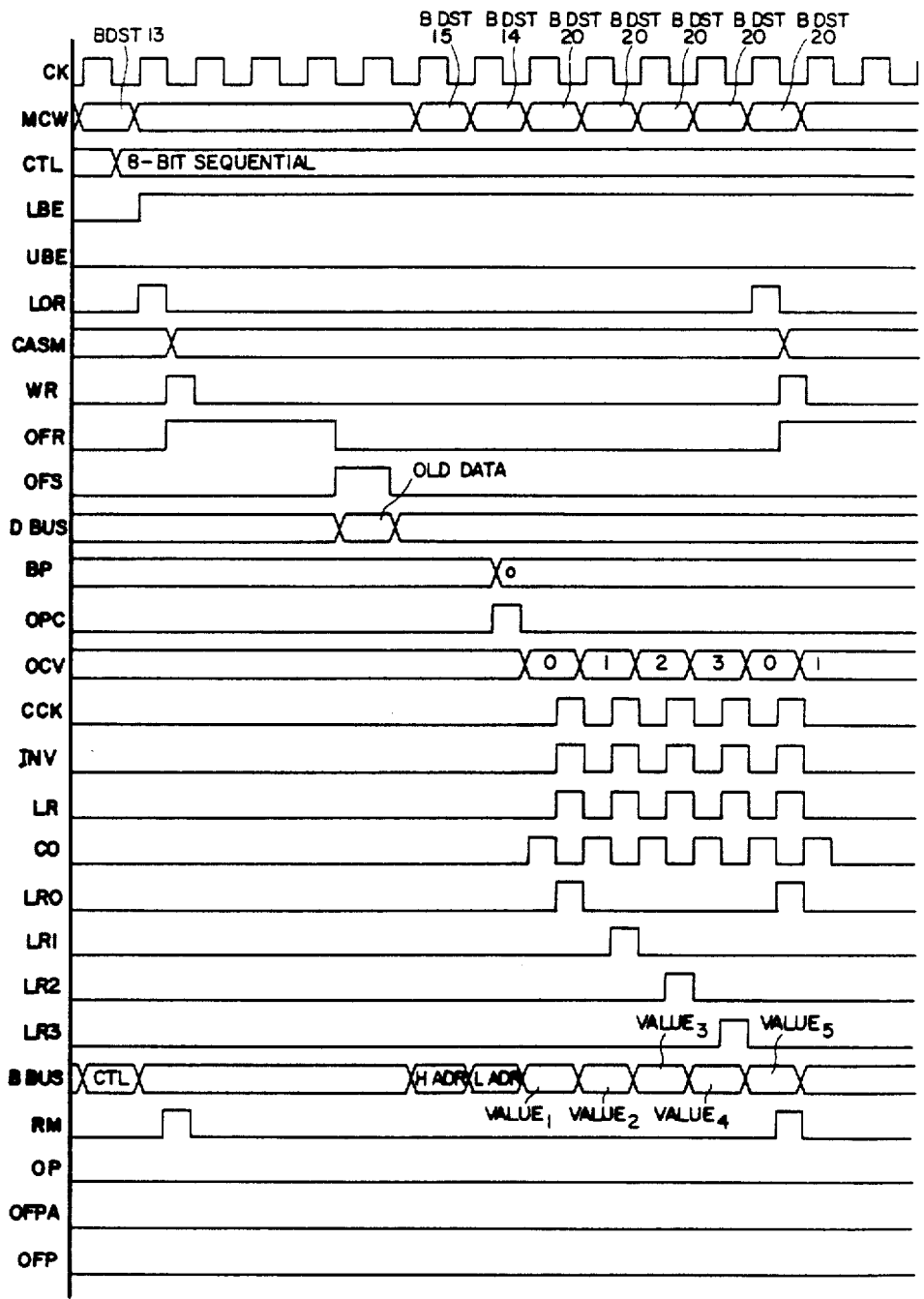
FIG. 12B is a timing diagram that is useful for understanding the operation of the circuitry shown in FIG. 12A.

FIG. 12B is a timing diagram which illustrates the relative timing of five sequential single-byte data transfers made via the output F1FO 236.

The pause logic 240 used with this embodiment of the invention includes two OR gates (not shown). The input signals SDP, IFOP, IF1P OFP are applied to the first gate which generates an output signal UREQ. The signal UREQ is applied to the VRAM control unit 238, as described below, to indicate an urgent memory operation has been requested by one of the statistical decoder 230, input F1FO's 232 and 234 or the output F1FO 236. The signals SDP, IFOP IF1P and OFP are also provided to the VRAM control unit 238 via the bus UR.

The input signals to the second OR gate are the signals SDPA, IFOPA, IF1PA and OFPA and a signal VCUPA provided by the VRAM control unit 238. The output signal of this second OR gate is the signal PAUSE that is applied to the microcode RAM and sequencer circuitry 226 as set forth above.

Figure 13A:
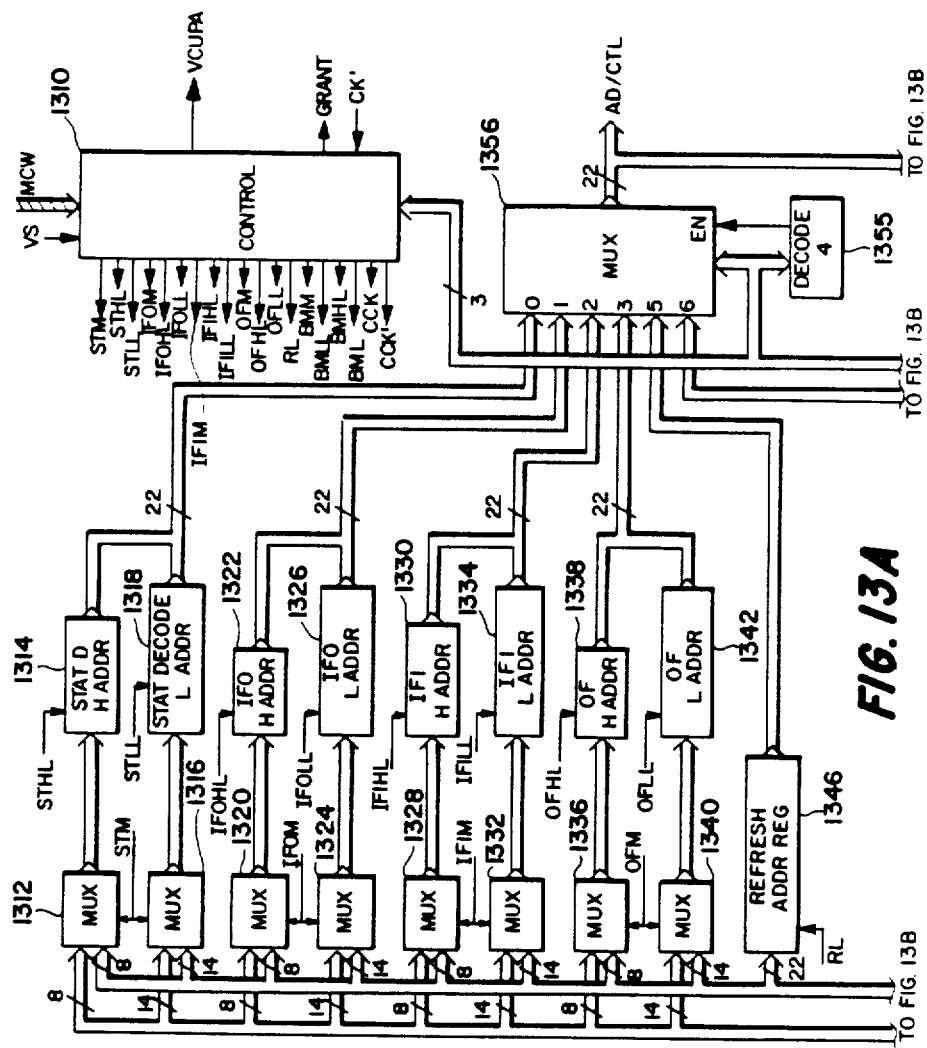
FIGS. 13A and 13B are a block diagram of the VRAM control unit used with the embodiment of the invention shown in FIG. 2.
Figure 13B:
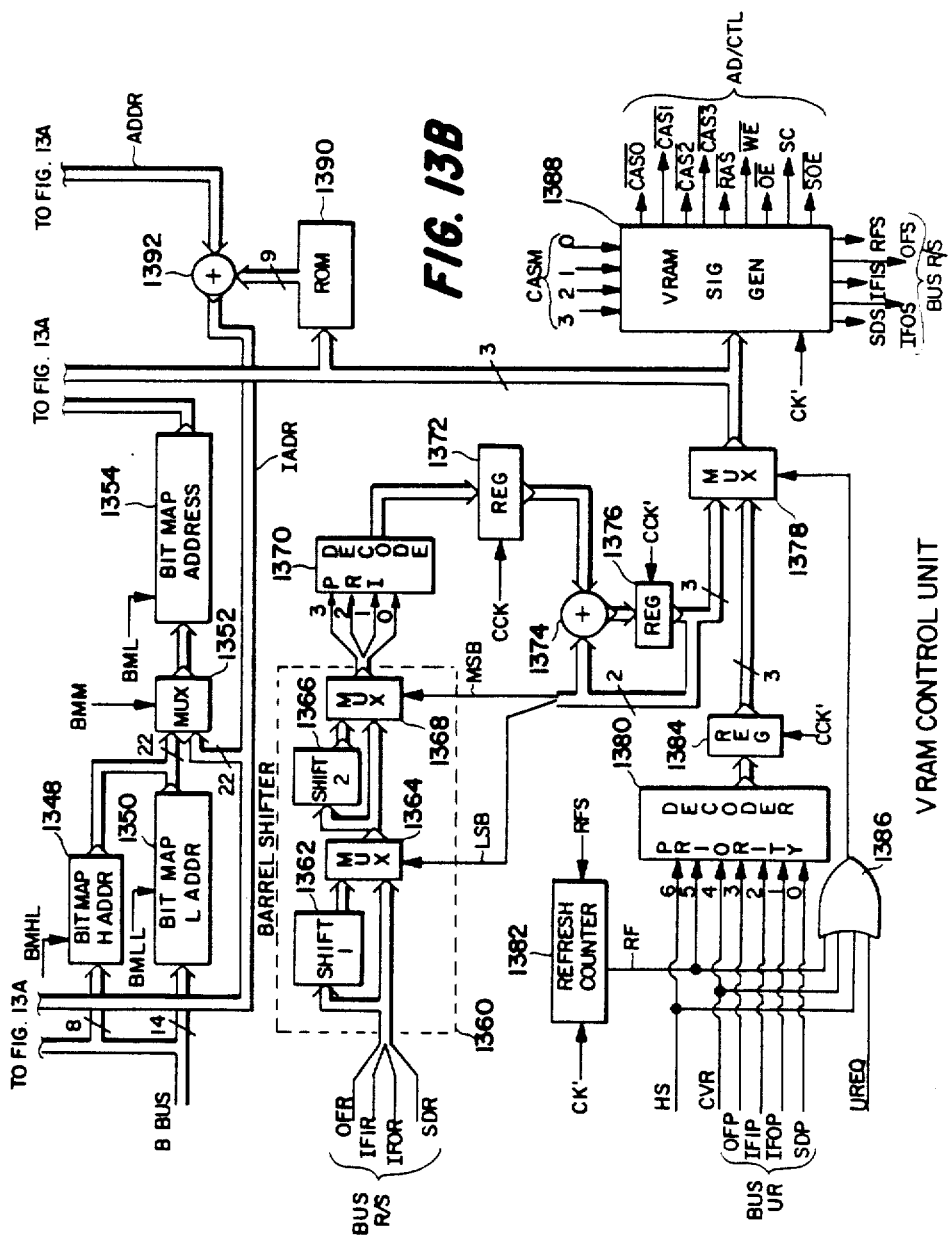

FIGS. 13A and 13B are a block diagram showing circuitry suitable for use as the VRAM control unit 238. As described above, the VRAM control unit 238 includes circuitry responsive to the B DST field of the microcode control word which stores VRAM address values for the statistical decoder 230, the input F1FO's 232 and 234 and the output F1FO 236. In addition, the VRAM control unit 238 includes circuitry for storing a bit-map address, which is used to provide pixel values to the display processor 218, and a refresh address, which is used to periodically refresh the contents of the dynamic random access memory circuits used by the VRAM 216. The VRAM control unit 238 also includes circuitry which responds to the memory read and memory write request signals generated by the statistical decoder 230, input F1FO's 232 and 234, and output F1FO 236, to read request signals for the display processor 218, to write request signals for the source of compressed video signals 212, and to internally generated refresh request signals, to initiate the various requested memory operations and to signal their completion as appropriate.

The circuitry which stores the various address values is controlled by control circuitry 1310. The circuitry 1310 is responsive to the clock signal CK', to the B DST field of the microcode control word, provided by the bus MCW, to a device selection value, provided, as set forth below, by a multiplexer 1378, and to the vertical field synchronization signal, VS, provided by the source 222. The control circuitry 1310 is primarily responsible for controlling the loading of address values for the various devices.

To load an address value for the statistical decoder 230, for example, a microcode control word, having a value of 31 in the B DST field, conditions other circuitry in the video signal processor 210, for example, the ALU 244, via a value in the B SRC field, to provide the eight MSB's of the address value as the eight LSB's of a value applied to the bus B BUS. In response to the value of 31 in the B DST field, the control circuitry 1310 applies a logic-one value as the signal STM to a pair of multiplexers 1312 and 1316 for one period of the signal CK'. This signal conditions the multiplexer 1312 to apply the eight-bit value conveyed by the bus B BUS to the input port of a register 1314. While the signal STM has a logic-one value, the control circuitry 1310 pulses a signal STHL which causes the register 1314 to load the value applied to its input port.

In a subsequent instruction cycle, a microcode control word having a value of 30 in its B DST field causes the control unit 1310 to hold the signal STM at a logic-one value for one period of the signal CK' and to pulse a signal STLL. This combination of signals conditions the multiplexer 1316 to apply the value conveyed by the 14 MSB positions of the bus B BUS to the input port of a 14-bit register 1318 and conditions the register 1318 to store the value applied to its input port. The values held in the registers 1314 and 1318 are concatenated to form a 22-bit address value which is applied to an input port, 0, of a multiplexer 1356.

The timing of the sequence of operations for storing address values for the input F1FO's 232 and 234 and for the output F1FO 236 are the same as for the operations which store an address value for the statistical decoder 230. To store address values for the input F1FO 232, multiplexers 1320 and 1324 are conditioned by a signal IFOM provided by the control circuitry 1310 to apply, respectively, the eight MSB's of an address value and the 14 LSB's of an address value to the input ports of registers 1322 and 1326, respectively. The registers 1322 and 1326 load the values applied to their respective input ports responsive to signals IFOHL and IFOLL provided by the control circuitry 1310. The multiplexers 1320 and 1324, and the registers 1322 and 1326 correspond to the multiplexers 1312 and 1316 and to the registers 1314 and 1318, respectively. The signals IFOM, IFOHL and IFOLL correspond to the respective signals STM, STHL and STLL. The signals IFOLL and IFOHL are activated by B DST values of 22 and 23, respectively; both of these values activate the signal IFOM.

The multiplexers 1328 and 1332 and the registers 1330 and 1334 are in the same configuration as the respective multiplexers 1312 and 1316 and registers 1314 and 1318. These multiplexers and registers are responsive to the signals IF1M, IF1HL and IF1LL provided by the control circuitry 1310 to load the 22-bit address value for the input F1FO 234. The eight MSB's of this value are loaded into the register 1330 when the B DST field has a value of 27 and the 14 LSB's are loaded into the register 1334 when the B DST field has a value of 26.

Address values for the output F1FO 236 are loaded into registers 1338 and 1342 via the respective multiplexers 1336 and 1340 responsive to the signals OFM, OPHL and OPLL generated by the control circuitry 1310. These signals correspond to the respective signals STM, STHL and STLL, described above. The control circuitry 1310 pulses the signals OFM and OPLL to load the 14 LSB's of the address value into the register 1342 when the B DST field has a value of 14 and pulses the signals OFM and OPHL to load the eight MSB's of the address value into the register 1338 when the B DST field has a value of 15. The 22-bit address values formed by concatenating the values held in the respective pairs of registers 1322, 1326; 1330, 1334; and 1338, 1342 are applied to respective input ports 1, 2 and 3 of the multiplexer 1356.

The second input ports of the respective multiplexers 1312 and 1316, which pass address values for the statistical decoder 230, as well as the second input ports of the corresponding pairs of multiplexers which pass address values for the input F1FO's 232 and 234 and for the output F1FO 236, are coupled to the output port of an adder 1392. As set forth below, the adder 1392 provides an incremented address value.

This incremented address value is used in the same way for statistical decoder 230, input F1FO's 232 and 234 and output F1FO 236. Only the use of the statistical decoder 230 is described herein. The eight MSB's of the incremented address value are applied to the second input port of the multiplexer 1312 and the 14 LSB's are applied to the second input port of the multiplexer 1316. When the signal STM has a logic-zero value, the multiplexers 1312 and 1316 are conditioned to pass these values to the input ports of the address registers 1314 and 1318, respectively. While a memory read operation for the statistical decoder 230 is in progress, the control circuitry 1310 pulses the signals STHL and STLL to load the incremented address value into the registers 1314 and 1318. If the statistical decoder 230 is set to operate in its sequential mode or if a second 32-bit value is needed from the VRAM 216 when the decoder 230 is set to operate in its random mode, this incremental address value is used to perform the next memory read operation for the statistical decoder 230.

The output port of the adder 1392 is further coupled to the input port of a 22-bit register 1346 which holds the address value used to perform the memory refresh operations on the VRAM 216. The output port of the register 1346 is coupled to an input port, 5, of the multiplexer 1356. The value provided by the refresh address register 1346 changes in a cycle which addresses each row in the VRAM 216 every four milliseconds. In this embodiment of the invention, the refresh operation is controlled by circuitry, described below, that is internal to the VRAM control unit 238.

The last address value held by the VRAM control unit 238 used in this embodiment of the invention, is the bit-map address. This address value is written into registers 1348 and 1350 by pulsing the respective control signals BMHL and BMLL responsive to two separate microcode control words having, for example, B DST values of 19 and 18, respectively. The address value written into the registers 1348 and 1350 is the starting address of a luminance signal bit-map that has been generated by the video signal processing circuitry 210 from a compressed representation of the image provided by the source of compressed video signal 212. The bit-map address value used to access data for the display processor 218 is held in a register 1354. The 22-bit address value obtained by concatenating the eight-bit value in the register 1348 and the 14-bit value in the register 1350 is loaded into the register 1354 in response to a pulse of the vertical field synchronizing signal, VS, provided by the source 222. In its normal mode of operation, the video signal processor 210 loads a new bit-map address value into the registers 1348 and 1350 once for every two pulses of the signal VS. Thus, each bit-map is displayed twice to reproduce a moving video scene.

The contents of the registers 1348 and 1350 are transferred to the register 1354 as follows. Coincident with a pulse of the signal VS, the control circuitry 1310 changes the state of a signal BMM to a logic-one for one period of the signal CK. This conditions the multiplexer 1352 to apply the address value held in the registers 1348 and 1350 to the output port of the register 1354. While the signal BMM is in a logic-one state, the control circuitry 1310 pulses a signal BML, causing the register 1354 to load the value applied to its input port. The value held in the register 1354 is applied to an input port, 6, of the multiplexer 1356.

When the signal BMM is in a logic-zero state, the multiplexer 1352 is conditioned to apply the 22-bit incremented address value provided by the adder 1392 to the input port of the register 1354. During a memory read operation for the display processor 218, the control circuitry 1310 pulses the signal BML, while holding the signal BMM in its logic-zero state, to load an incremented bit-map address value into the register 1354 in preparation for the next read operation for the display processor 218.

A potential conflict exists in the VRAM control unit 238 if an attempt is made to load a new address value for one of the statistical decoder 230, input FIFO's 232 and 234, and output FIFO 236 while the current address value is being incremented. The conflict would occur if the new address value were loaded and then overwritten by Lhe incremented previous address value, provided by the adder 1392. Upon detecting a potential conflict, the control circuitry 1310 changes the state of a signal VCUPA to a logic-one while an address value is being incremented and stored into one of the pairs of registers 1314, 1318; 1322, 1326; 1330, 1334; or 1338, 1342. This signal is applied to the pause logic 240 to place the processor 210 into a paused state until the incremented address has been stored. The control circuitry 1310 only pauses the processor 210 when a potential for conflict exists, that is, when an attempt is made to store data into one of the aforementioned register pairs coincides with an attempt to store an incremented address value.

Figure 13C:
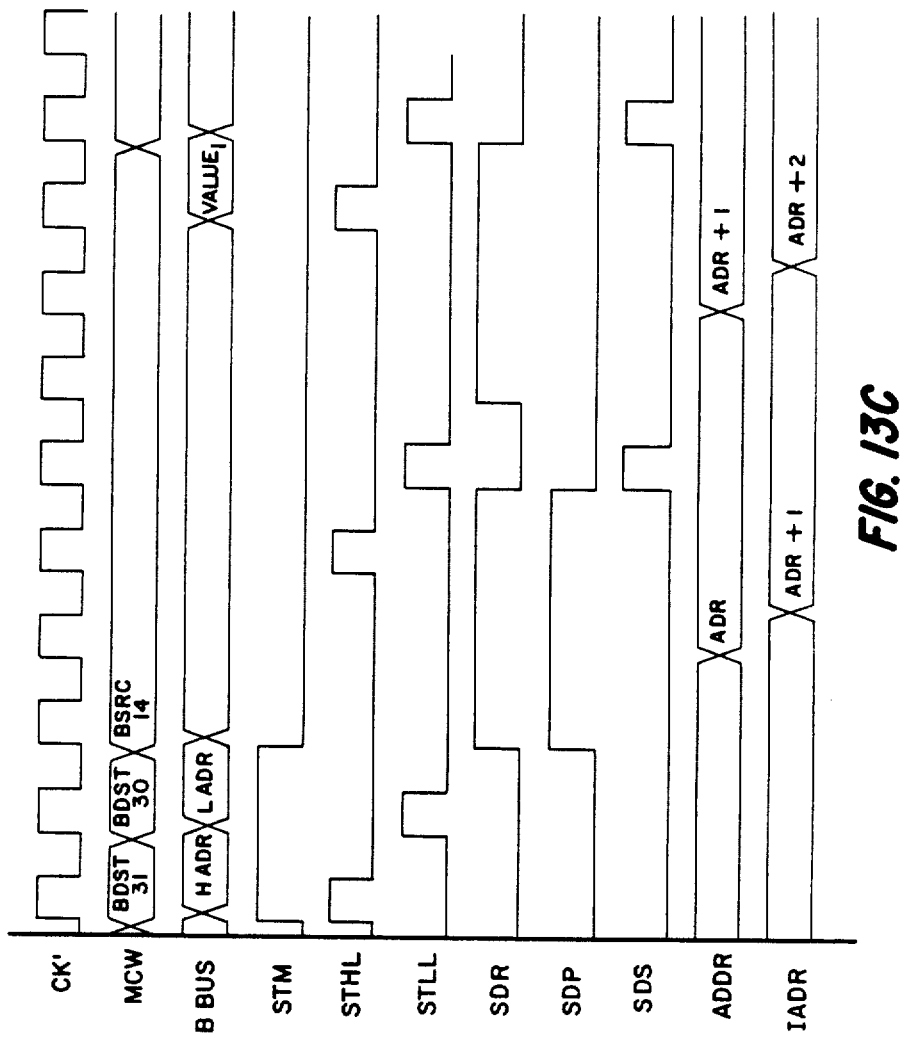
FIG. 13C is a timing diagram that is useful for understanding the operation of the circuitry shown in FIG. 13A.

As an illustration of the relative timing of an address load operation, FIG. 13C is a timing diagram for several signals produced by the control circuitry 1310 when an initial address value and an incremented address value are loaded for the statistical decoder 230.

As set forth below, each of the devices 230, 232, 234 and 236 may generate a normal memory request or an urgent memory request. The VRAM control unit 238 handles the normal memory request signals for each of the devices in a circular sequence commonly referred to as a round-robin. All of the devices 230, 232, 234 and 236 are treated as having substantially equal priority.

The urgent memory request operations generated by the devices 230, 232, 234 and 236 are handled by a second scheduling mechanism. This second scheduler also handles the refresh operations write operations from the source of compressed video 212, and the bit-map read operations for the processor 218. This scheduler operates according to a fixed priority scheme. The bit-map read operation has the highest priority followed, in order of descending priority by the refresh operation, the compressed data write operation, the urgent memory write operation for the output FIFO 236, the urgent memory read operations for the input FIFO's 234 and 232 and the urgent memory read operation for the statistical decoder 230. The circuitry which controls the scheduling and initiation of these operations is described below.

As set forth above, the memory request signals OFR, IF1R, IFOR and SDR are applied to the VRAM control unit 238 via the bus R/S. In FIG. 13, these signals are separated from the other signals conveyed by the bus R/S and are applied to a barrel shifter 1360. In the barrel shifter 1360, the four-bit request signal is applied to a circular shifter 1362 and to one input port of a multiplexer 1364. The shifter 1362 shifts the three MSB's of the four-bit request signal one bit position toward less significance and shifts the LSB of the four-bit request signal into the MSB position of the output signal. The output signal of the shifter 1362 is applied to a second input port of the multiplexer 1364. The signal provided by the multiplexer 1364 is applied to a circular shifter 1366 and to one input port of a multiplexer 1368. The circular shifter 1366 exchanges the two LSB and two MSB positions of its input value to produce an output value which is applied to a second input port of the multiplexer 1368. The multiplexers 1364 and 1368 are controlled by the less significant bit and more significant bit, respectively, of a two-bit signal provided by a register 1376. In response to this signal having values of zero, one, two or three, the barrel shifter 1360 performs a circular shift to less significant bit positions of zero, one, two or three bit positions, respectively.

The output signal provided by the barrel shifter 1360 is applied to a four-bit priority decoder 1370. The output signal of the priority decoder 1370 is the bit-position number, zero, one, two or three, of the most significant one-valued bit of the value applied to its input port. For example, if the four bit input value were 0101, the output value of the priority decoder 1370 would be two since the most significant one-valued bit is in the bit position two. The output signal of the priority decoder 1370 is applied to a register 1372 which loads the value applied to its input port in response to a signal CCK provided by the control circuitry 1310.

The value held in the register 1372 is applied to one input port of a two-bit adder 1374. The output port of the adder 1374 is connected to the input port of the two-bit register 1376. The output port of the register 1376 is coupled to the barrel shifter 1360 and to a second input port of the adder 1374. The combination of the register 1376 and the adder 1374 is a modulo-four accumulator. The value held in the register 1376 at any given time is the accumulated sum, modulo-four, of all of the values applied to the adder 1374 by the register 1372 up to that time. The value held in the register 1376 is the number of the device for which a memory operation is to be performed. Zero corresponds to the statistical decoder 230; one, to the input F1FO 232; two, to the input F1FO 234; and three, to the output F1FO 236. By the action of the barrel shifter 1360, the memory request value for the selected device is shifted to the LSB position of the input value to the priority decoder 1370, giving that device the lowest priority for being selected for the next memory operation. The circuitry including the barrel shifter 1360, priority decoder 1370, registers 1372 and 1376 and the adder 1374 is a scheduler which ensures that the memory requests generated by the devices 230, 232, 234 and 236 are treated with substantially equal priority.

The output signal of the register 1376 is expanded to three bits by concatenating a logic-zero in the MSB position. This three-bit signal is applied to one input port of the multiplexer 1378. A second input port of the multiplexer 1378 is coupled to receive the output signal of the scheduler which handles the urgent requests, refresh requests compressed data write requests and bit-map read requests. The urgent memory requests for the statistical decoder 230, input F1FO's 232 and 234 and output F1FO 236 are conveyed by the respective signals SDP, IFOP, IF1P and OFP. These signals are applied to the input port of a priority decoder 1380 at bit positions zero, one, two and three, respectively. The bit-map read request signal is the horizontal line synchronizing signal, HS, provided by the source 220. This signal is applied to bit-position six of the input port of the priority decoder 1380. The refresh request signal is generated by a counter 1382. The counter 1382 is a conventional seven-bit latching counter. It counts 128 pulses of the signal CK and latches its one-bit output signal, RF, at a logic-one value until the counter is reset. In this embodiment of the invention, the signal RF is applied to the bit-position five of the input port of the priority decoder 1380. The reset input terminal of the counter 1382 is coupled to a signal RFS provided by a VRAM signal generator 1388. This signal is pulsed by the generator 1388 at the end of a refresh operation to reset the counter 1382. The compressed data read request signal, CVR, is applied to the VRAM control unit 238 by the source of compressed video 212 as described above. This signal is coupled to the input port of the priority decoder 1380 at bit-position four.

The output port of the priority decoder 1380 is coupled to the input port of a register 1384. The register 1384 is conditioned to load the value applied to its input port responsive to a pulse of the signal CCK' provided by the control circuitry 1310. The three-bit output signal of the register 1384 is connected to a second input port of the multiplexer 1378.

The multiplexer 1378 is controlled by a signal generated by an OR gate 1386. This signal is the logical OR of the signal UREQ, generated by the pause logic 240, and the signals HS, CVR and RF. The output signal of the OR gate 1386 is a logic-one only when one or more of the input signals to the priority decoder 1380 is a logic one. The multiplexer 1378 is conditioned to pass the three-bit value provided by the register 1376 when its control input signal is a logic-zero and to pass the three-bit value provided by the register 1384 otherwise. The value passed by the multiplexer 1380 indicates which of the six address values applied to the multiplexer 1356 is to be applied to the address input ports and bank select logic of the VRAM 216 and to the first input port of the adder 1392. The value provided by the multiplexer 1378 is also applied to the ROM 1390 which provides the increment value to the second input port of the adder 1392. The ROM 1390 is programmed, for example, to provide an increment value of one if the memory operation being performed was requested by the statistical decoder 230, input F1FO's 232 or 234, or the output F1FO 236, an increment value of 64 if the memory operation is a bit map read operation and an increment value of 256 if the memory operation is a refresh operation. As set forth above, the control circuitry 1310 is responsive to the three-bit value provided by the multiplexer 1378 to activate the load signals for the appropriate registers to load the incremented address value into the registers during the memory cycle.

The VRAM signal generator 1388 is responsive to the three-bit signal provided by the multiplexer 1378 to generate the control signals for the VRAM 216 to perform a random read or write operation, a serial read operation or a refresh operation and to pulse the appropriate strobe signal when the memory operation is complete. The VRAM signal generator is coupled to receive the four-bit signal CASM, provided by the output F1FO 236. This signal is used, during a memory write operation, to selectively disable the column address strobe signals, $\overline{CAS0}$, $\overline{CAS1}$, $\overline{CAS2}$ and e,ovs/CAS3/ , one of which is applied to each pair of the eight columns of memory integrated circuits in the VRAM 216. As described above, the VRAM 216, used with this embodiment of the invention, is configured as a matrix having eight columns and 16 rows of integrated circuits. Each of the integrated circuits accepts and provides four bits of data. To divide the 32 bits provided by all eight columns of the memory into eight-bit values, the columns are paired and a respectively different one of the column address strobe signals $\overline{CAS0}$, $\overline{CAS1}$, $\overline{CAS2}$ and $\overline{CAS3}$ is applied to each of the four pairs of columns. As set forth in the 1985 Memory Products Data Book, pages 3-45 through 3-54 published by NEC Electronics Inc., which is hereby incorporated by reference, when the column address strobe is not activated on a memory write operation to the μPD41264 integrated circuit, no data is written into the addressed memory cell. Consequently, if any of the four bits of the signal CASM is a logic-zero, the signal generator 1388 disables the corresponding $\overline{CAS}$ signal and the data in the corresponding byte position of the bus D BUS is not written into the VRAM 216; the previous contents of the byte position in the addressed 32-bit word remain undisturbed.

The VRAM signal generator 1388 is a finite state machine which produces the column address strobe signals $\overline{CAS0}$, $\overline{CAS1}$, $\overline{CAS2}$ and $\overline{CAS3}$ as well as a row address strobe signal $\overline{RAS}$, a write enable signal $\overline{WE}$, an output enable signal $\overline{OE}$, a serial control signal SC, and a serial output enable signal $\overline{SOE}$ as appropriate for the type of memory operation to be performed. The timing diagrams for these signals are set forth in the above referenced section of the Memory Products Data Book.

In addition to generating the signals which control the individual integrated circuits that constitute the VRAM 216, the VRAM signal generator 1388 provides the strobe signals SDS, IFOS, IF1S, OFS and RFS which indicate to the statistical decoder 230, input F1FO's 232 and 234, output F1FO 236 and refresh counter 1382, respectively, that the requested memory operation has been performed. These signals are generated at the end of a memory cycle. From the timing diagrams in the above-referenced section of the Memory Products Data Book and from the description set forth in this application, one skilled in the art of designing memory circuits could readily design and build suitable circuitry for use as the VRAM signal generator 1388.

The VRAM signal generator is further responsive to a value of four for the signal provided by the multiplexer 1378 to present a high-impedance on its control output terminals. The high impedance state allows the source of composite video signals 212 to control the VRAM 216 for its memory write operations. In the present embodiment of the invention, a value of four provided by the multiplexer 1378 is decoded by a decoder 1355 coupled to the multiplexer 1356. A value of four applied to the decoder 1355 conditions it to apply a logic-one value to an input terminal EN of the multiplexer 1376. This signal causes the multiplexer 1356 to present a high impedance to the address input port of the VRAM 216. This high impedance enables the source of compressed video signal 212 to control the address input port of the VRAM 216 for one memory cycle.

Each VRAM memory cycle spans four periods of the signal CK'. The control circuitry 1310, using the signal CK', generates a signal CCK' which leads the VRAM memory cycle by one-half of one period of the signal CK'. One period of the signal CK' after the leading edge of the signal CCK, that is, at the start of a VRAM memory cycle, the scheduling circuitry has selected a memory operation from among those scheduled and a value indicating which operation has been selected is available at the output port of the multiplexer 1378.

The selected value conditions the multiplexer 1356 to apply the address in the selected register or a high impedance to the address input terminals and bank select logic of the VRAM 216 and conditions the VRAM signal generator 1388 to issue signals to perform a serial read operation, a refresh operation, a random write operation, or a random read operation if the selected memory request was generated by the horizontal line synchronizing signal, HS, the counter 1382, the output F1FO 236 or one of the statistical decoder 230, input F1FO 232 or input F1FO 234, respectively. One period of the signal CK' before the end of the memory cycle, the VRAM signal generator 1388 pulses the appropriate signal, RFS, OFS, SDS, IFOS or IF1S to indicate that the requested memory operation has been performed.

The VRAM control unit may not use every VRAM memory cycle because periodically, the source of compressed video signal 212 uses a VRAM memory cycle to load compressed video data into the VRAM 216. Potential conflicts in the use of the VRAM 216 are resolved by the scheduling circuitry which handles urgent memory requests.

When the source of compressed video 212 has a 32-bit value to store into the VRAM 216, it changes the state of a signal CVR to logic-one. The signal CVR is applied to the input port of the priority decoder 1380 at bit-position four. When the scheduling circuitry handles a request of this type, it applies a value of four to the VRAM signal generator 1388 to the control circuitry 1310 and to the decoder 1355 which is coupled to the multiplexer 1356. This value conditions the signal generator 1388 and multiplexer 1356 to present a high impedance at their output terminals which are coupled to the VRAM 216 via the bus AD/CTL. In addition, the value of four conditions the control circuitry 1310 to apply a logic-one value as the signal GRANT to the source of compressed video 212. This signal enables address and control circuitry internal to the source 212 to issue signals for a memory write operation to store the data from the source 212 into the VRAM 216.

It is contemplated that the VRAM signal generator 1388 may be partitioned into two separate circuits, a first circuit which converts the values provided by the scheduler into signals indicating whether a random read, random write, serial read or refresh operation is to be performed and a second circuit which, from these signals, generates the actual signals applied to the VRAM integrated circuits. The first circuit would be a part of the VRAM control unit 238 and, thus, internal to the processor integrated circuit 210. The second circuit, however, may be implemented outside of the circuitry 210 so that it may be shared by the source of compressed video 212.

While the embodiment of the invention described herein has one pair of bit-map address registers to store the address of a luminance bit-map, it is contemplated that an embodiment of the invention which processes color video signals may have two additional bit-map registers for storing addresses of two color difference signal bit-maps. Furthermore, it is contemplated that the initial bit-map address values for all of the bit-map address registers may be stored by the microprocessor 224 while the video signal processor 210 is held in a halted state.

The foregoing describes the circuitry of the video signal processor 210 in detail. The method by which this processor is used to decode (or expand) the compressed video signal will now be described.

Figure 14:
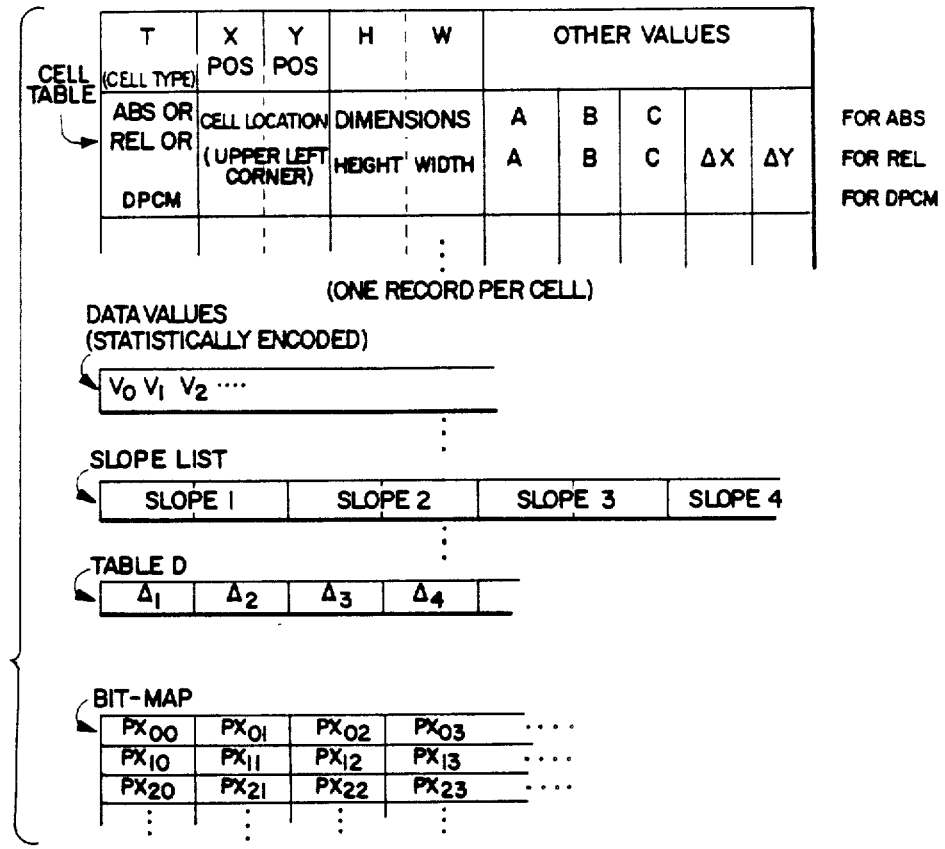
FIG. 14 is a memory map diagram showing how the compressed data is stored in the video random access memory of FIG. 2.
Figure 15:
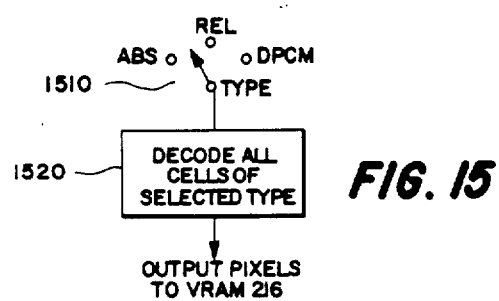

As shown above in reference to FIG. 1, the image which is to be reconstructed by the processor is encoded into records which describe rectangular areas (hereinafter, "cells") in terms of either absolute or relative bilinear polynomials ($Ax + By + C$), or as individually-encoded pixels using DPCM encoding techniques. While the record format set forth in FIG. 1 is conceptually valid, a preferred arrangement of the encoded data is shown in FIG. 14. The data consists of five parts: a "cell table", which contains the data pertaining to each cell, a separate block of statistically-encoded data (hereinafter, "data"), a pair of tables, one of which is used to implement the bilinear equations (the slope list) and one used to decode the DPCM encoded data (the table D) and a bit-map for an image that is currently being displayed. The statistically-encoded data segment is separate so that it may be read by the processor 210 using its statistical decoder 230. The cell table, the data values, the slope list, the table D and the bit-map are all stored in the VRAM 216. In addition, as the decoding operation proceeds, a new or current bit-map is developed which describes the next image to be displayed.

The cell table contains, for each cell, its type T, encoded as a number (for example, 1=absolute, 2=relative, 3=DPCM), the coordinates in a bit-map of the pixel value in its upper left corner (X POS, Y POS), and its size (H, W). If the cell is either a relative or absolute cell, the information about the polynomial coefficients A, B, and C is also given. If the cell is a relative cell, the displacement values ΔX and ΔY of the pixel values in the current cell relative to corresponding pixel values in a cell in the bit-map of the image currently being displayed are given. To simplify decoding, the records are assumed to be fixed in length (10 16-bit words per record). Records having less than 10 words of data (such as DPCM) are padded to 10 words.

The coefficients A and B, which represent the "slope" terms in the polynomial $Ax+By+C$, are encoded in a special way. Instead of containing the actual A and B values, the cell table contains index values into the slope list. This slope list is transmitted to the decoder along with each image (or, alternatively, with each sequence of images). The reason for the slope list is to allow the decoder to use "slope tables", as described below, for improved efficiency in decoding.

Since the microcode used to decode an entire compressed image will not, in general, fit into the processor's available microcode RAM 310, the decoding operation is separated into several "passes". The first pass decodes all absolute cells, followed by another pass for relative cells and another for DPCM cells. This process is represented schematically in FIG. 15, which simply consists of the same process 1520 (to decode all cells of a specified type) invoked three times by successive selections of switch 1510.

Figure 16:
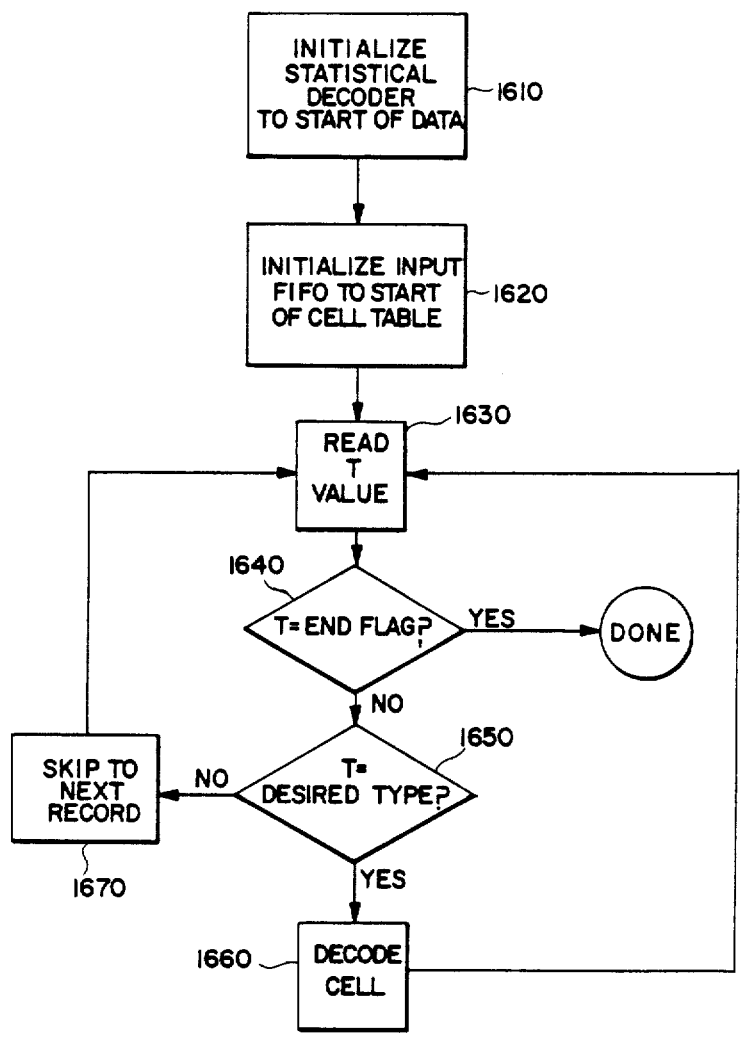

Details of process 1520 are shown in FIG. 16. First, the statistical decoder 230 and the input FIFO 232 are initialized to address the segments of VRAM containing the statistically encoded data and the cell table, respectively, in steps 1610 and 1620. Step 1630 reads the value T from a record of the cell table. The value T specifies the cell type. In step 1640, the value T is compared with a special "end-of-table" value. Typically, zero is used for the end-of-table flag so that the comparison operation is fast. If the end of the table has not been reached, the value T is compared to the type of cell being processed (step 1650). If this code is the currently processed type, the record is decoded (step 1660); otherwise, the record is skipped (step 1670).

The process of decoding cells will now be described in detail. To begin, it is necessary to introduce and describe the concept of a "slope table", which is a key element of the process for efficiently decoding absolute and relative cells.

Figure 17A:
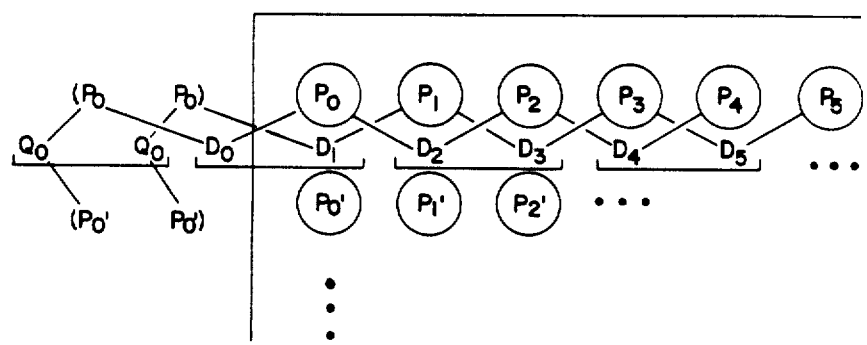
Figure 17B:
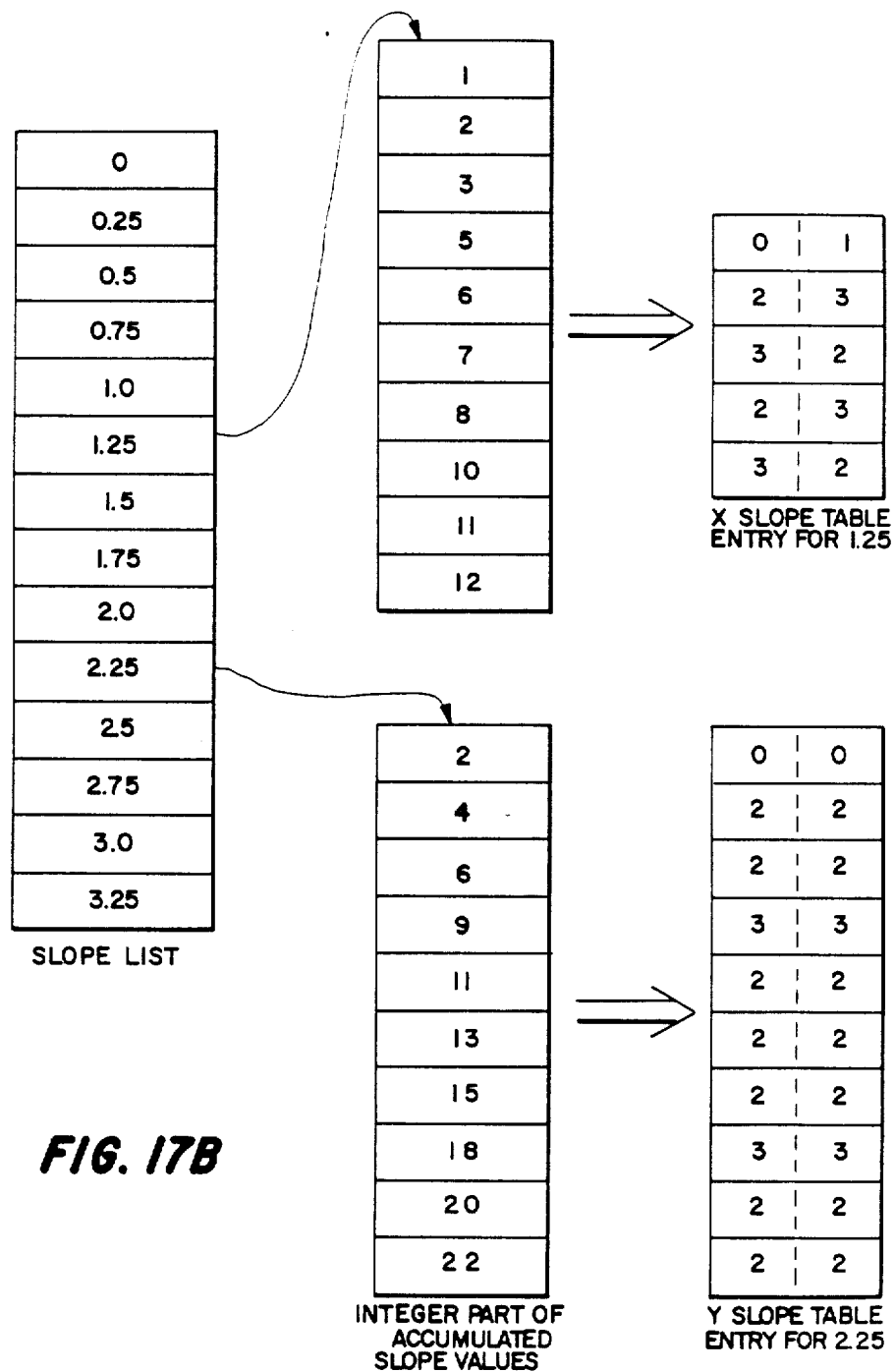

The "slope table" concept is illustrated in FIGS. 17A and 17B. FIG. 17A depicts a rectangular region that is to be filled with a bilinear polynomial function $Ax+By+C$. Recall that such a bilinear function is used by both absolute cells, which are filled directly with values from this function, and relative cells, in which the values provided by the function are added to pixels values from a cell of the previous video image. The slope tables are the same for both absolute and relative cells.

The values of the function $P(x,y) = Ax+By+C$ are shown as the values P0, P1, P2, etc. for the first row, and P0', P1', P2', etc. for the second row. There are two problems in calculating the value of this function in real time. The first problem is that two multiplications are required (Ax and By). If all the coefficients (A,B,C) are integers, this problem can be solved using the well-known technique of incremental addition. This takes advantage of the fact that $P(x+1,y)=P(x,y)+A$, so that successive pixel values within a horizontal line of a cell may be calculated by successive addition of the value A to an accumulator. However, in the present invention, the value C is always an integer, but the values A and B are not. This is because the spatial variation of luminance values in an image is typically less than 1 grey level per pixel. So, in fact, not only do A and B have fractional parts, but they are usually less than 1 in absolute value. It is also desirable to use the dual-add-with-saturate operation to compute these pixel values because two pixel values may be calculated in one instruction cycle. However, the dual-add-with-saturate operation only supports integer addition, and thus cannot accumulate a fractional slope value.

To solve this second problem the "slope list" and "slope tables" are used. The slope list is a small set of specific values (specified to 1/256th precision) of A and B that are to be used as the exclusive slope values for the entire image being processed. In other words, each of the A and B values that naturally occur in the image is approximated by one of the values in the slope list. Consider, now, that FIG. 17A shows the result of evaluating the function $P(x,y)$ for a specific value of A found in the slope list. The differential values D0, D1, D2, D3, etc. are calculated as the integer part of the difference between the pixel values that are separated by one intervening pixel value. For example, D2 is equal to the integer part of the value of P2-P0, D3 is equal to the integer part of P3-P1, etc. Note that the first pair of differential values $D_0$ and $D_1$, is obtained by subtracting the value P0 from the real pixel values P0 and P1, respectively.

The set of differential values is only dependent on the value of A in the polynomial, so for each value of A in the slope list, a table of differential values can be computed. The set of all such tables for a given slope list is called the "X slope table". Given a specific slope list, the slope table which contains just integer values can be entirely pre-computed and stored in the VRAM 216 with, consequently, very little real-time decoding cost.

Pixels are depicted in pairs in this figure because the decoding process uses the dual-add-with-saturate ALU operation in the decoding processor described above, in reference to FIG. 4B. All values shown in this FIG. are 8-bit values, and each pair of values is packed into a single 16-bit word. Assuming the X slope table values are available, the values of the function $P(x,y)$ can be calculated with a single ALU operation, as in, for example, $$(P4,P5)=(P2,P3)+](D4,D5)$$

where +]represents the dual-add-with-saturate operation. By beginning with an accumulator register loaded with the pair of eight-bit values (P0,P0), and by successively adding pairs of values from the slope table, an exact reconstruction of the P(x,y) values can be achieved using only a single ALU operation for each pair of pixel values.

The above technique only generates the values on one scan line. To generate the next scan line, the value (P0',P0') is necessary. This is obtained by the calculation $$(P0',P0')=(P0,P0)+](Q0,Q0)$$

where (Q0,Q0) is a value from the "Y slope table", which is analogous to the X slope table but is organized differently. In the Y slope table, as indicated in FIG. 17A, vertically-adjacent values of the function P(x,y) are subtracted to obtain the slope table values This differs from the X slope tables, where values that are separated by one interstitial pixel are subtracted. Also, in the Y slope table the same value is duplicated in both halves of the dual 8-bit word.

In summary, the video signal processor 210 receives, as part of the compressed video data, the slope list, which contains the list of slopes used for the current image. The processor 210, prior to decoding any absolute or relative cells, then builds both the X and Y slope tables, with one vector entry for each slope in the slope list. These slope tables are stored at a predetermined location in the VRAM 216. While it is contemplated that the slope tables could be encoded in the cell table rather than in the slope list, the slope list is more compact and, therefore, contributes to coding efficiency.

The concept of the slope list and the X and Y slope tables are illustrated by an example in FIG. 17B. As described above, the X and Y slope tables each have entries for every slope value in the slope list. An entry consists of a series of values which correspond to differences between alternate pixel values, for the X slope entry, and differences between adjacent pixel values for the Y slope tables. In the example described below, an X slope table entry for item 6 in the slope list, 1.25, and a Y slope table entry for item 10 in the slope list, 2.25, are developed.

The X slope table entry is generated by accumulating a running sum by repeatedly adding the 16-bit slope value to the previous sum. After each addition 30 operation, the integer part (i.e. the eight MSB's) of the accumulated sum are stored. The X slope table entry is generated by taking the difference of alternate ones of the stored values. These values are stored as the X slope table entry for the selected slope value. The algorithm which generates the X slope table entries stores the difference of values that are separated by an intervening value because the dual-add-with-saturate operation is used to reconstruct the absolute or relative cells from the X slope table entries. Since this operation performs two parallel additions, the algorithm for reconstructing an absolute or a relative cell accumulates the sums of alternate ones of the samples separately. The X slope table entries are arranged to make this dual accumulation accurate and efficient.

To generate a Y slope table entry, the selected slope value is similarly accumulated and the integer part of the accumulated sums are stored. However, the difference values stored in the Y slope table entry are developed from adjacent ones of the stored samples.

Figure 18:
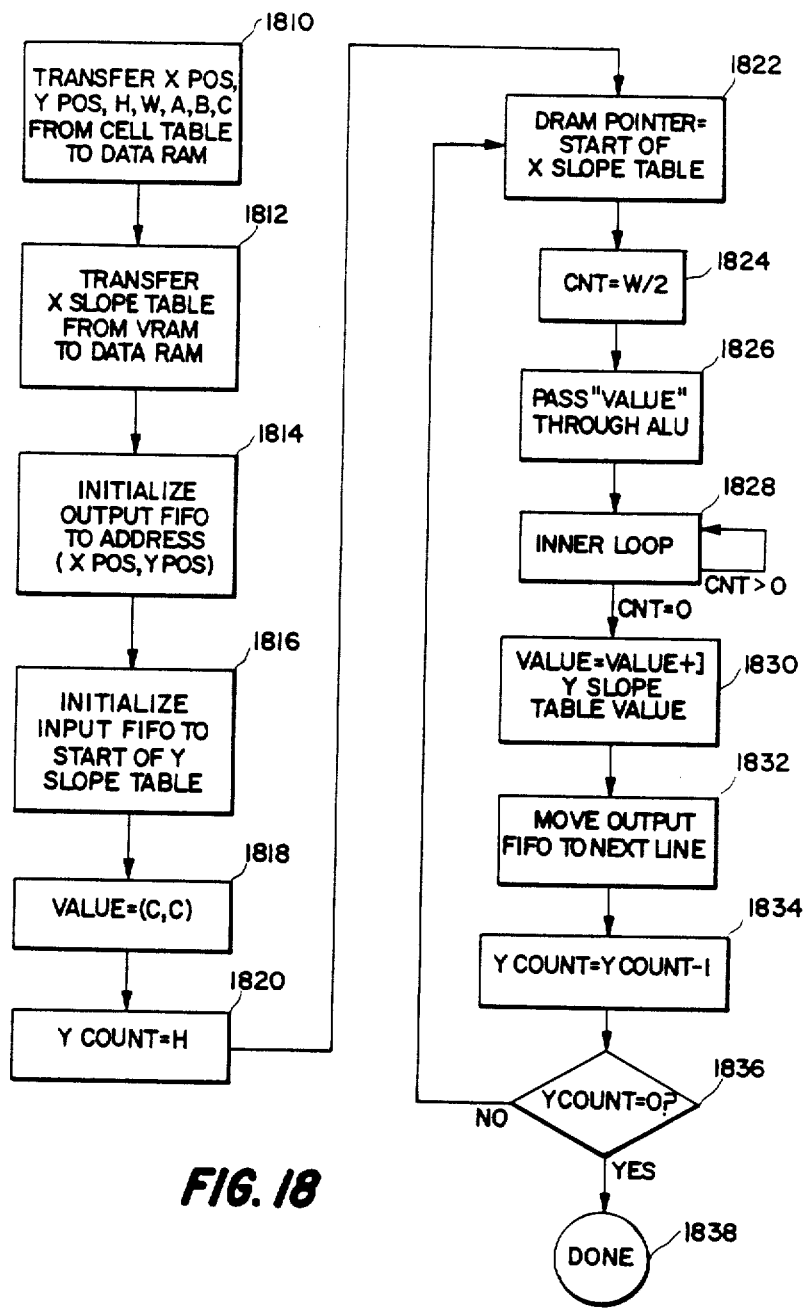

FIG. 18 shows the sequence of operations which the processor executes to decode an absolute cell. The first step, 1810, is to transfer the values from the cell table to data RAM 228 using input F1FO 232, for more efficient access during the remainder of the decoding process. Step 1812 transfers the X slope table entry, corresponding to the value of A from the cell table entry into the data RAM 228 using input F1FO 234. This is done so that the cell table entry is available for fast access in the "inner loop" of the process described below. Step 1814 initializes the output F1FO 236 to the address in the current image bit-map that corresponds to the start of the cell. Step 1816 initializes the input F1FO 234 to point to the first entry in the Y slope table. The next step, 1818, initializes a register, for example R3, (symbolically called 'value') in data path 242 to the value (C,C); that is, a 16-bit word with the constant value C from the cell table record in both the upper and lower eight bit 30 positions. Step 1820 initializes another register, for example, R2, called 'ycount', to the value H from the cell table entry.

The step 1822 begins the "outer loop" of the process; i.e., a loop that is executed once for each scan line of the cell being processed. First (step 1822), one of the pointer registers in data RAM 228, for example, DR2, is initialized to point to the first entry in the X slope table, which was previously transferred into the data RAM 228 in step 1812. In step 1824, the loop counter 514 of the data path circuitry 242 (symbolically called 'cnt') is initialized to the value W/2. This is the number of pairs of pixel values that will be generated for each horizontal line of the cell. By convention the encoding system only generates cells that have an even number of pixels per line, hence W is always an even number. Step 1826 passes the value in the register 'value' to the output register 416 of the ALU 244, which will be used to accumulate the output pixel values as previously described in the discussion of slope tables. Step 1828 is the "inner loop" of the process, which is executed once for each pair of pixels on the horizontal line of the cell line, and is described in detail below. After processing one horizontal line of pixel data for the cell, the next step 1830, adds the Y slope table value to 'value', which is equivalent to the calculation value=value+](Q0,Q0) as discussed earlier with reference to FIG. 17A. Step 1832 re.initializes the output F1FO 236 to the starting pixel address of the next horizontal line in the cell and step 1834 decrements the value of 'ycount'. The test 1836 checks if 'ycount' has reached zero, and either loops back to step 1822 (if it has not) or exits the loop (if it has). This completes the processing of one absolute cell.

FIG. 19 shows the inner loop 1828 of the process of FIG. 18, in terms of the actual microcode control words or instructions. The inner loop 1828 consists of two instructions which are alternately executed under control of the loop counter 514. The instruction 30 addresses listed are for illustrative purposes only; however, their numbering is not completely arbitrary, as set forth below, due to the way in which a conditional branch operation is performed by the microcode RAM and sequencing circuitry 226.

The first instruction (1) performs the calculation ALU=ALU+] *DR2++, where the symbol *DR2++is described above in reference to table 4. This calculation adds a pair of values from the X slope table entry to the ALU output register 416 (which is being used as an accumulator of the bilinear function value) and auto-increments the pointer register DR2 of the data RAM 228 to point to the next pair of values in the slope table This instruction also decrements the loop counter, and then conditions the microcode RAM and sequencing circuitry 226 to load the instruction 2, the next microcode control word. Instruction 2 conditions the circuitry 210 to send the value in the ALU output register 416 through output F1FO 236, thus writing two pixel values into VRAM. A conditional branch is set on this instruction, using the loop-counter zero condition. If this condition if false, control will pass to instruction 1 and the loop will continue. When the pixel data for a horizontal line has been completed, the loop counter will be zero, so that the condition will be true, causing the microcode sequencer to force the LSB of the address to zero. This causes a jump to instruction 0 and thus an exit from the inner loop.

Since this is a two instruction loop, and since two pixel values are generated each time through the loop, this inner loop runs at a speed of one instruction per pixel value. Assuming an exemplary instruction cycle time of 80 ns and an exemplary image of 256×240 pixels and no pause states for the processor 210, the largest possible execution time for the inner loop (i.e. if the image were described by one absolute cell) is 0.3 field intervals (about 1/200 second). The other processes in the system, such as the outer loop and the processing of the FIG. 16, add additional decoding time. Also, recall that images are not typically composed entirely of a single type of cell. As will be seen, relative and DPCM cells require more time to decode than absolute cells. Even with these factors, however, it is usually possible to decode an image in less than 2 field periods. Note that a decoding time of 2 field periods corresponds to the desired TV frame rate of 1/30 second.

Figure 20:
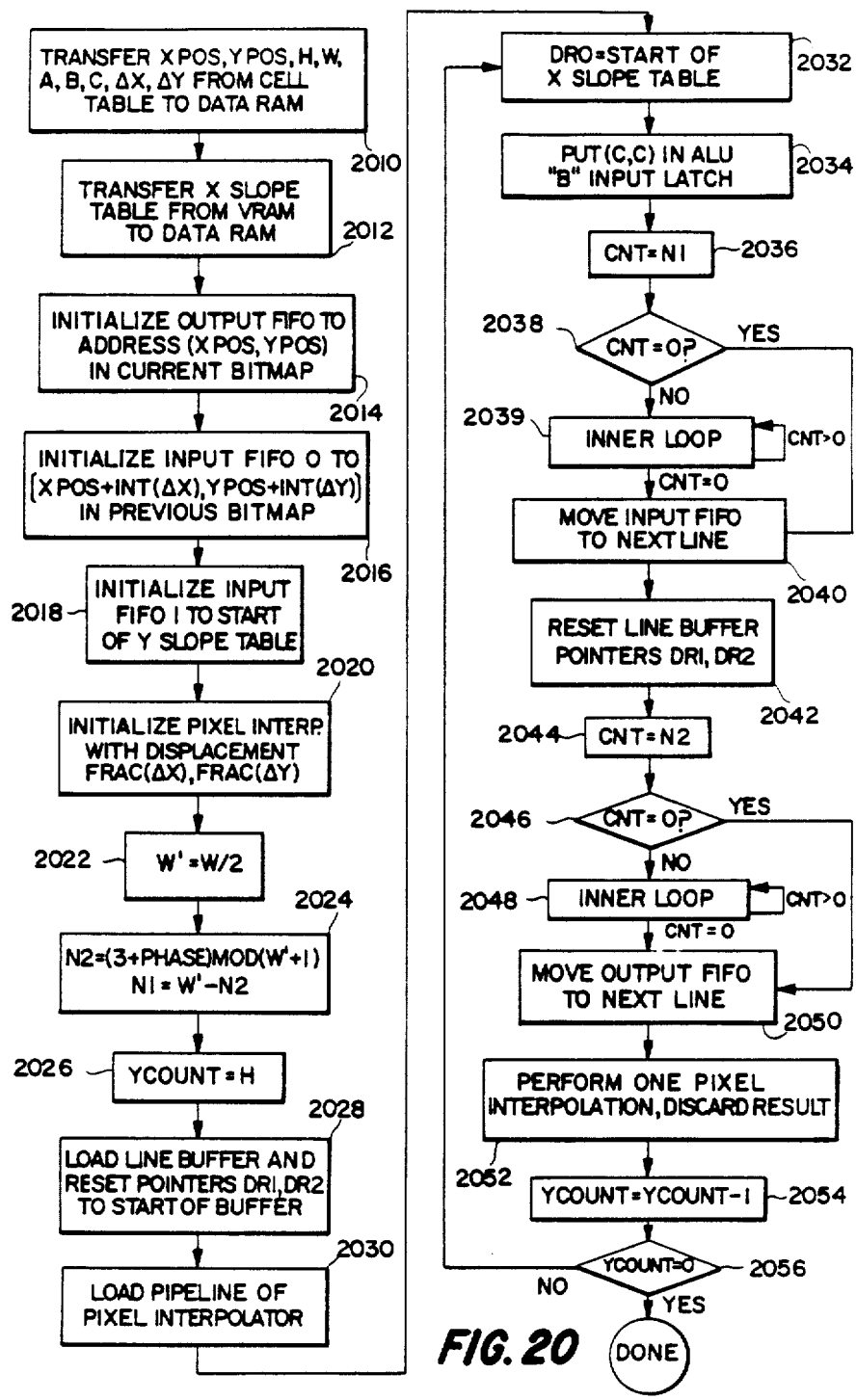

FIG. 20 shows the sequence of operations which the processor 210 executes to decode a relative cell. Many of the steps are similar to steps in the absolute cell decoding process, however there are several important changes. In addition to generating the values of the bilinear function $Ax+By+C$, the relative cell decoding process adds the values of this function to pixel values from a rectangular region of the previous image bit-map. The resulting sum is then written to the current image bit-map. Furthermore, the pixel values are not taken directly from the bit-map of the previous image but are obtained by interpolating from among those pixels using the pixel interpolator 246.

Recall that the pixel interpolator 246 is pipelined and, consequently, that its output values are delayed relative to its input values. This time delay complicates the operation of scanning through the pixels in the previous and current image cells, because the input and output F1FO's are out of step. This problem is solved by breaking up the inner loop into two identical groups of instructions. Instead of one inner loop which is executed W/2 times (as in absolute decoding) there are two inner loops, one executed N1 times, and one executed N2 times (where $N1+N2=W/2$). The values N1 and N2 are precalculated such that after the first inner loop the input F1FO 232 can be advanced to point to a starting pixel location in the next successive horizontal line of the previous image bit-map, and after the second inner loop, the output F1FO 236 can be advanced to point to a starting pixel location in the next successive horizontal line of the current cell in the current image bit-map.

Finally, recall that, as discussed with reference to FIG. 9, two scan lines of pixel data are read from the previous image to produce one horizontal line of pixels for the current cell. In order to reduce the number of accesses to the VRAM 216, and thus reduce the decoding time, the process of FIG. 20 takes advantage of the fact that the bottom line of the two lines, used for one time through the Y loop of the process, is the same line as the top line of the two lines used the next time through the Y loop. So, instead of reading this data twice from VRAM, the circuitry 210 stores the data in a "line buffer" in data RAM 228 each time through the loop for use the next time through the loop.

The process shown in FIG. 20 begins with the step 2010 which transfers the values from the cell table record to data RAM 228. Step 2012 transfers the X slope table entry, for the value A from the current cell table record, from the VRAM 216 to the data RAM 228. These transfer operations use the input F1FO 232. Steps 2014, 2016, and 2018 initialize the output F1FO 236 to point to the current image bit-map, the input F1FO 232 to point to the previous image bit-map, and the input F1FO 234 to point to the Y slope table entry corresponding to the value B from the current cell table record, respectively. Step 2020 initializes the pixel interpolator 246 with the displacement values, which are equal to the fractional parts of $\Delta X$ and $\Delta Y$. The pixel interpolator is initialized to its "in phase" mode if the LSB of the starting address for the previous image is 0; otherwise, it is set to operate in its "out-of-phase" mode. Step 2022 halves the value of W for use in the remainder of the decoding process. Step 2024 calculates the values of N1 and N2, the count values for the two inner loops (in box 2024, the variable "phase" has the same value as the LSB of the starting address for the previous image). Step 2026 initializes a register to the value of H from the cell table record, to count horizontal lines in the cell. Step 2028 loads one horizontal line of the previous image cell into a line buffer in the data RAM 228 and resets the pointer registers DR1 and DR2 to point to the first 16-bit value in the line buffer. Step 2030 loads the pipeline of the pixel interpolator 246 just up to the point where the first useful result can be read from it. For example, in reference to FIG. 9B, the step 2030 includes the instruction cycles $T_1$ through $T_{11}$.

Step 2032 is the beginning of the "outer loop" of the process. First (step 2032), one of the pointers in the data RAM 228 (for example, DR0) is initialized to point to the first value in the X slope table entry. Next, the value (C,C), the duplicated constant term from the current cell table record is loaded into the B input latch 412 of the ALU 244, which is used to accumulate the value of the bilinear function $P(x,y)$. Steps 2036, 2038 and 2039 initialize and execute the inner loop instructions N1 times where N1 may be zero. The step 2040 then resets the input F1FO 232 to point to the start of the next horizontal line in the cell from the previous image. Step 2042 resets the line buffer pointers (DR1 and DR2) to point to the beginning of this line buffer. Steps 2044, 2046, and 2048 initiatize and execute the inner loop instructions N2 times, where N2 may be zero.

In Step 2050, the address value used by the output F1FO 236 is advanced to point to the first pixel position in the next line of the cell for the current bit map. Step 2052 passes one more set (4 pixels) of values through the pixel interpolator. These values correspond to pixels having positions just past the right edge of the cell in the previous image, and are used to produce the last interpolated result on a line. However, this step also causes one extra pair of results to be produced by the pixel interpolator. This result is read in step 2052 and simply discarded. Step 2054 decrements the value of 'ycount', and test 2056 checks whether the last horizontal line of pixel values for the cell has been processed. If so, the processor exits the outer loop; otherwise, it continues the loop with step 2032.

FIG. 21 shows the inner loop of the process shown in FIG. 20. This loop consists of four instructions. The first instruction (1) adds the value in the B input latch 412 of the ALU 244 to a value *DR0 (i.e. the value in the data RAM cell having the address value that is held in the register DR0) This value is from the X slope table. Also during this instruction, the address value held in DR0 is incremented by one. Recall that the B input latch 412 of the ALU 244 is being used to accumulate the value of the bilinear function Ax+By+C. Instruction 1 also reads a pair of pixel values using the input F1FO 232 and loads them into the register R0 of the data path circuitry 242. These pixel values correspond to the bottom pair of the 4 pixels that are applied to the pixel interpolator to generate one pair of interpolated pixel values. The next instruction (2) places the ALU output value (the result of instruction (1) back into the B input latch 412. It also adds this value to the output value of the pixel interpolator 246 to produce the value of the function Ax+By+C+previous-image for two successive pixels. This pair of pixel values is written into the VRAM 216 via the output F1FO 236 in the next instruction (3). In addition, instruction 3 loads the pixel interpolator with a value (2 pixels) from the line buffer held in the data RAM 228, using the address value held in the register DR1. These pixels correspond to the top pair of the 4 pixels being applied to the interpolator 246. This instruction also decrements the loop counter 514 of the data path circuitry 242. Finally, instruction 4 takes the value in the register R0, the bottom pair of pixel values for the interpolator 246, and loads this value into both the pixel interpolator 246 and the line buffer in the data RAM 228 (using the address in register DR2). A conditional branch operation based on the loop counter reaching zero causes the instructions in the loop to be repeated until the desired number of pixel values have been generated.

This inner loop generates 2 pixel values in 4 30 instruction cycles, which, assuming no pause states, corresponds to a maximum total elapsed time of 0.6 fields for a 256×240 image (this is for the inner loop only, and ignores other overhead as discussed above).

Figure 22:
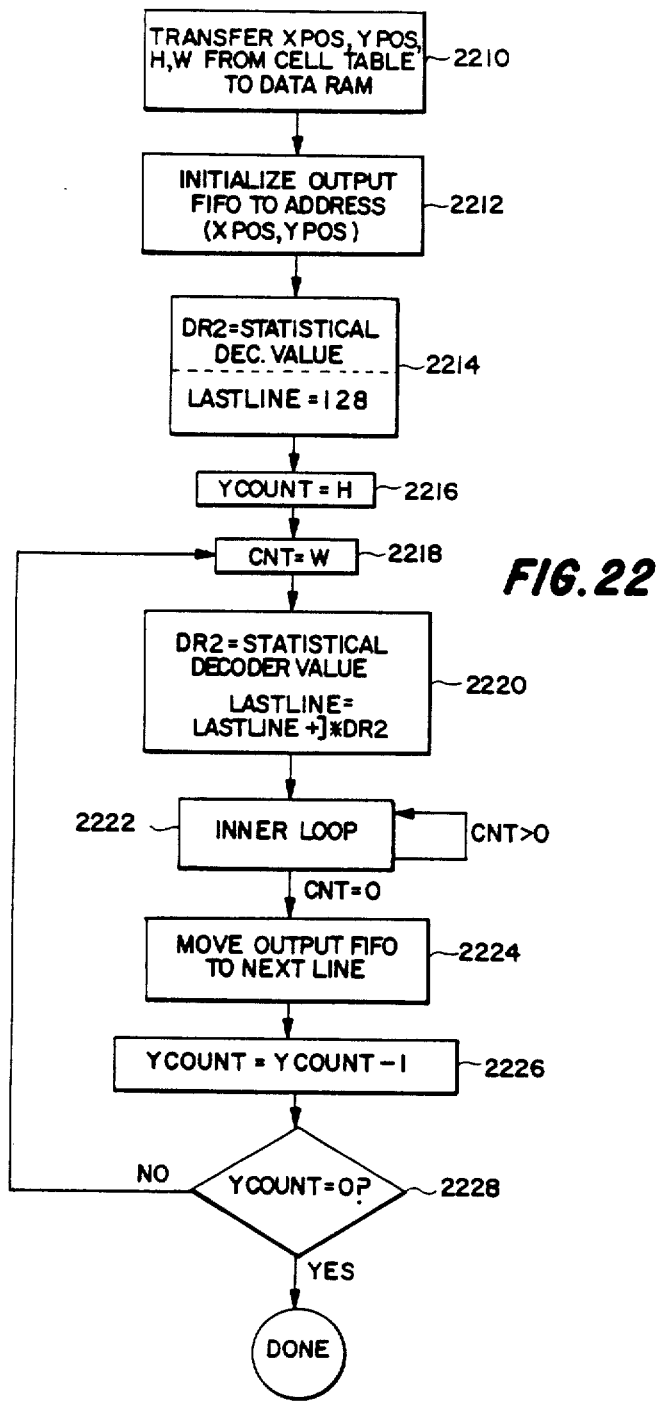

FIG. 22 shows the sequence of operations involved in decoding a DPCM cell. Each pixel value in a DPCM cell is encoded by single value V in the data segment of the compressed video image. This value, V, is interpreted as in index into the table of values (table D) which contains all possible pixel-to-pixel differences in the current image. The table D is stored in the data RAM 228. Most pixel values for a DPCM cell are generated by adding a differential pixel value from the table D to the pixel value immediately to the left of the target pixel. A pixel value for the left edge of the cell is generated by adding the differential pixel value from the table D to the corresponding value in the previous line. The phantom pixel "above" the pixel in the upper left corner of the cell is assumed to have a constant value of 128.

The DPCM decoding process begins by transferring, via the input F1FO 232, the values X POS, Y POS, H, W, from the cell table in the VRAM 216, to the data RAM 228 (step 2210). Next, the output F1FO 236 is initiatized to point to the address (X POS, Y POS) which corresponds to the pixel in the upper left corner of the current cell (step 2212). In step 2214, a register, for example, R3, ('lastline') to the value 128. The register 'lastline' is used to remember the first pixel value of the previous line for use when generating the first the loop counter, and then the current line. Step 2216 loads a register, 'ycount' for example, R2, which holds the number of horizontal lines in the cell.

Step 2218 loads the loop counter 514 of the data path circuitry 242 with the value W from the cell table record. Step 2220 calculates the value of the first pixel on a horizontal line by loading a value V from the statistical decoder 230 (i.e. an index into the table D) into the register DR2 reading the value *DR2 (i.e. the value from the table D) and then performing the calculation "lastline=lastline+] *DR2". Next, the inner loop is executed (step 2222). Finally, of the output F1FO is reset to point to the first pixel value the next horizontal line of the current bit-map (step 2224), and the register 'ycount' is decremented and tested (steps 2226, 2228) until the loop is finished (i.e. when 'ycount'=0).

FIG. 23 shows the microcode instructions for the inner loop of the DPCM decoding process. The first instruction (2) writes the current accumulated value (in the ALU output register 416) to the VRAM 216 through the output FFO 236, and also stores this value in the register R1 of the data path circuitry 242. The first instruction of this loop has a conditional branch which either exits the loop or continues, depending on whether the value held in loop counter 514 is zero. The next instruction (1) reads a V value from VRAM 216 using the statistical decoder 230 and stores it into the register R0. The next instruction (3) transfers this value from the register R0 to the register DR2 of the data RAM circuitry 228. The last instruction of the loop (4) adds the previous pixel value in the register R1 to the value *DR2 (which is the difference value from the table D in the data RAM 228) and branches back to the top of the loop.

It is noted that the inner loop of the instruction sequence used to decode DPCM data uses the dual-add-with-saturate operation. This instruction sequence is operating on single bytes of data conveyed by the eight LSB positions of the busses A BUS and B BUS. The dual-add-with-saturate operation is used to saturate any erroneous pixel values which may result from using the approximate difference values from the Table D rather than actual difference values. This type of saturating addition is supported by the ALU 244 only in the dual-add-with-saturate operation.

The inner loop of the DPCM decoding instruction sequence generates one pixel every 4 instructions, which, assuming no pause states, corresponds to a maximum total elapsed time of 1.2 fields for a 256×240 image, for the only.

Using the foregoing description of the internal circuitry of the video signal processor 210, the decoding processes and the actual microcode instructions for the inner loops, one skilled in the art could readily produce a sequence of microcode instructions which would implement the complete decoding process.

Although in the described embodiment of the invention, the compressed data provided by the source 212 is in the form of the cell table, it is contemplated that this data may be provided in other forms, for example, a In this instance the processor 210 may be programmed to convert the binary-tree data into cell table form.

What is claimed is:
1. A data processing system comprising:
  processing means responsive to control signals for processing data, including means for indicating values representative of a plurality of conditions;
  a stored-program controller, coupled to said processing means including:
  memory means for holding a plurality of instructions, wherein ones of instructions indicate conditional branch operations;

instruction decoding means for holding instructions provided by said memory means and providing said control signals for said processing means and control signals for said stored-program controller;

memory accessing means, responsive to control signals provided by said instruction decoding means for concurrently reading first and second instructions from said memory means; and next instructions selection means responsive to control signals provided by said instruction decoding means and, when the instruction held in said instruction decoding means indicates a conditional branch operation, to said means for indicating the values of said plurality of conditions, for loading a selected one of said first and second instructions into said instruction decoding means.

2. The data processing system forth in claim 1 wherein each of the instructions held in said memory means that indicates a conditional branch operation includes a condition selection value which indicates one of said plurality of conditions; and said instruction selection means includes means responsive to the condition, indicated by the condition selection value of the instruction held in said instruction decoding means for loading said preselected one of said first and second instructions into said instruction decoding means.

3. The data processing system set forth in claim 1 wherein:

each of the instructions held in said memory means includes an N-bit next address value, where N is a positive integer;

said memory means includes $2^{N-1}$ addressable cells, each cell having sufficient capacity to hold two instructions;

said memory accessing means includes means responsive to $N-1$ bits of the next address value of the instruction held in said instruction decoding means for addressing one of the cells of said memory means to read the two instructions held thereby as said first and second instructions; and said next instruction selection means include means responsive to a predetermined bit of the N-bit address value of the instruction held in said instruction decoding means, having first or second predetermined values for loading said first or second instruction, respectively, into said instruction decoding means.

4. The data processing system set forth in claim 3 wherein:

each of the instructions held in said memory means that indicates a condition selection value which indicates one of said plurality of conditions; and said instruction selection means further includes means responsive to the condition selection value of the instruction held in said instruction decoding means for loading said selected one of said first and second instructions into said instruction decoding means.

5. Stored-program controller apparatus, comprising:

memory means having addressable locations, each of said addressable locations holding a pair of instruction words;

two-word instruction register means coupled to said memory means and responsive, during a read cycle of said memory means, for storing two of said instruction words from a given one of said addressable locations;

switch means;

one-word instruction register means coupled via said switch means said two-word instruction register means for storing one of said two instruction words selected by said switch means; and control means having a first input terminal coupled to an output terminal of said one-word instruction register means, said control mean having a further input terminal coupled to receive a condition signal supplied thereto and having an output signal coupled to control said switch means as a function of said condition signal and said output of said one-work instruction register means.

6. Stored-program controller apparatus comprising:

memory means having addressable locations for holding two instruction words at each of said locations;

means for providing a condition signal;

means responsive to a selected address to concurrently provide two instruction words held in an addressable location of said memory means corresponding to said selected address;

means for selecting one of said two instruction words and for generating a selected address, said means for selecting being responsive to a last most selected instruction and to said condition signal;

utilization means responsive to an instruction selected by said means for selecting one of said two instructions.

* * * * *